United States Patent
Kodera et al.

(10) Patent No.: US 12,214,834 B2
(45) Date of Patent: Feb. 4, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Takashi Kodera, Okazaki (JP); Toru Takashima, Susono (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 17/480,779

(22) Filed: Sep. 21, 2021

(65) Prior Publication Data

US 2022/0089218 A1 Mar. 24, 2022

(30) Foreign Application Priority Data

Sep. 24, 2020 (JP) .................. 2020-159590

(51) Int. Cl.
*B60W 10/20* (2006.01)
*B62D 6/00* (2006.01)
*B62D 6/02* (2006.01)

(52) U.S. Cl.
CPC ............... *B62D 6/02* (2013.01); *B62D 6/002* (2013.01)

(58) Field of Classification Search
CPC ...... B62D 6/008; B62D 5/0463; B62D 5/001; B62D 5/006; B62D 6/002; B62D 6/00; B62D 15/025; B62D 5/005; B62D 5/04; B62D 5/0409; B62D 15/021; B62D 5/00; B62D 6/02; B60W 10/20; B60W 2540/18; B60W 2510/20; B60W 30/02
See application file for complete search history.

(56) References Cited

U.S. PATENT DOCUMENTS

| 2004/0059485 | A1 | 3/2004 | Momiyama et al. |
| 2004/0193344 | A1* | 9/2004 | Suzuki ............... B60T 8/885 180/443 |
| 2010/0070137 | A1* | 3/2010 | Yamaguchi ........... B62D 5/008 701/41 |

FOREIGN PATENT DOCUMENTS

| EP | 1700773 | A1 | 9/2006 |
| EP | 2 113 442 | A1 | 11/2009 |
| JP | 2002-029445 | A | 1/2002 |
| JP | 2010-095153 | A | 4/2010 |
| JP | 2013-209026 | A | 10/2013 |

(Continued)

OTHER PUBLICATIONS

Feb. 1, 2022 Extended European Search Report issued in European Patent Application No. 21198558.5.

(Continued)

*Primary Examiner* — Dalena Tran
(74) *Attorney, Agent, or Firm* — Oliff PLC

(57) ABSTRACT

A steering control device controls a turning motor that generates a turning force for causing turning wheels of which power transmission to and from a steering wheel is cut off to turn. The steering control device includes a first processor configured to change a steering angle ratio which is a ratio of a turning angle of the turning wheels to a steering angle of the steering wheel according to a vehicle speed through control of the turning motor and a second processor configured to change a degree of change of the steering angle ratio with respect to change of the vehicle speed according to a steering state or a vehicle state.

13 Claims, 19 Drawing Sheets

(56) References Cited

FOREIGN PATENT DOCUMENTS

| JP | 2016-159782 A | 9/2016 |
|----|---------------|--------|
| JP | 2019-043398 A | 3/2019 |

OTHER PUBLICATIONS

Jan. 30, 2024 Office Action issued in Japanese Application No. 2020-159590.
Dec. 21, 2023 Office Action issued in European Patent Application No. 21 198 558.5.

\* cited by examiner

STEERING CONTROL DEVICE

CROSS-REFERENCE TO RELATED APPLICATION

This application claims priority to Japanese Patent Application No. 2020-159590 filed on Sep. 24, 2020, incorporated herein by reference in its entirety.

BACKGROUND

1. Technical Field

The disclosure relates to a steering control device.

2. Description of Related Art

A so-called steer-by-wire steering system in which a power transmission path between a steering wheel and turning wheels is cut off is known. This steering system includes a reaction motor that is a source of a steering reaction force which is applied to a steering shaft and a turning motor that is a source of a turning force for turning the turning wheels. When a vehicle is traveling, a control device for the steering system generates a steering reaction force using the reaction motor and turns the turning wheels using the turning motor. There is demand for improvement in the steering characteristics of such a steering system.

For example, a control device described in Japanese Unexamined Patent Application Publication No. 2013-209026 (JP 2013-209026 A) changes a steering angle ratio according to a vehicle speed in view of improvement in steering characteristics. The steering angle ratio is a ratio of a turning angle of turning wheels to a steering angle of a steering wheel. The steering angle ratio is set to an increasingly larger value as the vehicle speed becomes higher. As the steering angle ratio decreases, the turning angle of the turning wheels when the steering wheel is operated changes more rapidly. As the steering angle ratio increases, the turning angle of the turning wheels when the steering wheel is operated changes more slowly.

Accordingly, when a vehicle enters a garage or the like in a low speed area, a larger amount of turning is acquired with respect to an amount of steering of the steering wheel and thus operability for the vehicle is secured. When a vehicle performs lane change or the like in a high speed area, the amount of turning becomes smaller with respect to the amount of steering of the steering wheel and thus driving stability of the vehicle is secured.

SUMMARY

In general control devices in the related art having a function of changing a steering angle ratio according to a vehicle speed, which includes the control device described in JP 2013-209026 A, there is the following concern. For example, when a vehicle is decelerated or accelerated while the vehicle is turning, the steering angle ratio changes with change of the vehicle speed and thus the turning angle of the turning wheels also changes. Accordingly, there is concern about occurrence of a vehicle behavior which is not intended by a driver.

For example, when a vehicle is decelerated while the vehicle is turning, the turning angle changes by a larger angle with a decrease of the vehicle speed. Accordingly, a travel trajectory of the vehicle may change such that the vehicle moves inward with respect to a turning locus which is intended by a driver. When a vehicle is accelerated while the vehicle is turning, the turning angle changes by a smaller angle with an increase of the vehicle speed. Accordingly, a travel trajectory of the vehicle may change such that it protrudes outward from a turning locus which is intended by a driver.

Particularly, when the vehicle speed changes while the vehicle is turning in a state in which the steering wheel is being held at a constant steering angle, the turning angle of the turning wheels changes with change of the vehicle speed even if the steering wheel is being held at a constant steering angle. Accordingly, a driver is likely to feel discomfort because an intended travel trajectory is not maintained.

The disclosure provides a steering control device that can curb change of a vehicle behavior which is not intended by a driver.

An aspect of the disclosure provides a steering control device. The steering control device controls a turning motor that generates a turning force for causing turning wheels of which power transmission to and from a steering wheel is cut off to turn. The steering control device includes: a first processor configured to change a steering angle ratio which is a ratio of a turning angle of the turning wheels to a steering angle of the steering wheel according to a vehicle speed through control of the turning motor; and a second processor configured to change a degree of change of the steering angle ratio with respect to change of the vehicle speed according to a steering state or a vehicle state.

With this configuration, an appropriate steering angle ratio is acquired according to the steering state or the vehicle state. Accordingly, it is possible to curb change of a vehicle behavior which is not intended by a driver. In the steering control device, the second processor may be configured to prohibit change of the steering angle ratio with respect to change of the vehicle speed when the steering wheel is being held at a constant steering angle with respect to a neutral position or when the vehicle is turning.

With this configuration, when the steering wheel is being held at a constant steering angle or when the vehicle is turning, the steering angle ratio does not change with respect to change of the vehicle speed and thus the turning angle of the turning wheels does not change with respect to change of the vehicle speed. Accordingly, when the steering wheel is being held at a constant steering angle or when the vehicle is turning, it is possible to curb a vehicle behavior which is not intended by a driver when the vehicle speed changes.

In the steering control device, the second processor may be configured to slow down the degree of change of the steering angle ratio with respect to change of the vehicle speed when the steering wheel is being held at a constant steering angle with respect to a neutral position or when the vehicle is turning.

With this configuration, when the steering wheel is being held at a constant steering angle or when the vehicle is turning, the steering angle ratio is less likely to change with respect to change of the vehicle speed. Accordingly, the turning angle of the turning wheels is less likely to change with respect to change of the vehicle speed. Accordingly, when the steering wheel is being held at a constant steering angle or when the vehicle is turning, it is possible to curb a vehicle behavior which is not intended by a driver when the vehicle speed changes.

In the steering control device, the first processor may be configured to calculate a target rotation angle of a shaft that rotates along with a turning operation of the turning wheels based on the steering angle of the steering wheel according to the vehicle speed and to control the turning motor such that a rotation angle of the shaft reaches the target rotation angle. The second processor may be configured to fix the value of the vehicle speed which is used to calculate the target rotation angle when the steering wheel is being held at a constant steering angle with respect to the neutral position or when the vehicle is turning.

With this configuration, when the steering wheel is being held at a constant steering angle or when the vehicle is turning, the value of the vehicle speed which is used to calculate the target rotation angle is fixed. Accordingly, it is possible to prevent the steering angle ratio from changing with respect to actual change of the vehicle speed.

In the steering control device, the first processor may be configured to calculate a target rotation angle of a shaft that rotates along with a turning operation of the turning wheels based on the steering angle of the steering wheel according to the vehicle speed and to control the turning motor such that a rotation angle of the shaft reaches the target rotation angle. The second processor may be configured to limit a change per unit time of the vehicle speed which is used to calculate the target rotation angle when the steering wheel is being held at a constant steering angle with respect to the neutral position or when the vehicle is turning.

With this configuration, when the steering wheel is being held at a constant steering angle or when the vehicle is turning, the change per unit time of the vehicle speed which is used to calculate the target rotation angle is limited. Accordingly, it is possible to slow down a degree of change of the steering angle ratio with respect to actual change of the vehicle speed.

In the steering control device, the first processor may be configured to calculate a target rotation angle of a shaft that rotates along with a turning operation of the turning wheels by multiplying the steering angle of the steering wheel by a speed increasing ratio between the steering wheel and the shaft which is calculated according to the vehicle speed and to control the turning motor such that a rotation angle of the shaft reaches the target rotation angle. The second processor may be configured to limit a change per unit time of the speed increasing ratio which is used to calculate the target rotation angle when the steering wheel is being held at a constant steering angle with respect to the neutral position or when the vehicle is turning.

With this configuration, when the steering wheel is being held at a constant steering angle or when the vehicle is turning, the change per unit time of the speed increasing ratio which is used to calculate the target rotation angle is limited. Accordingly, it is possible to slow down a degree of change of the steering angle ratio with respect to actual change of the vehicle speed.

In the steering control device, the first processor may be configured to calculate a target rotation angle of a shaft that rotates along with a turning operation of the turning wheels based on the steering angle of the steering wheel according to the vehicle speed and to control the turning motor such that a rotation angle of the shaft reaches the target rotation angle. The second processor may be configured to fix the value of the target rotation angle which is used to control the turning motor when the steering wheel is being held at a constant steering angle with respect to the neutral position or when the vehicle is turning.

With this configuration, when the steering wheel is being held at a constant steering angle or when the vehicle is turning, the value of the target rotation angle which is used to control the turning motor is fixed. Accordingly, it is possible to prevent the steering angle ratio from changing with respect to actual change of the vehicle speed.

In the steering control device, the second processor may be configured to slowly change the value of the vehicle speed which is used to calculate the target rotation angle to a current value of the vehicle speed which is detected by a vehicle speed sensor when a state in which the steering wheel is being held is released or when a turning state of the vehicle is released.

With this configuration, when the steering angle ratio is returned to an original steering angle ratio based on a current vehicle speed, it is possible to curb rapid change of the steering angle ratio. Accordingly, it is possible to curb a vehicle behavior which is not intended by a driver.

In the steering control device, the second processor may be configured to slowly change the value of the speed increasing ratio which is used to calculate the target rotation angle to a current value of the speed increasing ratio which is calculated by the first processor when a state in which the steering wheel is being held is released or when a turning state of the vehicle is released.

With this configuration, when the steering angle ratio is returned to an original steering angle ratio based on a current vehicle speed, it is possible to curb rapid change of the steering angle ratio. Accordingly, it is possible to curb a vehicle behavior which is not intended by a driver.

In the steering control device, the second processor may be configured to slowly change the value of the target rotation angle which is used to control the turning motor to a current value of the target rotation angle which is calculated by the first processor when a state in which the steering wheel is being held is released or when a turning state of the vehicle is released.

With this configuration, when the steering angle ratio is returned to an original steering angle ratio based on a current vehicle speed, it is possible to curb rapid change of the steering angle ratio. Accordingly, it is possible to curb a vehicle behavior which is not intended by a driver.

The steering control device may further include: a third processor configured to convert a rotation angle of a shaft that rotates along with a turning operation of the turning wheels to a target steering angle of the steering wheel according to the vehicle speed based on the steering angle ratio which is a ratio of a turning angle of the turning wheels to a steering angle of the steering wheel; and a fourth processor configured to change a degree of change of the steering angle ratio with respect to change of the vehicle speed which is used to calculate the target steering angle by performing the same process as performed by the second processor.

With this configuration, it is possible to synchronize the steering angle of the steering wheel and the turning angle of the turning wheels with each other. In the steering control device, the rotation angle of the shaft which is used to calculate the target steering angle in the third processor may be at least one of a rotation angle of the shaft when it is determined that the turning wheels of the vehicle are in contact with an obstacle, a rotation angle of the shaft when the vehicle is powered on, and a target rotation angle of the shaft which is generated when a host control device mounted in the vehicle intervenes in steering control.

According to the disclosure, it is possible to curb change of a vehicle behavior which is not intended by a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a steering control device is applied to a steer-by-wire steering system will be described.

Figure 1:
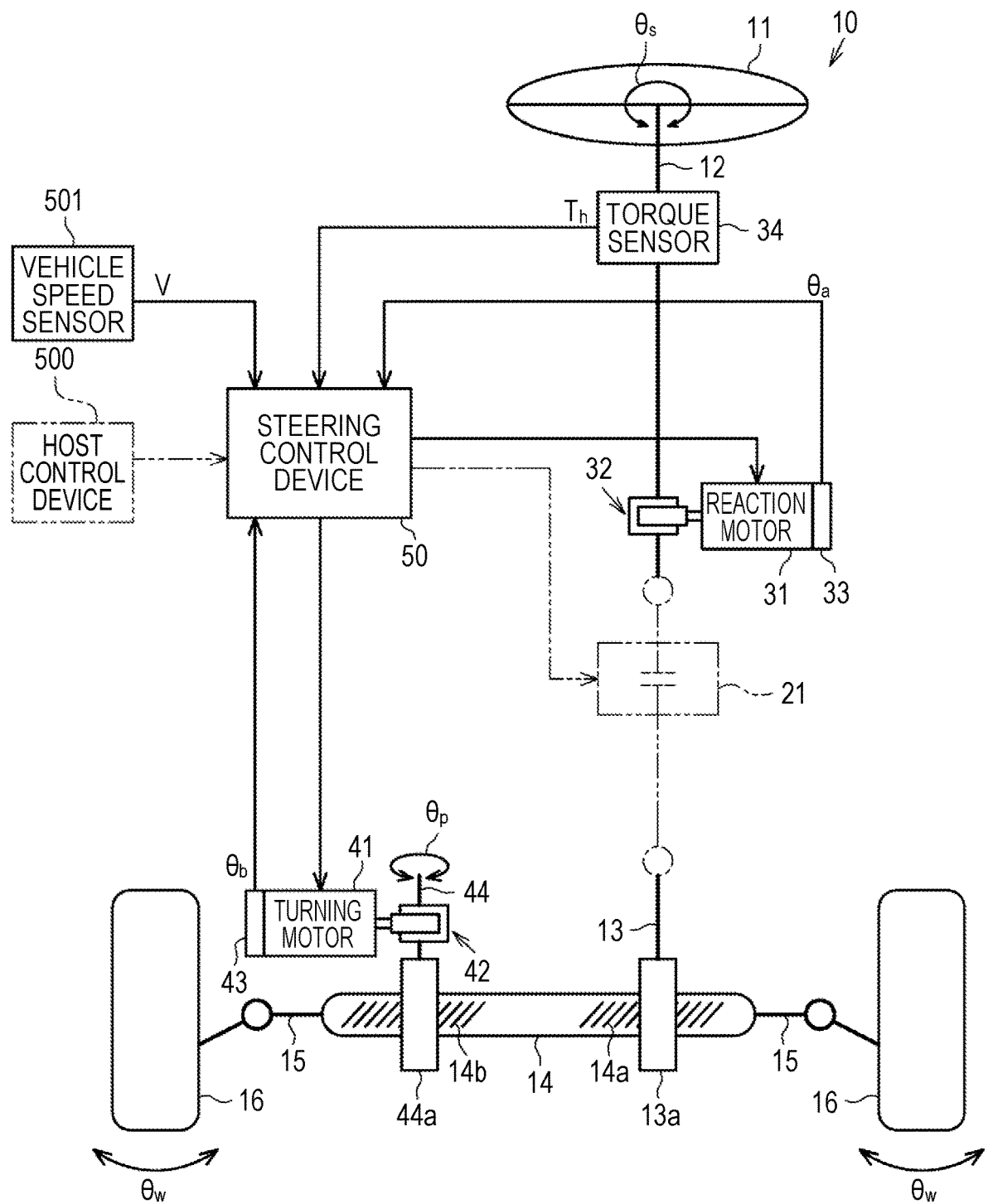
FIG. 1 is a diagram illustrating a configuration of a steer-by-wire steering system in which a steering control device according to a first embodiment is mounted.

As illustrated in FIG. 1, a steering system 10 of a vehicle includes a steering shaft 12 that is connected to a steering wheel 11. The steering system 10 includes a turning shaft 14 that extends in a vehicle width direction (in a right-left direction in FIG. 1). Right and left turning wheels 16 and 16 are connected to both ends of the turning shaft 14 via tie rods 15 and 15. When the turning shaft 14 moves linearly, a turning angle $\theta_w$ of the turning wheels 16 and 16 is changed. The steering shaft 12 and the turning shaft 14 constitute a steering mechanism of the vehicle.

The steering system 10 includes a reaction motor 31, a reduction gear mechanism 32, a rotation angle sensor 33, and a torque sensor 34 as a configuration for generating a steering reaction force. A steering reaction force is a force which acts in a direction opposite to an operating direction of the steering wheel 11 which is operated by a driver. An appropriate feeling of response can be given to the driver by applying the steering reaction force to the steering wheel 11.

The reaction motor 31 is a source of the steering reaction force. For example, a three-phase brushless motor may be employed as the reaction motor 31. The reaction motor 31 (accurately, a rotation shaft thereof) is connected to the steering shaft 12 via the reduction gear mechanism 32. A torque of the reaction motor 31 is applied as a steering reaction force to the steering shaft 12.

The rotation angle sensor 33 is provided in the reaction motor 31. The rotation angle sensor 33 detects a rotation angle $\theta_a$ of the reaction motor 31. The rotation angle $\theta_a$ of the reaction motor 31 is used to calculate a steering angle $\theta_s$. The reaction motor 31 and the steering shaft 12 interlock with each other via the reduction gear mechanism 32. Accordingly, the rotation angle $\theta_a$ of the reaction motor 31 and the rotation angle of the steering shaft 12, that is, the steering angle $\theta_s$ which is a rotation angle of the steering wheel 11, have a correlation therebetween. As a result, the steering angle $\theta_s$ can be calculated based on the rotation angle $\theta_a$ of the reaction motor 31.

The torque sensor 34 detects a steering torque $T_h$ which is a torque applied to the steering shaft 12 through a rotating operation of the steering wheel 11. The torque sensor 34 detects the steering torque $T_h$ applied to the steering shaft 12 based on an amount of torsion of a torsion bar which is provided in the middle of the steering shaft 12. The torque sensor 34 is provided on the steering wheel 11 side of the reduction gear mechanism 32 in the steering shaft 12.

The steering system 10 includes a turning motor 41, a reduction gear mechanism 42, and a rotation angle sensor 43 as a configuration for generating a turning force which is power for turning the turning wheels 16 and 16.

The turning motor 41 is a source of the turning force. For example, a three-phase brushless motor is employed as the turning motor 41. A rotation shaft of the turning motor 41 is connected to a pinion shaft 44 via the reduction gear mechanism 42. Pinion teeth 44a of the pinion shaft 44 engage with rack teeth 14b of the turning shaft 14. A torque of the turning motor 41 is applied as a turning force to the turning shaft 14 via the pinion shaft 44. With rotation of the turning motor 41, the turning shaft 14 moves in a vehicle width direction which is a right-left direction in FIG. 1.

The rotation angle sensor 43 is provided in the turning motor 41. The rotation angle sensor 43 detects a rotation angle $\theta_b$ of the turning motor 41. The steering system 10 includes a pinion shaft 13. The pinion shaft 13 is provided to cross the turning shaft 14. Pinion teeth 13a of the pinion shaft 13 engage with the rack teeth 14a of the turning shaft 14. The reason the pinion shaft 13 is provided is to support the turning shaft 14 along with the pinion shaft 44 in a housing which is not illustrated. That is, by a support mechanism (not illustrated) which is provided in the steering system 10, the turning shaft 14 is supported to be movable in an axial direction thereof and is pressed toward the pinion shafts 13 and 44. Accordingly, the turning shaft 14 is supported in the housing. Another support mechanism that supports the turning shaft 14 in the housing without using the pinion shaft 13 may be provided.

The steering system 10 includes a control device 50. The control device 50 controls the reaction motor 31 and the turning motor 41 based on results of detection from various sensors which are provided in the vehicle. Examples of the various sensors include a vehicle speed sensor 501 in addition to the rotation angle sensor 33, the torque sensor 34, and the rotation angle sensor 43. The vehicle speed sensor 501 detects a vehicle speed V which is a traveling speed of the vehicle.

The control device 50 performs reaction control such that a steering reaction force based on the steering torque $T_h$ is generated through drive control of the reaction motor 31. The control device 50 calculates a target steering reaction force based on the steering torque $T_h$ and the vehicle speed V and calculates a steering reaction force command value based on the calculated target steering reaction force. The control device 50 supplies a current required for generating a steering reaction force corresponding to the steering reaction force command value to the reaction motor 31.

The control device 50 performs turning control such that the turning wheels 16 and 16 are turned according to a steering state through drive control of the turning motor 41. The control device 50 calculates a pinion angle $\theta_p$ which is an actual rotation angle of the pinion shaft 44 based on a rotation angle $\theta_h$ of the turning motor 41 which is detected by the rotation angle sensor 43. The pinion angle $\theta_p$ is a value in which a turning angle $\theta_w$ of the turning wheels 16 and 16 is reflected. The control device 50 calculates a steering angle $\theta_s$ based on a rotation angle $\theta_a$ of the reaction motor 31 which is detected by the rotation angle sensor 33 and calculates a target pinion angle which is a target value of the pinion angle $\theta_p$ based on the calculated steering angle $\theta_s$. The control device 50 calculates a difference between the target pinion angle and the actual pinion angle $\theta_p$, and controls supply of electric power to the turning motor 41 such that the difference is cancelled out.

Figure 2:
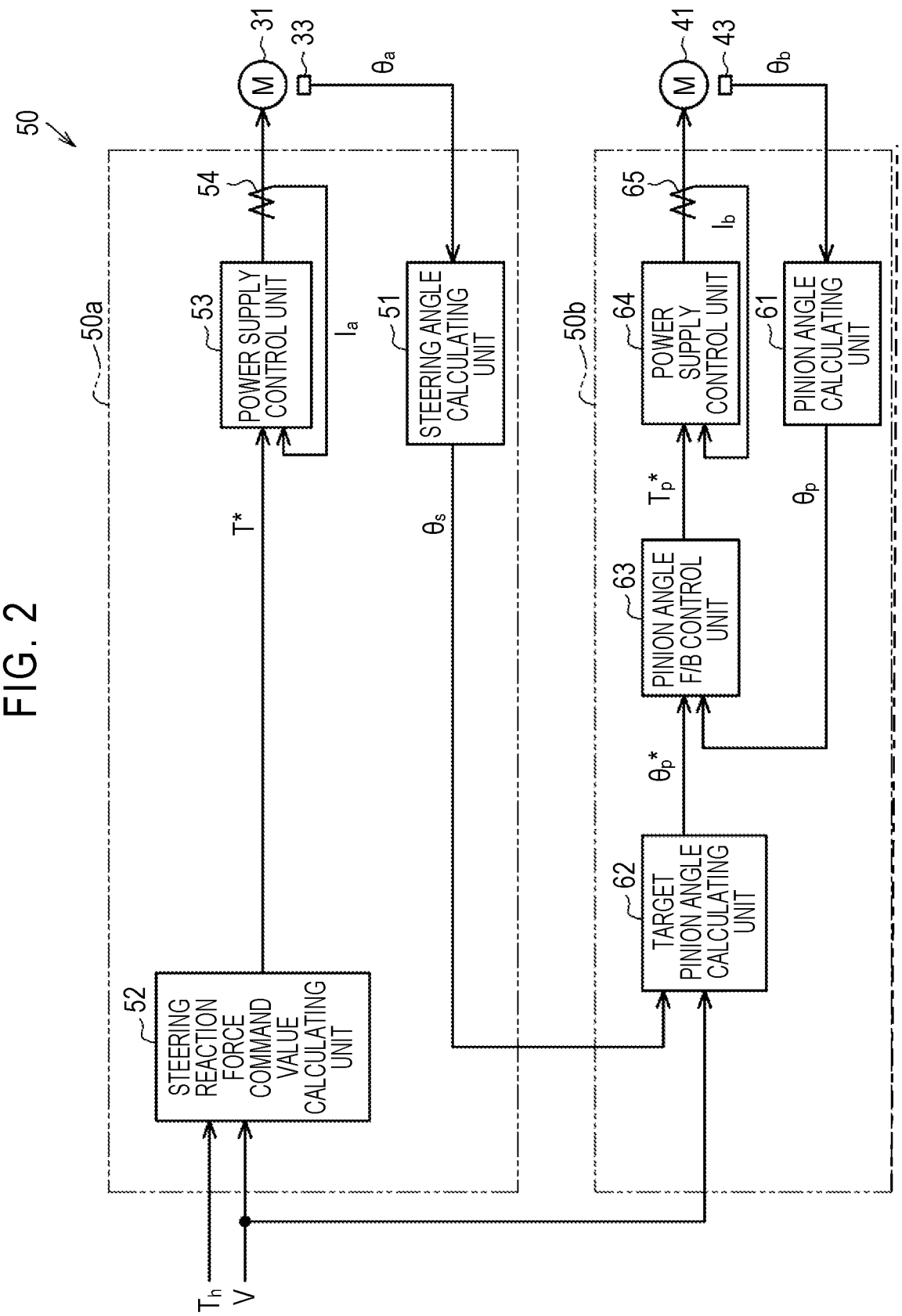
FIG. 2 is a block diagram illustrating a control device according to the first embodiment.

The control device 50 will be described below in detail. As illustrated in FIG. 2, the control device 50 includes a reaction control unit 50a that performs reaction control and a turning control unit 50b that performs turning control.

The reaction control unit 50a includes a steering angle calculating unit 51, a steering reaction force command value calculating unit 52, and a power supply control unit 53. The steering angle calculating unit 51 calculates a steering angle $\theta_s$ of the steering wheel 11 based on the rotation angle $\theta_a$ of the reaction motor 31 which is detected by the rotation angle sensor 33.

The steering reaction force command value calculating unit 52 calculates a steering reaction force command value $T^*$ based on the steering torque $T_h$ and the vehicle speed V. The steering reaction force command value calculating unit 52 calculates the steering reaction force command value $T^*$ such that an absolute value thereof becomes larger as an absolute value of the steering torque $T_h$ becomes larger and the vehicle speed V becomes lower.

The power supply control unit 53 supplies electric power corresponding to the steering reaction force command value $T^*$ to the reaction motor 31. Specifically, the power supply control unit 53 calculates a current command value for the reaction motor 31 based on the steering reaction force command value $T^*$. The power supply control unit 53 detects a value of an actual current $I_a$ which is generated in a power supply path for the reaction motor 31 using a current sensor 54 which is provided in the power supply path. The value of the current $I_a$ is a value of an actual current which is supplied to the reaction motor 31. The power supply control unit 53 calculates a difference between the current command value and the value of the actual current $I_a$ and controls supply of electric power to the reaction motor 31 such that the difference is cancelled out. Accordingly, the reaction motor 31 generates a torque corresponding to the steering reaction force command value $T^*$. As a result, it is possible to give an appropriate feeling of response based on a road reaction force to a driver.

The turning control unit 50b includes a pinion angle calculating unit 61, a target pinion angle calculating unit 62, a pinion angle feedback control unit 63, and a power supply control unit 64. The pinion angle calculating unit 61 calculates a pinion angle $\theta_p$ which is an actual rotation angle of the pinion shaft 44 based on the rotation angle $\theta_h$ of the turning motor 41 which is detected by the rotation angle sensor 43. The turning motor 41 and the pinion shaft 44 interlock with each other via the reduction gear mechanism 42. Accordingly, there is a correlation between the rotation angle $\theta_h$ of the turning motor 41 and the pinion angle $\theta_p$. The pinion angle $\theta_p$ can be calculated from the rotation angle $\theta_h$ of the turning motor 41 using the correlation. The pinion shaft 44 engages with the turning shaft 14. Accordingly, there is also a correlation between the pinion angle $\theta_p$ and an amount of shift of the turning shaft 14. That is, the pinion angle $\theta_p$ is a value in which the turning angle $\theta_w$ of the turning wheels 16 and 16 is reflected.

The target pinion angle calculating unit 62 calculates a target pinion angle $\theta_p^*$ based on the steering angle $\theta_s$ calculated by the steering angle calculating unit 51 and the vehicle speed V detected by the vehicle speed sensor 501. For example, the target pinion angle calculating unit 62 sets a steering angle ratio which is a ratio of the turning angle $\theta_w$ to the steering angle $\theta_s$ according to the vehicle speed V and calculates the target pinion angle $\theta_p^*$ based on the set steering angle ratio. The target pinion angle calculating unit 62 calculates the target pinion angle $\theta_p^*$ such that the turning angle $\theta_w$ relative to the steering angle $\theta_s$ becomes larger as the vehicle speed V becomes lower and the turning angle $\theta_w$ relative to the steering angle $\theta_s$ becomes smaller as the vehicle speed V becomes higher. In order to realize the steering angle ratio which is set according to the vehicle speed V, the target pinion angle calculating unit 62 calculates a corrected angle for the steering angle $\theta_s$ and calculates the target pinion angle $\theta_p^*$ based on the steering angle ratio by adding the calculated corrected angle to the steering angle $\theta_s$.

Figure 3:
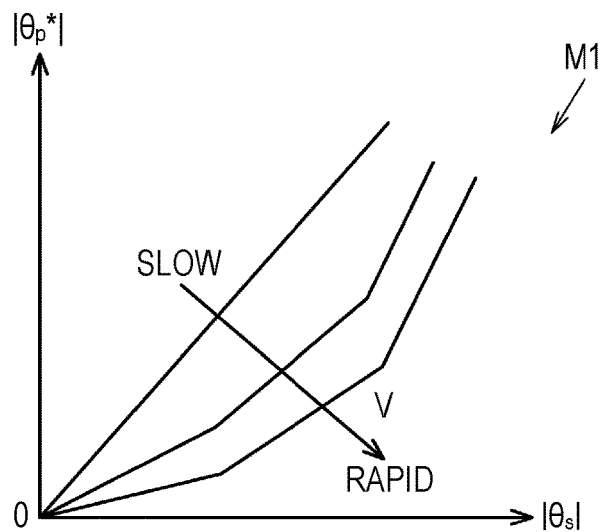
FIG. 3 is a graph illustrating a map for defining a relationship between a steering angle and a target pinion angle based on a vehicle speed according to the first embodiment.

In this embodiment, the target pinion angle calculating unit 62 calculates the target pinion angle $\theta_p^*$ using a map M1. The map M1 is stored in a storage device of the control device 50. As illustrated in the graph of FIG. 3, the map M1 is a three-dimensional map in which a relationship between the steering angle $\theta_s$ and the target pinion angle $\theta_p^*$ is defined according to the vehicle speed V. The map M1 has the following characteristics. That is, the absolute value of the target pinion angle $\theta_p^*$ becomes larger as the absolute value of the steering angle $\theta_s$ becomes larger and the vehicle speed V becomes lower.

As illustrated in FIG. 2, the pinion angle feedback control unit 63 receives the target pinion angle $\theta_p^*$ calculated by the target pinion angle calculating unit 62 and the actual pinion angle $\theta_p$ calculated by the pinion angle calculating unit 61. The pinion angle feedback control unit 63 calculates a pinion angle command value $T_p^*$ through feedback control of the pinion angle $\theta_p$ such that the actual pinion angle $\theta_p$ conforms to the target pinion angle $\theta_p^*$.

The power supply control unit 64 supplies electric power corresponding to the pinion angle command value $T_p^*$ to the turning motor 41. Specifically, the power supply control unit 64 calculates a current command value for the turning motor 41 based on the pinion angle command value $T_p^*$. The power supply control unit 64 detects a value of an actual current $I_b$ which is generated in a power supply path for the turning motor 41 using a current sensor 65 which is provided in the power supply path. The value of the current $I_b$ is a value of an actual current which is supplied to the turning motor 41. The power supply control unit 64 calculates a difference between the current command value and the value of the actual current $I_b$ and controls supply of electric power to the turning motor 41 such that the difference is cancelled out. Accordingly, the turning motor 41 rotates by an angle corresponding to the pinion angle command value $T_p^*$.

Since the target pinion angle $\theta_p^*$ relative to the steering angle $\theta_s$ changes according to the vehicle speed V based on the map M1 illustrated in the graph of FIG. 3, the absolute value of the target pinion angle $\theta_p'$ becomes larger as the absolute value of the steering angle $\theta_s$ becomes larger and the vehicle speed V becomes lower. That is, the value of the steering angle ratio which is a ratio of the turning angle $\theta_w$ to the steering angle $\theta_s$ becomes larger as the vehicle speed V becomes higher, and becomes smaller as the vehicle speed V becomes lower.

As the value of the steering angle ratio becomes smaller, the turning angles $\theta_w$ and $\theta_w$ of the turning wheels 16 and 16 when the steering wheel 11 is operated change more rapidly. Accordingly, for example, when the vehicle enters a garage or the like in a low speed area, a larger amount of turning is acquired with a smaller amount of steering and thus operability for the vehicle is secured. As the value of the steering angle ratio becomes larger, the turning angles $\theta_w$ and $\theta_w$ of the turning wheels 16 and 16 when the steering wheel 11 is operated changes more slowly. Accordingly, for example, when the vehicle performs lane change or the like in a high speed area, driving stability of the vehicle is secured.

There is the following concern because the steering angle ratio changes according to the vehicle speed V. That is, for example, it is conceivable that a vehicle will be decelerated or accelerated in a state in which the vehicle is turning. In this case, since the steering angle ratio changes with change of the vehicle speed V, the turning angles $\theta_w$ and $\theta_w$ of the turning wheels 16 and 16 also change with the change of the vehicle speed V. Accordingly, there is concern about occurrence of a vehicle behavior which is not intended by a driver.

For example, when the vehicle is decelerated while the vehicle is turning, the turning angles $\theta_w$ and $\theta_w$ change by a larger angle with a decrease of the vehicle speed V. Accordingly, a travel trajectory of the vehicle may change such that the vehicle moves inward with respect to a turning locus which is intended by a driver. When the vehicle is accelerated while the vehicle is turning, the turning angles $\theta_w$ and $\theta_w$ change by a smaller angle with an increase of the vehicle speed V. Accordingly, the travel trajectory of the vehicle changes such that it protrudes outward from a turning locus which is intended by a driver.

Particularly, when the vehicle speed V changes while the vehicle is turning in a state in which the steering wheel 11 is being held at a constant steering angle $\theta_s$, the turning angles $\theta_w$ and $\theta_w$ of the turning wheels 16 and 16 change with the change of the vehicle speed V even if the steering wheel 11 is being held at the constant steering angle $\theta_s$. Accordingly, a driver is more likely to feel discomfort because an intended travel trajectory is not maintained.

Figure 4:
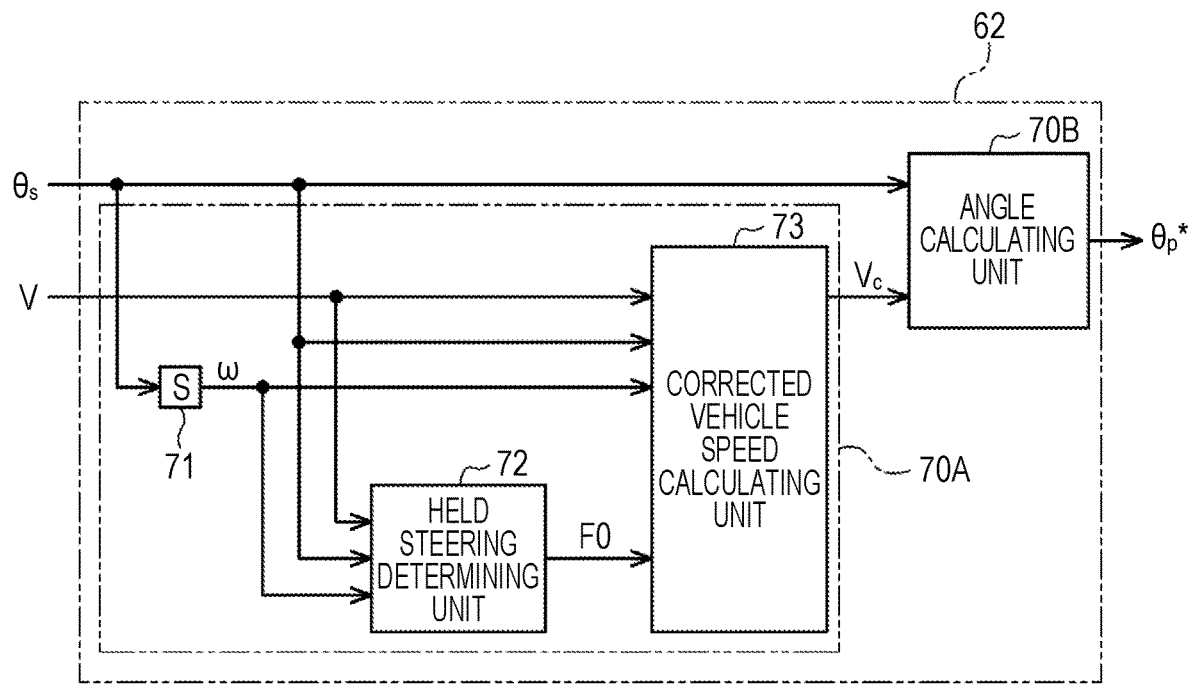
FIG. 4 is a block diagram illustrating a target pinion angle calculating unit according to the first embodiment.

Therefore, in this embodiment, the following configuration is employed as the target pinion angle calculating unit 62 such that occurrence of change of a vehicle behavior which is not intended by a driver is curbed. As illustrated in FIG. 4, the target pinion angle calculating unit 62 includes a correction processing unit 70A and an angle calculating unit 70B.

The correction processing unit 70A corrects the vehicle speed V detected by the vehicle speed sensor 501 according to the steering state of the steering wheel 11. The correction processing unit 70A includes a differentiator 71, a held steering determining unit 72, and a corrected vehicle speed calculating unit 73.

The differentiator 71 calculates a steering angular velocity co by differentiating the steering angle $\theta_s$ calculated by the steering angle calculating unit 51. The held steering determining unit 72 receives the vehicle speed V detected by the vehicle speed sensor 501, the steering angle $\theta_s$ calculated by the steering angle calculating unit 51, and the steering angular velocity co calculated by the differentiator 71, and determines whether the steering wheel 11 is being held at a constant steering angle $\theta_s$ based on the vehicle speed, V, the steering angle $\theta_s$, and the steering angular velocity co which are received. Held steering mentioned herein means a state in which the steering wheel 11 is being held at a position at which it is being steered to the right or left with respect to a neutral position corresponding to a state of the vehicle traveling straight ahead. The held steering determining unit 72 sets a value of a flag F0 as a held steering determination result indicating whether the steering state of the steering wheel 11 is a held steering state. Details of the held steering determining unit 72 will be described later.

The corrected vehicle speed calculating unit 73 receives the vehicle speed V detected by the vehicle speed sensor 501, the steering angle $\theta_s$ calculated by the steering angle calculating unit 51, the steering angular velocity co calculated by the differentiator 71, and the value of the flag F0 set by the held steering determining unit 72. The corrected vehicle speed calculating unit 73 calculates a corrected vehicle speed $V_c$ by correcting the value of the vehicle speed V detected by the vehicle speed sensor 501 based on the vehicle speed V, the steering angle $\theta_s$, the steering angular velocity ω, and the value of the flag F0. Details of the corrected vehicle speed calculating unit 73 will be described later.

The angle calculating unit 70B receives the steering angle $\theta_s$ calculated by the steering angle calculating unit 51 and the corrected vehicle speed $V_c$ which is the vehicle speed V corrected by the correction processing unit 70A. The angle calculating unit 70B calculates the target pinion angle $\theta_p^*$ using a map M1 illustrated in the graph of FIG. 3.

Figure 5:
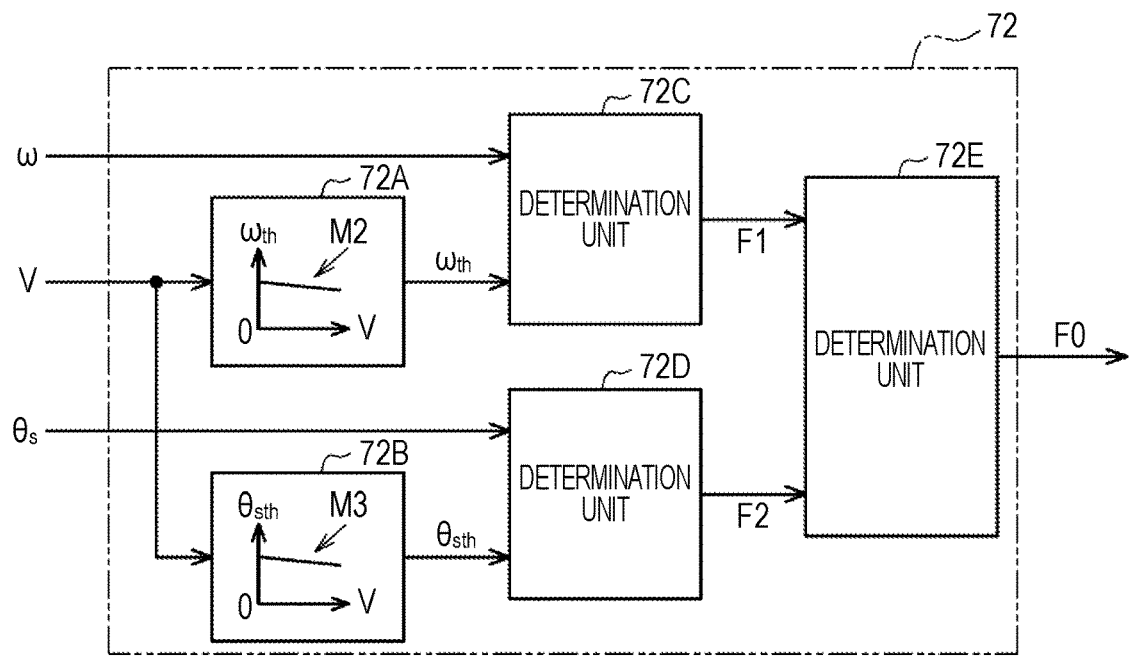
FIG. 5 is a block diagram illustrating a held steering determining unit according to the first embodiment.

The configuration of the held steering determining unit 72 will be described below in detail. As illustrated in FIG. 5, the held steering determining unit 72 includes two threshold value calculating units 72A and 72B and three determination units 72C, 72D, and 72E.

The threshold value calculating unit 72A calculates a steering angular velocity threshold value $\omega_{th}$ according to the vehicle speed V. The threshold value calculating unit 72A calculates the steering angular velocity threshold value $\omega_{th}$ using a map M2 which is stored in the storage device of the control device 50. The map M2 is a two-dimensional map with the vehicle speed V set for the horizontal axis and with the steering angular velocity threshold value $\omega_{th}$ set for the vertical axis, and defines a relationship between the vehicle speed V and the steering angular velocity threshold value $\omega_{th}$. For example, the map M2 has the following characteristics. That is, the steering angular velocity threshold value $\omega_{th}$ is set to become smaller as the vehicle speed V becomes higher.

The threshold value calculating unit 72B calculates a steering angle threshold value $\theta_{sth}$ according to the vehicle speed V. The threshold value calculating unit 72B calculates the steering angle threshold value $\theta_{sth}$ using a map M3 which is stored in the storage device of the control device 50. The map M3 is a two-dimensional map with the vehicle speed V set for the horizontal axis and with the steering angle threshold value $\theta_{sth}$ set for the vertical axis, and defines a relationship between the vehicle speed V and the steering angle threshold value $\theta_{rth}$. For example, the map M3 has the following characteristics. That is, the steering angle threshold value $\theta_{rth}$ is set to become smaller as the vehicle speed V becomes higher.

The determination unit 72C determines whether the steering state of the steering wheel 11 is a held steering state by comparing an absolute value of the steering angular velocity co with the steering angular velocity threshold value $\omega_{th}$. When the absolute value of the steering angular velocity co is less than the steering angular velocity threshold value $\omega_{th}$, the determination unit 72C determines that the steering state of the steering wheel 11 is a held steering state. The determination unit 72C sets a value of a flag F1 based on a determination result indicating whether the steering state of the steering wheel 11 is a held steering state. When it is determined that the steering state of the steering wheel 11 is a held steering state, the determination unit 72C sets the value of the flag F1 to "1." When it is determined that the steering state of the steering wheel 11 is not a held steering state, the determination unit 72C sets the value of the flag F1 to "0."

The determination unit 72D determines whether the steering wheel 11 is being held at a position of departure from the neutral position corresponding to straight-ahead traveling of the vehicle by comparing an absolute value of the steering angle $\theta_s$ with the steering angle threshold value $\theta_{sth}$. When the absolute value of the steering angle $\theta_s$ is greater than the steering angle threshold value $\theta_{sth}$, the determination unit 72D determines that the steering wheel 11 is being held at a position of departure from the neutral position. The determination unit 72D sets a value of a flag F2 based on a determination result indicating whether the steering wheel 11 is being held at a position of departure from the neutral position. When it is determined that the steering wheel 11 is being held at a position which departs from the neutral position, the determination unit 72D sets the value of the flag F2 to "1." When it is determined that the steering wheel 11 is not held at a position of departure from the neutral position, the determination unit 72D sets the value of the flag F2 to "0."

The determination unit 72E sets the value of the flag F0 as a held steering determination result based on the value of the flag F1 set by the determination unit 72C and the value of the flag F2 set by the determination unit 72D. When the values of both the two flags F1 and F2 are "1," the determination unit 72E sets the value of the flag F0 as the held steering result indicating that the steering wheel 11 is being held at a position of departure from the neutral position to "1." When the value of at least one of the two flags F1 and F2 is "0," the determination unit 72E sets the value of the flag F0 as the held steering result indicating that the steering wheel 11 is not held at a position of departure from the neutral position to "0."

Figure 6:
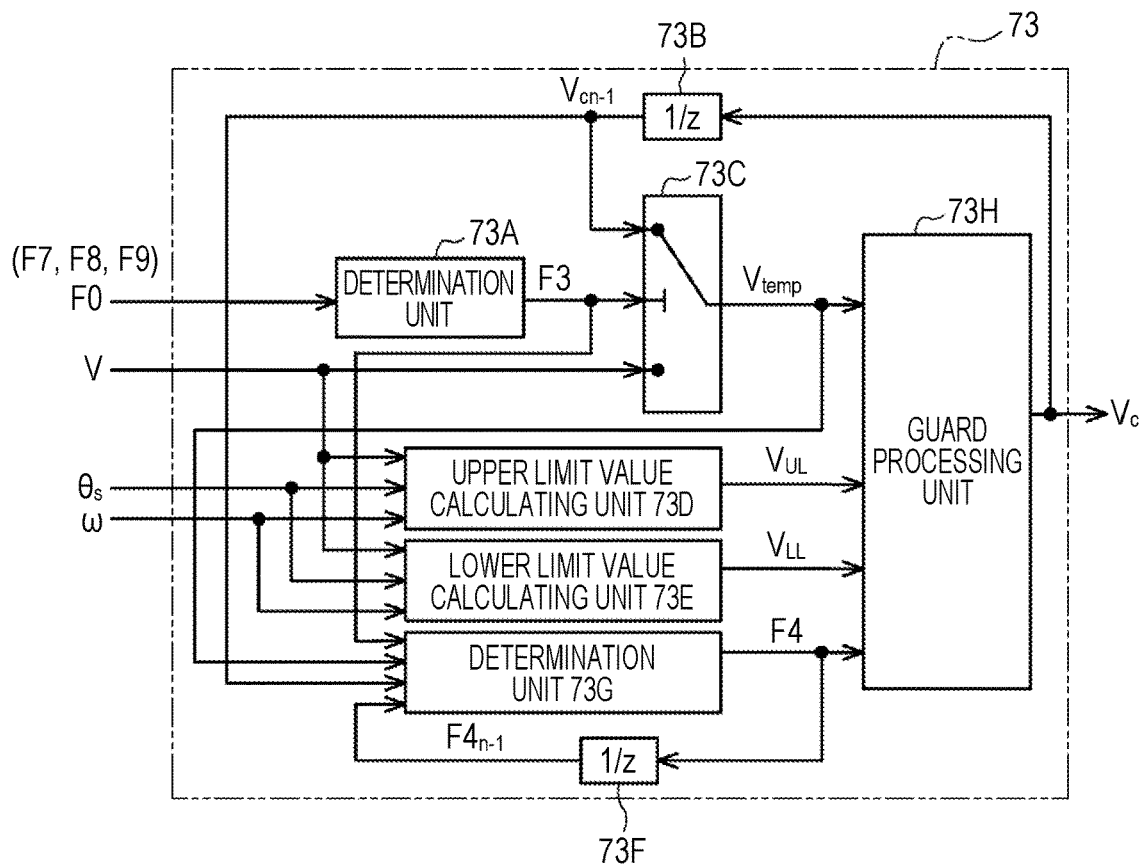
FIG. 6 is a block diagram illustrating a corrected vehicle speed calculating unit according to the first embodiment.

The configuration of the corrected vehicle speed calculating unit 73 will be described below in detail. As illustrated in FIG. 6, the corrected vehicle speed calculating unit 73 includes a determination unit 73A, a previous value storage unit 73B, a switch 73C, an upper limit value calculating unit 73D, a lower limit value calculating unit 73E, a previous value storage unit 73F, a determination unit 73G, and a guard processing unit 73H.

The determination unit 73A receives the value of the flag F0 set by the held steering determining unit 72 and sets a value of a flag F3 indicating whether the value of the vehicle speed V which is used to calculate the target pinion angle $\theta_p^*$ is to be fixed according to the received value of the flag F0. When the value of the flag F0 is "1," that is, when the steering wheel 11 is being held at a constant steering angle $\theta_s$, the determination unit 73A determines that the value of the vehicle speed V which is used to calculate the target pinion angle $\theta_p^*$ is to be fixed and sets the value of the flag F3 to "1." When the value of the flag F0 is "0," that is, when the steering wheel 11 is not held at a constant steering angle $\theta_s$, the determination unit 73A determines that the value of the vehicle speed V which is used to calculate the target pinion angle $\theta_p^*$ is not to be fixed and sets the value of the flag F3 to "0."

The previous value storage unit 73B receives the corrected vehicle speed $V_c$ calculated by the guard processing unit 73H which will be described later and stores the received corrected vehicle speed V. The guard processing unit 73H calculates the corrected vehicle speed $V_c$ at intervals of a predetermined operation cycle, and the corrected vehicle speed $V_c$ stored in the previous value storage unit 73B is updated whenever the corrected vehicle speed $V_c$ is calculated by the guard processing unit 73H. That is, the corrected vehicle speed $V_c$ stored in the previous value storage unit 73B is a previous value of a current value of the corrected vehicle speed $V_c$ (the corrected vehicle speed $V_c$ one operation cycle ago) calculated by the guard processing unit 73H.

The switch 73C receives the vehicle speed V detected by the vehicle speed sensor 501 and a previous value $V_{cn-1}$ of the corrected vehicle speed $V_c$ stored in the previous value storage unit 73B as data inputs. The switch 73C receives the value of the flag F3 set by the determination unit 73A as a control input. The switch 73C selects one of the vehicle speed V detected by the vehicle speed sensor 501 and the previous value $V_{c-n1}$ of the corrected vehicle speed $V_c$ stored in the previous value storage unit 73B as a temporary vehicle speed value $V_{temp}$ based on the value of the flag F3. When the value of the flag F3 is "0," the switch 73C selects the vehicle speed V detected by the vehicle speed sensor 501 as the temporary vehicle speed value $V_{temp}$. When the value of the flag F3 is "1" (more accurately when the value of the flag F3 is not "0"), the switch 73C selects the previous value $V_{cn-1}$ of the corrected vehicle speed $V_c$ as the temporary vehicle speed value $V_{temp}$.

When a state in which the steering wheel 11 is being held at the constant steering angle $\theta_s$ is maintained, the state in which the value of the flag F3 is set to "1" is maintained. In a period in which the value of the flag F3 is set to "1," the previous value $V_{cn-1}$ of the corrected vehicle speed $V_c$ stored in the previous value storage unit 73B is normally selected as the temporary vehicle speed value $V_{temp}$.

The switch 73C may receive the value of the flag F0 set by the held steering determining unit 72 as a control input. When this configuration is employed, a configuration in which the determination unit 73A is omitted may be employed as the corrected vehicle speed calculating unit 73.

The upper limit value calculating unit 73D receives the vehicle speed V detected by the vehicle speed sensor 501, the steering angle $\theta_s$ calculated by the steering angle calculating unit 51, and the steering angular velocity ω calculated by the differentiator 71, and calculates an upper limit value $V_{UL}$ for a change per operation cycle of the temporary vehicle speed value $V_{temp}$ based on the vehicle speed V, the steering angle $\theta_s$, and the steering angular velocity ω. Details of the upper limit value calculating unit 73D will be described later.

The lower limit value calculating unit 73E receives the vehicle speed V detected by the vehicle speed sensor 501, the steering angle $\theta_s$ calculated by the steering angle calculating unit 51, and the steering angular velocity ω calculated by the differentiator 71, and calculates a lower limit value $V_{LL}$ for the change per operation cycle of the temporary vehicle speed value $V_{temp}$ based on the vehicle speed V, the steering angle $\theta_s$, and the steering angular velocity ω which are received. Details of the lower limit value calculating unit 73E will be described later.

The previous value storage unit 73F receives a value of a flag F4 set by the determination unit 73G which will be described later and stores the received value of the flag F4. The determination unit 73G sets the value of the flag F4 at intervals of a predetermined operation cycle, and the value of the flag F4 stored in the previous value storage unit 73F is updated whenever the value of the flag F4 is set by the determination unit 73G. That is, the value of the flag F4 stored in the previous value storage unit 73F is a previous value of the value of the flag F4 (the value of the flag F4 one operation cycle ago) which is a current value set by the determination unit 73G.

The determination unit 73G determines whether the change per operation cycle of the corrected vehicle speed $V_c$ is to be limited, and sets the value of the flag F4 indicating a determination result thereof. The determination unit 73G receives the value of the flag F3 set by the determination unit 73A, the previous value of the corrected vehicle speed $V_c$ stored in the previous value storage unit 73B, the temporary vehicle speed value $V_{temp}$ selected by the switch 73C, and the previous value $F4_{n-1}$ of the flag F4 stored in the previous value storage unit 73F. The determination unit 73G sets the value of the flag F4 based on the value of the flag F3, the previous value of the corrected vehicle speed $V_c$, the temporary vehicle speed value $V_{temp}$, and the previous value $F4_{n-1}$ of the flag F4. This determination is specifically performed as follows.

When the value of the flag F3 set by the determination unit 73A changes from "1" to "0," that is, when the state in which the steering wheel 11 is being held at a constant steering angle $\theta_s$ changes to a state in which the steering wheel 11 is not held at the constant steering angle, the determination unit 73G sets the value of the flag F4 to "1."

Thereafter, the determination unit 73G sets the value of the flag F4 to "0" when the flowing Expression (A1) is satisfied. The determination unit 73G maintains the state in which the value of the flag F4 is set to "1" when the following Expression (A1) is not satisfied.

$$|V_{temp} - V_c| \leq V_{th} \tag{A1}$$

Here, "$V_{temp}$" is a temporary vehicle speed value selected by the switch 73C and "$V_c$" is a corrected vehicle speed calculated by the guard processing unit 73H. "$V_{th}$" is a vehicle speed threshold value and is a value serving as a reference for determining whether a difference between the vehicle speed V detected by the vehicle speed sensor and the corrected vehicle speed $V_c$ is a sufficiently small value. The vehicle speed threshold value $V_{th}$ is set based on a point of view for curbing rapid change of the target pinion angle $\theta_p^*$ based on a difference between a fixed vehicle speed and an actual vehicle speed when the steering state of the steering wheel 11 transitions from a held steering state to a non-held steering state.

In addition, when the value of the flag F3 has not changed from "1" to "0," that is, when the value of the flag F3 is "0" and when the value of the flag F3 has changed from "0" to "1," the determination unit 73G sets the value of the flag F4 to "0."

The guard processing unit 73H switches a limiting processing function for the temporary vehicle speed value $V_{temp}$ selected by the switch 73C between validation and invalidation based on the value of the flag F4 set by the determination unit 73G. When the value of the flag F4 is set to "1," that is, when the held steering state of the steering wheel 11 is released, the guard processing unit 73H validates the limiting processing function for the temporary vehicle speed value $V_{temp}$. The guard processing unit 73H limits the change per operation cycle of the temporary vehicle speed value $V_{temp}$ using the upper limit value $V_{UL}$ and the lower limit value $V_{LL}$. This operation is specifically performed as follows.

That is, when the change per operation cycle of the temporary vehicle speed value $V_{temp}$ is greater than the upper limit value $V_{UL}$, the change per operation cycle of the temporary vehicle speed value $V_{temp}$ is limited to the upper limit value $V_{UL}$. The temporary vehicle speed value $V_{temp}$ which has changed to correspond to the change limited to the upper limit value $V_{UL}$ is calculated as the corrected vehicle speed V. When the change per operation cycle of the temporary vehicle speed value $V_{temp}$ is less than the lower limit value $V_{LL}$, the change per operation cycle of the temporary vehicle speed value $V_{temp}$ is limited to the lower limit value $V_{LL}$. The temporary vehicle speed value $V_{temp}$ which has changed to correspond to the change limited to the lower limit value $V_{LL}$ is calculated as the corrected vehicle speed V. In this way, a maximum change and a minimum change of the temporary vehicle speed value $V_{temp}$ are determined by the upper limit value $V_{UL}$ and the lower limit value $V_{LL}$.

When the value of the flag F4 is set to "0," the guard processing unit 73H invalidates the limiting processing function for the temporary vehicle speed value $V_{temp}$. That is, the temporary vehicle speed value $V_{temp}$ selected by the switch 73C is calculated as the corrected vehicle speed $V_c$ without any change.

Figure 7:
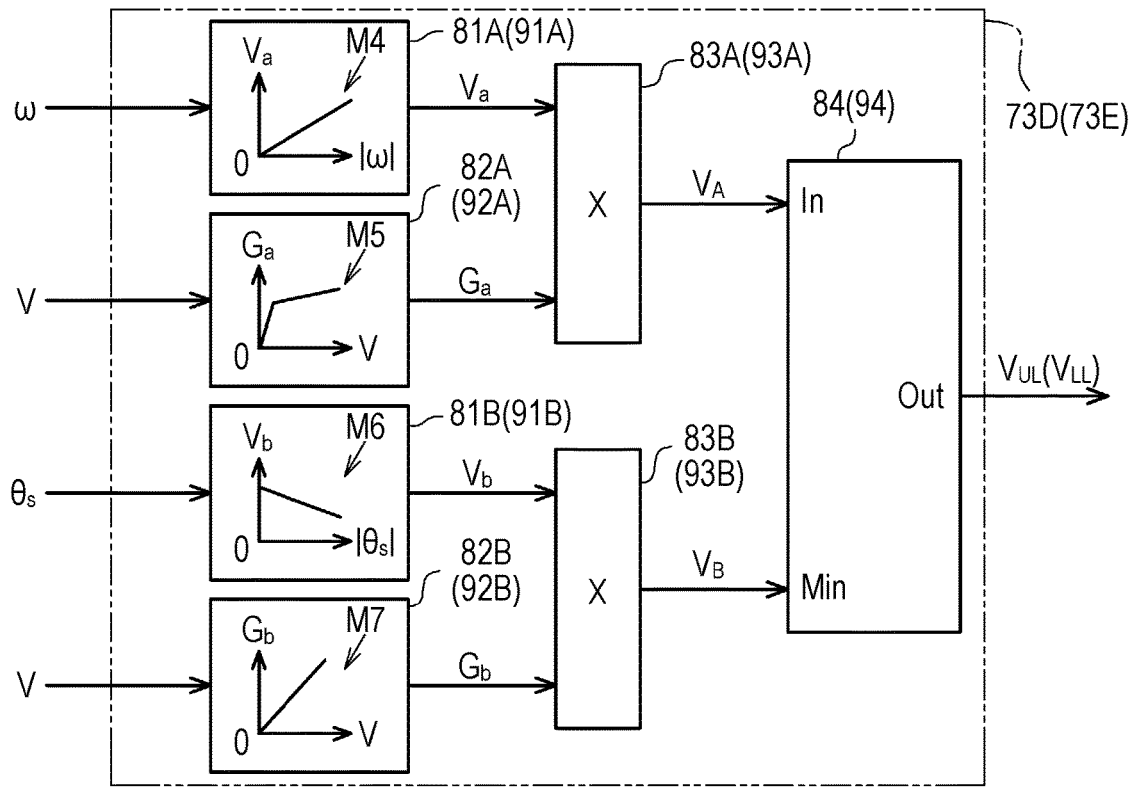
FIG. 7 is a block diagram illustrating an upper limit value calculating unit and a lower limit value calculating unit according to the first embodiment.

The upper limit value calculating unit 73D will be described below in detail. As illustrated in FIG. 7, the upper limit value calculating unit 73D includes two limit value calculating units 81A and 81B, two gain calculating units 82A and 82B, two multipliers 83A and 83B, and a selection processing unit 84.

The limit value calculating unit 81A calculates a limit value $V_a$ based on the steering angular velocity co calculated by the differentiator 71. The limit value calculating unit 81A calculates the limit value $V_a$ using a map M4 which is stored in the storage device of the control device 50. The map M4 is a two-dimensional map in which a relationship between the absolute value of the steering angular velocity co and the limit value $V_a$ is defined and has the following characteristics. That is, as the absolute value of the steering angular velocity co becomes larger, the value of the limit value $V_a$ becomes larger. In addition, the map M4 is set based on a point of view for more rapidly returning the value of the vehicle speed used to calculate the target pinion angle $\theta_p^*$ or the value of the steering angle ratio to a true value not having been subjected to the process of correcting the vehicle speed as the absolute value of the steering angular velocity co becomes larger.

The gain calculating unit 82A calculates a gain $G_a$ based on the vehicle speed V detected by the vehicle speed sensor 501. The gain calculating unit 82A calculates the gain $G_a$ using a map M5 which is stored in the storage device of the control device 50. The map M5 is a two-dimensional map in which a relationship between the vehicle speed V and the gain $G_a$ is defined and has the following characteristics. That is, when the vehicle speed V has a value in a very low speed area near "0," the value of the gain $G_a$ increases rapidly with an increase of the vehicle speed V. When the vehicle speed V has a value exceeding the very low speed area, the value of the gain $G_a$ increases slowly with an increase of the vehicle speed V.

The multiplier 83A calculates a pre-limit value $V_A$ by multiplying the limit value $V_a$ calculated by the limit value calculating unit 81A by the gain $G_a$ calculated by the gain calculating unit 82A. The limit value calculating unit 81B calculates a limit value $V_b$ based on the steering angle $\theta_s$ calculated by the steering angle calculating unit 51. The limit value calculating unit 81B calculates the limit value $V_b$ using a map M6 which is stored in the storage device of the control device 50. The map M6 is a two-dimensional map in which a relationship between the absolute value of the steering angle $\theta_s$ and the limit value $V_b$ is defined and has the following characteristics. That is, as the absolute value of the steering angle $\theta_s$ increases, the value of the limit value $V_b$ decreases slowly.

The gain calculating unit 82B calculates a gain $G_b$ based on the vehicle speed V detected by the vehicle speed sensor 501. The gain calculating unit 82B calculates the gain $G_b$ using a map M7 which is stored in the storage device of the control device 50. The map M7 is a two-dimensional map in which a relationship between the vehicle speed V and the gain $G_b$ is defined and has the following characteristics. That is, as the vehicle speed V increases with respect to "0," the value of the gain $G_b$ increases slowly. The map M7 is set based on a point of view for more rapidly returning the value of the vehicle speed used to calculate the target pinion angle $\theta_p^*$ or the value of the steering angle ratio to a true value not subjected to the process of correcting the vehicle speed as the value of the vehicle speed V becomes higher.

The multiplier 83B calculates a pre-limit value $V_B$ by multiplying the limit value $V_b$ calculated by the limit value calculating unit 81B by the gain $G_b$ calculated by the gain calculating unit 82B. The selection processing unit 84 calculates the upper limit value $V_{UL}$ by comparing the pre-limit value $V_A$ calculated by the multiplier 83A and the pre-limit value $V_B$ calculated by the multiplier 83B.

The selection processing unit 84 selects the pre-limit value $V_B$ as the upper limit value $V_{UL}$ when the pre-limit value $V_A$ is equal to or less than the pre-limit value $V_B$ as expressed by the following Expression (A2). In this case, the vehicle speed used to calculate the target pinion angle $\theta_p$ or the steering angle ratio is slowly returned to a true value not subjected to the process of correcting the vehicle speed with the elapse of time except when the value of the vehicle speed V is "0."

$$V_A \leq V_B \rightarrow V_{UL} = V_B \tag{A2}$$

The selection processing unit 84 selects the pre-limit value $V_A$ as the upper limit value $V_{UL}$ when the pre-limit value $V_A$ is greater than the pre-limit value $V_B$ as expressed by the following Expression (A3). In this case, the vehicle speed used to calculate the target pinion angle $\theta_p^*$ or the steering angle ratio is slowly returned to a true value not subjected to the process of correcting the vehicle speed with the elapse of time according to the steering angular velocity co except when the value of the vehicle speed V is "0."

$$V_A > V_B \rightarrow V_{UL} = V_A \tag{A3}$$

The lower limit value calculating unit 73E will be described below in detail. The lower limit value calculating unit 73E has the same configuration as the upper limit value calculating unit 73D. That is, as described in parentheses in FIG. 7, the lower limit value calculating unit 73E includes two limit value calculating units 91A and 91B, two gain calculating units 92A and 92B, two multipliers 93A and 93B, and a selection processing unit 94.

The limit value calculating unit 91A calculates a limit value $V_a$ based on the steering angular velocity co calculated by the differentiator 71. The gain calculating unit 92A calculates a gain $G_a$ based on the vehicle speed V detected by the vehicle speed sensor 501. The multiplier 93A calculates a pre-limit value $V_A$ by multiplying the limit value $V_a$ calculated by the limit value calculating unit 91A by the gain $G_a$ calculated by the gain calculating unit 92A.

The limit value calculating unit 91B calculates a limit value $V_b$ based on the steering angle $\theta_s$ calculated by the steering angle calculating unit 51. The gain calculating unit 92B calculates a gain $G_b$ based on the vehicle speed V detected by the vehicle speed sensor 501. The multiplier 93B calculates a pre-limit value $V_B$ by multiplying the limit value $V_b$ calculated by the limit value calculating unit 91B by the gain $G_b$ calculated by the gain calculating unit 92B.

The selection processing unit 94 selects the pre-limit value $V_B$ as the lower limit value $V_{LL}$ when the pre-limit value $V_A$ is equal to or less than the pre-limit value $V_B$ as expressed by the following Expression (A4). The selection processing unit 94 selects the pre-limit value $V_A$ as the lower limit value $V_{LL}$ when the pre-limit value $V_A$ is greater than the pre-limit value $V_B$ as expressed by the following Expression (A5).

$$V_A \leq V_B \rightarrow V_{LL} = V_B \tag{A4}$$

$$V_A > V_B \rightarrow V_{UL} = V_A \tag{A5}$$

Operations in the first embodiment will be described below.

When the vehicle is traveling straight ahead in a state in which the steering wheel 11 is being held at the neutral position, the value of the flag F3 is set to "0" by the determination unit 73A (see FIG. 6). Accordingly, in a period in which the vehicle is traveling straight ahead, the vehicle speed V detected by the vehicle speed sensor 501 is normally selected as the temporary vehicle speed value $V_{temp}$ by the switch 73C. When the value of the flag F3 is "0," the value of the flag F4 is set to "0" by the determination unit 73G. Accordingly, the limiting processing function for the temporary vehicle speed value $V_{temp}$ in the guard processing unit 73H is invalidated. As a result, the vehicle speed V detected by the vehicle speed sensor 501 is normally calculated as the corrected vehicle speed V. That is, when the vehicle is traveling straight ahead, the vehicle speed V detected by the vehicle speed sensor 501 is used to calculate the target pinion angle $\theta_p$. Here, when the steering wheel 11 is being held at the neutral position (the steering angle $\theta_s=0°$), the target pinion angle $\theta_p^*$ is set to "0°" corresponding to a neutral position (the turning angle $\theta_w=0°$) of the turning shaft 14 regardless of the value of the vehicle speed V. Accordingly, even when the vehicle speed V changes with deceleration or acceleration of the vehicle, a driver does not feel discomfort.

When the vehicle is turning while the steering wheel 11 is being steered, the value of the flag F3 is set to "0" by the determination unit 73A. Accordingly, in a period in which the steering wheel 11 is being steered, the vehicle speed V detected by the vehicle speed sensor 501 is selected as the temporary vehicle speed value $V_{temp}$ by the switch 73C. When the value of the flag F3 is "0," the value of the flag F4 is set to "0" by the determination unit 73G. Accordingly, the limiting processing function for the temporary vehicle speed value $V_{temp}$ in the guard processing unit 73H is invalidated. As a result, the vehicle speed V detected by the vehicle speed sensor 501 is normally calculated as the corrected vehicle speed $V_c$. That is, since the vehicle speed V detected by the vehicle speed sensor 501 is used to calculate the target pinion angle $\theta_p^*$, the value of the target pinion angle $\theta_p^*$ or the steering angle ratio changes with the change of the vehicle speed V due to deceleration or acceleration of the vehicle. When the steering wheel 11 is steered, a travel line of the vehicle changes from time to time with the change of the steering angle $\theta_s$. Accordingly, even when the steering wheel 11 is being steered and the steering angle ratio changes slightly with change of the vehicle speed V, a driver is not likely to be aware thereof and is less likely to feel discomfort.

When the vehicle is turning in a state in which the steering wheel 11 is being held at a constant steering angle $\theta_s$, the value of the flag F3 is set to "1." Accordingly, in a period in which the vehicle is turning in a state in which the steering wheel 11 is being held, the previous value $V_{cn-1}$ of the corrected vehicle speed $V_c$ stored in the previous value storage unit 73B is normally selected as the temporary vehicle speed value $V_{temp}$. When the vehicle is turning in a state in which the steering wheel 11 is being held, the value of the flag F4 is set to "1" by the determination unit 73G. Here, the limiting processing function of the guard processing unit 73H is maintained in an invalidated state.

Accordingly, the previous value $V_{cn-1}$ of the corrected vehicle speed $V_c$ stored in the previous value storage unit 73B is normally calculated as the corrected vehicle speed $V_c$. That is, regardless of the value of the actual vehicle speed V detected by the vehicle speed sensor 501, the value of the corrected vehicle speed $V_c$ which is the final vehicle speed used to calculate the target pinion angle $\theta_p^*$ does not change. Accordingly, when the vehicle is turning in a state in which the steering wheel 11 is being held, the value of the target pinion angle $\theta_p^*$ or the steering angle ratio does not change even if the vehicle starts its deceleration or acceleration.

Figure 8:
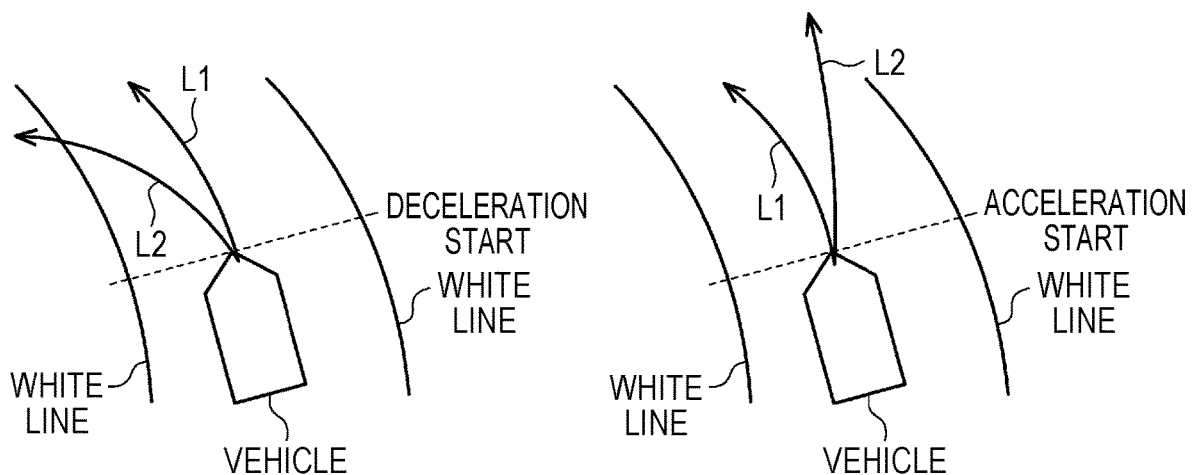
FIG. 8 is a diagram schematically illustrating a behavior of a vehicle in which the steering control device according to the first embodiment is mounted.

That is, as illustrated in the left part of FIG. 8, when the vehicle is turning (turning left herein) in a state in which the steering wheel 11 is being held at a constant steering angle $\theta_s$ and the vehicle starts its deceleration, the vehicle travels along a turning locus L1 which is intended by a driver. Accordingly, the driver does not feel discomfort.

When the value of the vehicle speed used to calculate the target pinion angle $\theta_p^*$ is not fixed, the target pinion angle $\theta_p^*$ increases with the decrease of the vehicle speed and thus an actual travel trajectory L2 of the vehicle changes such that the vehicle moves inward with respect to the turning locus L1 which is intended by a driver. In this regard, according to this embodiment, when the vehicle is turning in a state in which the steering wheel 11 is being held at a constant steering angle $\theta_s$, the value of the vehicle speed used to calculate the target pinion angle $\theta_p^*$ is fixed to the value of the vehicle speed when it is determined that the steering state of the steering wheel 11 is the held steering state and thus inward movement of the vehicle is curbed.

That is, as illustrated in the right part of FIG. 8, when the vehicle is turning (turning left herein) in a state in which the steering wheel 11 is being held at a constant steering angle $\theta_s$ and the vehicle starts its acceleration, the vehicle travels along a turning locus L1 which is intended by a driver. Accordingly, the driver does not feel discomfort.

When the value of the vehicle speed used to calculate the target pinion angle $\theta_p^*$ is not fixed, the target pinion angle $\theta_p^*$ decreases with the increase of the vehicle speed and thus an actual travel trajectory L2 of the vehicle changes such that it protrudes outward from the turning locus L1 which is intended by a driver. In this regard, according to this embodiment, when the vehicle is turning in a state in which the steering wheel 11 is being held at a constant steering angle $\theta_s$, the value of the vehicle speed used to calculate the target pinion angle $\theta_p^*$ is fixed to the value of the vehicle speed when it is determined that the steering state of the steering wheel 11 is the held steering state and thus protrusion of the vehicle is curbed.

When the vehicle is turning in a state in which the steering wheel 11 is being held at a constant steering angle $\theta_s$ and steering of the steering wheel 11 is restarted, the value of the flag F3 is set to "0" by the determination unit 73A. Accordingly, after the steering of the steering wheel 11 has been restarted, the vehicle speed V detected by the vehicle speed sensor 501 is selected as the temporary vehicle speed value $V_{temp}$ by the switch 73C. When the value of the flag F3 changes from "1" to "0," the value of the flag F4 is set to "1" by the determination unit 73G. Accordingly, the limiting processing function for the temporary vehicle speed value $V_{temp}$ in the guard processing unit 73H is validated. As a result, the change per operation cycle of the temporary vehicle speed value $V_{temp}$ or the corrected vehicle speed $V_c$ used to calculate the target pinion angle $\theta_p^*$ is limited to the upper limit value $V_{UL}$ or the lower limit value $V_{LL}$.

Here, it is conceivable that the vehicle speed used as the temporary vehicle speed value $V_{temp}$ immediately before the steering of the steering wheel 11 is restarted (that is, the corrected vehicle speed $V_c$ stored in the previous value storage unit 73B when it is determined that the steering wheel 11 is in a held steering state) and the vehicle speed V immediately after the steering of the steering wheel 11 has been restarted are different from each other. In this case, the target pinion angle $\theta_p{}^*$ based on the vehicle speed immediately before the steering of the steering wheel 11 is restarted and the target pinion angle $\theta_p{}^*$ based on the vehicle speed immediately after the steering of the steering wheel 11 has been restarted are also different from each other. Accordingly, when the vehicle speed V immediately after the steering of the steering wheel 11 has been restarted is immediately used, the target pinion angle $\theta_p{}^*$ or the turning angle $\theta_w$ of the turning wheels 16 may change rapidly.

In this regard, according to this embodiment, when the steering of the steering wheel 11 has been restarted, the change (a maximum change and a minimum change) per operation cycle of the temporary vehicle speed value $V_{temp}$ is limited to the upper limit value $V_{UL}$ or the lower limit value $V_{LL}$. Accordingly, it is possible to curb rapid change of the value of the corrected vehicle speed $V_c$ which is the final vehicle speed used to calculate the target pinion angle $\theta_p{}^*$. The value of the corrected vehicle speed $V_c$ changes slowly to the value of the vehicle speed V detected by the vehicle speed sensor 501 with the elapse of time according to the steering state (the steering angular velocity co and the steering angle $\theta_s$ herein) or the traveling state of the vehicle (the vehicle speed V herein). Accordingly, it is possible to curb rapid change of the target pinion angle $\theta_p{}^*$ or the turning angle $\theta_w$.

When the absolute value of a difference between the temporary vehicle speed value $V_{temp}$ (the vehicle speed V detected by the vehicle speed sensor 501 herein) and the corrected vehicle speed $V_c$ which is the final vehicle speed used to calculate the target pinion angle $\theta_p{}^*$ becomes equal to or less than the vehicle speed threshold value $V_{th}$, the value of the flag F4 is set to "0" by the determination unit 73G. Accordingly, the limiting processing function for the temporary vehicle speed value $V_{temp}$ in the guard processing unit 73H is invalidated. As a result, the vehicle speed V detected by the vehicle speed sensor 501 is used as the corrected vehicle speed $V_c$ to calculate the target pinion angle $\theta_p{}^*$ without any change. That is, a more appropriate target pinion angle $\theta_p{}^*$ based on the actual vehicle speed V is calculated based on the steering angle $\theta_s$.

Accordingly, according to the first embodiment, the following advantages can be obtained. When the vehicle is turning in a state in which the steering wheel 11 is being held at a constant steering angle $\theta_s$ (where $|\theta_s|>0$), the corrected vehicle speed $V_c$ which is the final vehicle speed used to calculate the target pinion angle $\theta_p{}^*$ is fixed to the vehicle speed immediately before it is determined that the steering state of the steering wheel 11 is the turning and held steering state. That is, regardless of the actual value of the vehicle speed V, the target pinion angle $\theta_p{}^*$ is maintained at a value corresponding to the steering angle $\theta_s$ when it is determined that the steering state of the steering wheel 11 is the turning and held steering state. Accordingly, even when the vehicle speed V changes while the vehicle is turning in a state in which the steering wheel 11 is being held at a constant steering angle $\theta_s$, the turning angles $\theta_w$ and $\theta_w$ of the turning wheels 16 and 16 or the steering angle ratio does not change with the change of the vehicle speed V.

Accordingly, when the vehicle is decelerated while the vehicle is turning in a state in which the steering wheel 11 is being held at a constant steering angle $\theta_s$, the actual travel trajectory L2 of the vehicle is prevented from changing such that the vehicle moves inward with respect to the turning locus L1 which is intended by a driver. When the vehicle is accelerated while the vehicle is turning in a state in which the steering wheel 11 is being held, the actual travel trajectory L2 of the vehicle is prevented from protruding outward from the turning locus L1 which is intended by a driver. Accordingly, when the vehicle speed changes while the vehicle is turning in a state in which the steering wheel 11 is being held at a constant steering angle $\theta_s$, it is possible to curb change of a vehicle behavior which is not intended by a driver.

When the steering of the steering wheel 11 is restarted while the vehicle is turning in a state in which the steering wheel 11 is being held at a constant steering angle $\theta_s$, the state in which the value of the vehicle speed is fixed is released and the actual vehicle speed V detected by the vehicle speed sensor 501 is used to calculate the target pinion angle $\theta_p$. At this time, the change per operation cycle of the corrected vehicle speed $V_c$ which is the final vehicle speed to calculate the target pinion angle $\theta_p{}^*$ is limited by the upper limit value $V_{UL}$ and the lower limit value $V_{LL}$ by the guard processing unit 73H.

Accordingly, even when the value of the vehicle speed which is fixed immediately before the steering of the steering wheel 11 is restarted (the corrected vehicle speed $V_c$ stored in the previous value storage unit 73B) becomes different from the value of the vehicle speed V immediately after the steering of the steering wheel 11 has been restarted, the value of the corrected vehicle speed $V_c$ changes slowly to the value of the vehicle speed V detected by the vehicle speed sensor 501. That is, since rapid change of the value of the corrected vehicle speed $V_c$ is curbed, rapid change of the target pinion angle $\theta_p{}^*$ or the turning angles $\theta_w$ and $\theta_w$ of the turning wheels 16 and 16 is also curbed.

In this embodiment, when the steering of the steering wheel 11 is restarted, a so-called temporal change guarding process of limiting the change per operation cycle of the corrected vehicle speed $V_c$ to a value between the upper limit value $V_{UL}$ and the lower limit value $V_{LL}$ is performed, but an offset process may be employed instead of the change guarding process. For example, when the steering of the steering wheel 11 is restarted, a difference between the current value and the previous value of the corrected vehicle speed $V_c$ is set as an offset value for the corrected vehicle speed $V_c$ and the offset value is slowly changed with time to "0."

Second Embodiment

A steering control device according to a second embodiment will be described below. This embodiment basically employs the same configuration as in the first embodiment illustrated in FIGS. 1 to 7. This embodiment is different from the first embodiment in the method of calculating a steering angle in the control device 50.

Figure 9:
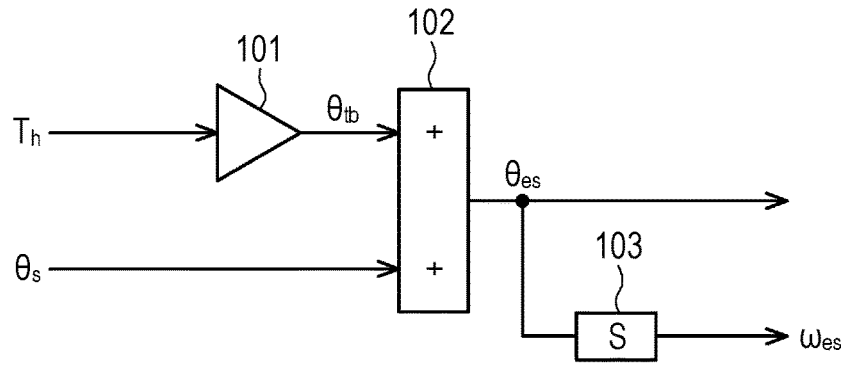
FIG. 9 is a block diagram illustrating a principal part of a control device according to a second embodiment.

As illustrated in FIG. 9, the control device 50 includes a divider 101, an adder 102, and a differentiator 103. The divider 101 receives a steering torque $T_h$ detected by the torque sensor 34. The divider 101 calculates a torsion angle $\theta_{tb}$ of a torsion bar which is a constituent of the torque sensor 34 by dividing the steering torque $T_h$ by a coefficient of torsion rigidity of the torsion bar.

The adder 102 calculates an estimated steering angle $\theta_{es}$ by adding the torsion angle $\theta_{tb}$ of the torsion bar calculated by the divider 101 to the steering angle $\theta_s$ calculated by the steering angle calculating unit 51.

The differentiator 103 calculates an estimated steering angular velocity $\omega_{es}$ by differentiating the estimated steering angle $\theta_{es}$ calculated by the adder 102. For example, the target pinion angle calculating unit 62 performs a process of correcting the vehicle speed V and a process of calculating the target pinion angle $\theta_p^*$ using the estimated steering angle $\theta_{es}$ instead of the steering angle $\theta_s$ calculated by the steering angle calculating unit 51 and using the estimated steering angular velocity $\omega_{es}$ instead of the steering angular velocity ω calculated by the differentiator 71.

Accordingly, according to the second embodiment, the following advantages can be obtained in addition to the same advantages as in the first embodiment. As described above, when steering of the steering wheel 11 is restarted while the vehicle is turning in the state in which the steering wheel 11 is being held at a constant steering angle $\theta_s$, the state in which the value of the vehicle speed is fixed is released. At this time, the value of the corrected vehicle speed $V_c$ which is the final vehicle speed used to calculate the target pinion angle $\theta_p^*$ changes slowly to the value of the vehicle speed V detected by the vehicle speed sensor 501 with the elapse of time according to the steering state. Here, the steering angle $\theta_s$ and the steering angular velocity ω are used as state variables indicating the steering state in the first embodiment, but the estimated steering angle $\theta_{es}$ and the estimated steering angular velocity $\omega_{es}$ calculated based on the steering torque $T_h$ are used in this embodiment. Accordingly, it is possible to improve responsiveness when the value of the corrected vehicle speed $V_c$ which is the final vehicle speed used to calculate the target pinion angle $\theta_p^*$ is returned to the value of the vehicle speed V detected by the vehicle speed sensor 501. The reason thereof is as follows. That is, although an amount of steering of the steering wheel 11 is small, the amount of steering is immediately detected as a change of the steering torque $T_h$ by which the steering wheel 11 is steered. On the other hand, the steering angle $\theta_s$ is calculated based on the rotation angle $\theta_a$ of the reaction motor 31, and a time point at which the steering wheel 11 has been steered and a time point at which the amount of steering of the steering wheel 11 is reflected in the rotation angle $\theta_a$ of the reaction motor 31 and is calculated as the steering angle $\theta_s$ have a slight time lag therebetween. Accordingly, responsiveness of the steering torque $T_h$ with respect to the steering of the steering wheel 11 is thought to be higher than the responsiveness of the steering angle $\theta_s$ with respect to the steering of the steering wheel 11.

Third Embodiment

A steering control device according to a third embodiment will be described below. This embodiment is different from the first embodiment in the method of calculating the target pinion angle $\theta_p^*$. This embodiment may be applied to the aforementioned second embodiment.

Figure 10:
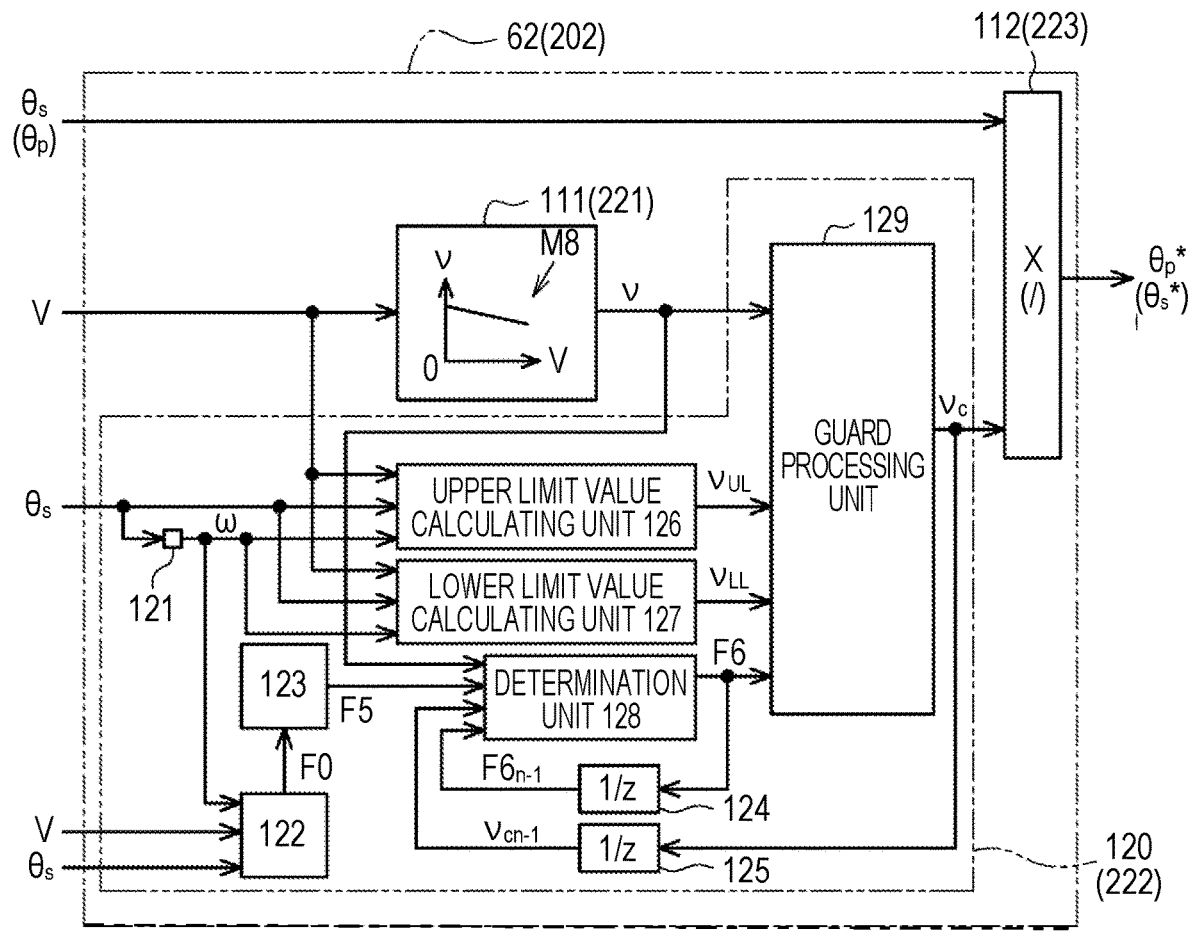
FIG. 10 is a block diagram illustrating a target pinion angle calculating unit according to a third embodiment.

As illustrated in FIG. 10, the target pinion angle calculating unit 62 includes a speed increasing ratio calculating unit 111 and a multiplier 112. The speed increasing ratio calculating unit 111 calculates a speed increasing ratio ν based on the vehicle speed V detected by the vehicle speed sensor 501. The speed increasing ratio calculating unit 111 calculates the speed increasing ratio ν using a map M8 which is stored in the storage device of the control device 50. The map M8 is a two-dimensional map in which a relationship between the vehicle speed V and the speed increasing ratio ν is defined, and has the following characteristics. That is, the value of the speed increasing ratio ν decreases slowly as the value of the vehicle speed V increases.

The multiplier 112 calculates the target pinion angle $\theta_p^*$ by multiplying the steering angle $\theta_s$ calculated by the steering angle calculating unit 51 by the speed increasing ratio ν calculated by the speed increasing ratio calculating unit 111.

Accordingly, since the speed increasing ratio becomes larger as the vehicle speed V becomes lower, the turning angles $\theta_w$ and $\theta_w$ of the turning wheels 16 and 16 when the steering wheel 11 is operated change more rapidly. Since the speed increasing ratio becomes smaller as the vehicle speed V becomes higher, the turning angles $\theta_w$ and $\theta_w$ of the turning wheels 16 and 16 when the steering wheel 11 is operated change more slowly.

Here, when the speed increasing ratio ν changes according to the vehicle speed V, there is the following concern similarly to the first embodiment. That is, for example, it is conceivable that the vehicle is decelerated or accelerated in a state in which the vehicle is turning. In this case, since the speed increasing ratio ν changes with change of the vehicle speed V, the turning angles $\theta_w$ and $\theta_w$ of the turning wheels 16 and 16 also change according to the vehicle speed V. Accordingly, similarly to the first embodiment, there is concern about change of a steering behavior which is not intended by a driver.

Therefore, in this embodiment, the following configuration is employed as the target pinion angle calculating unit 62. As illustrated in FIG. 10, the target pinion angle calculating unit 62 includes a correction processing unit 120. The correction processing unit 120 corrects the speed increasing ratio ν detected by the speed increasing ratio calculating unit 111 according to the steering state of the steering wheel 11.

The correction processing unit 120 includes a differentiator 121, a held steering determining unit 122, a determination unit 123, two previous value storage units 124 and 125, an upper limit value calculating unit 126, a lower limit value calculating unit 127, a determination unit 128, and a guard processing unit 129.

The differentiator 121 calculates the steering angular velocity ω by differentiating the steering angle $\theta_s$ calculated by the steering angle calculating unit 51. The held steering determining unit 122 has the same function as the held steering determining unit 72 according to the first embodiment illustrated in FIG. 5. The held steering determining unit 122 determines whether the steering state of the steering wheel 11 is a held steering state based on the vehicle speed V detected by the vehicle speed sensor 501, the steering angle $\theta_s$ calculated by the steering angle calculating unit 51, and the steering angular velocity ω calculated by the differentiator 71. When it is determined that the steering state of the steering wheel 11 is the held steering state, the held steering determining unit 122 sets the value of the flag F0 to "1." When it is determined that the steering state of the steering wheel 11 is not the held steering state, the held steering determining unit 122 sets the value of the flag F0 to "0."

The determination unit 123 has the same function as the determination unit 73A according to the first embodiment illustrated in FIG. 6. Here, the determination unit 123 receives the value of the flag F0 set by the held steering determining unit 122, and sets a value of a flag F5 indicating whether change of the speed increasing ratio ν with change of the vehicle speed V is to be limited according to the received value of the flag F0. When the value of the flag F0 is "1," that is, when the steering wheel 11 is in the held steering state, the determination unit 123 determines that the change of the speed increasing ratio ν with the change of the vehicle speed V is to be limited and sets the value of the flag F5 to "1." When the value of the flag F0 is "0," that is, when the steering wheel 11 is not in the held steering state, the determination unit 123 determines that the change of the speed increasing ratio ν with the change of the vehicle speed V is not to be limited and sets the value of the flag F5 to "0."

The previous value storage unit 124 receives a value of a flag F6 which is set by the determination unit 128 and stores the received value of flag F6. The value of the flag F6 stored in the previous value storage unit 124 is a previous value of a current value of the flag F6 set by the determination unit 128.

The previous value storage unit 125 receives a corrected speed increasing ratio $v_c$ calculated by the guard processing unit 129 which will be described later, and stores the received corrected speed increasing ratio $v_c$. The corrected speed increasing ratio $v_c$ stored in the previous value storage unit 125 is a previous value of a current value of the corrected speed increasing ratio $v_c$ calculated by the guard processing unit 129.

The upper limit value calculating unit 126 has the same function as the upper limit value calculating unit 73D according to the first embodiment illustrated in FIG. 6. Here, the upper limit value calculating unit 126 receives the vehicle speed V detected by the vehicle speed sensor 501, the steering angle $\theta_s$ calculated by the steering angle calculating unit 51, and the steering angular velocity $\omega$ calculated by the differentiator 121, and calculates an upper limit value $v_{UL}$ for a change per operation cycle of the speed increasing ratio v based on the vehicle speed V, the steering angle $\theta_s$, and the steering angular velocity $\omega$ which are received.

The lower limit value calculating unit 127 has the same function as the lower limit value calculating unit 73E according to the first embodiment illustrated in FIG. 6. Here, the lower limit value calculating unit 127 receives the vehicle speed V detected by the vehicle speed sensor 501, the steering angle $\theta_s$ calculated by the steering angle calculating unit 51, and the steering angular velocity $\omega$ calculated by the differentiator 121, and calculates a lower limit value $v_{LL}$ for the change per operation cycle of the speed increasing ratio v based on the vehicle speed V, the steering angle $\theta_s$, and the steering angular velocity $\omega$ which are received.

The determination unit 128 has the same function as the determination unit 73G according to the first embodiment illustrated in FIG. 6. Here, the determination unit 128 determines whether the change per operation cycle of the speed increasing ratio v is to be limited, and sets the value of the flag F6 indicating a determination result thereof. The determination unit 128 receives the value of the flag F5 set by the determination unit 123, the previous value $v_{cn-1}$ of the corrected speed increasing ratio $v_c$ stored in the previous value storage unit 125, the speed increasing ratio v calculated by the speed increasing ratio calculating unit 111, and a previous value F$6_{n-1}$ of the flag F6 stored in the previous value storage unit 124. The determination unit 128 sets the value of the flag F6 based on the value of the flag F5, the previous value $v_{cn-1}$ of the corrected speed increasing ratio $v_c$, the speed increasing ratio v, and the previous value F$6_{n-1}$ of the flag F6. This operation is specifically performed as follows.

When a state in which the value of the flag F5 is set to "0" is maintained, that is, when the steering state of the steering wheel 11 is not held at a constant steering angle $\theta_s$, the determination unit 128 sets the value of the flag F6 is "0." When the value of the flag F5 changes from "0" to "1," that is, when the steering state of the steering wheel 11 changes from a state in which it is not held at a constant steering angle $\theta_s$ to a state in which it is being held at the constant steering angle $\theta_s$, the determination unit 128 sets the value of the flag F6 to "1." When the value of the flag F5 changes from "1" to "0," that is, when the steering state of the steering wheel 11 changes from a state in which it is being held at a constant steering angle $\theta_s$ to a state in which it is not held at the constant steering angle $\theta_s$, the determination unit 128 also sets the value of the flag F6 to "1."

When the following Expression (A6) is satisfied after the value of the flag F5 has changed from "1" to "0," the determination unit 128 sets the value of the flag F6 to "0." When the following Expression (A6) is not satisfied, the determination unit 128 maintains the state in which the value of the flag F6 is set to "1."

$$|v-v_c| \le v_{th} \quad (A6)$$

Here, "v" is a speed increasing ratio calculated by the speed increasing ratio calculating unit 111 and "$v_c$" is a corrected speed increasing ratio calculated by the guard processing unit 129. "$v_{th}$" is a speed increasing ratio threshold value and is a value serving as a reference for determining whether a difference between the speed increasing ratio v calculated by the speed increasing ratio calculating unit 111 and the corrected speed increasing ratio $v_c$ is sufficiently small. The speed increasing ratio threshold value $v_{th}$ is set based on a point of view for curbing rapid change of the target pinion angle $\theta_p$ based on the difference between the corrected speed increasing ratio $v_c$ calculated by the guard processing unit 129 and the actual speed increasing ratio v calculated by the speed increasing ratio calculating unit 111 when the steering state of the steering wheel 11 transitions from a held steering state to a non-held steering state.

The guard processing unit 129 has the same function as the guard processing unit 73H according to the first embodiment illustrated in FIG. 6. Here, the guard processing unit 129 switches the limiting processing function for the speed increasing ratio v calculated by the speed increasing ratio calculating unit 111 between validation and invalidation according to the value of the flag F6 set by the determination unit 128. When the value of the flag F6 is set to "1," the guard processing unit 129 validates the limiting processing function for the speed increasing ratio v. The guard processing unit 129 limits the change per operation cycle of the speed increasing ratio v using the upper limit value $v_{UL}$ calculated by the upper limit value calculating unit 126 and the lower limit value $v_{LL}$ calculated by the lower limit value calculating unit 127. This operation is specifically performed as follows.

That is, when the change per operation cycle of the speed increasing ratio v is greater than the upper limit value $v_{UL}$, the change per operation cycle of the speed increasing ratio v is limited to the upper limit value $v_{UL}$. The speed increasing ratio v changing by the change limited to the upper limit value $v_{UL}$ is calculated as the corrected speed increasing ratio $v_c$. When the change per operation cycle of the speed increasing ratio v is less than the lower limit value $v_{LL}$, the change per operation cycle of the speed increasing ratio v is limited to the lower limit value $v_{LL}$. The speed increasing ratio v changing by the change limited to the lower limit value $v_{LL}$ is calculated as the corrected speed increasing ratio $v_c$. In this way, a maximum change and a minimum change of the speed increasing ratio v are determined by the upper limit value $v_{UL}$ and the lower limit value $v_{LL}$.

When the value of the flag F6 is set to "0," the guard processing unit 129 invalidates the limiting processing function for the speed increasing ratio v. That is, the speed increasing ratio v calculated by the speed increasing ratio calculating unit 111 is calculated as the corrected speed increasing ratio $v_c$ without any change.

Operations of the third embodiment will be described below. When the vehicle travels straight ahead in a state in which the steering wheel 11 is being held at the neutral position, the value of the flag F5 is set to "0" by the determination unit 123. When the value of the flag F5 changes from "0," the value of the flag F6 is set to "0" by the determination unit 128. Accordingly, the limiting processing function for the speed increasing ratio ν in the guard processing unit 129 is invalidated. As a result, the speed increasing ratio ν calculated by the speed increasing ratio calculating unit 111 is used as the corrected speed increasing ratio $v_c$. That is, when the vehicle travels straight ahead, the speed increasing ratio ν calculated by the speed increasing ratio calculating unit 111 is used to calculate the target pinion angle $\theta_p^*$. When the steering wheel 11 is being held at the neutral position (at the steering angle $\theta_s=0°$), the target pinion angle $\theta_p^*$ is set to "0°" which corresponds to the neutral position (at the turning angle $\theta_w=0°$) of the turning shaft 14 regardless of the value of the vehicle speed V and the value of the speed increasing ratio ν. Accordingly, even when the vehicle speed V changes with deceleration or acceleration of the vehicle, a driver does not feel discomfort.

When the vehicle is turning while the steering wheel 11 is being steered, the value of the flag F5 is set to "0" by the determination unit 123. When the value of the flag F5 is "0," the value of the flag F6 is set to "0" by the determination unit 128. Accordingly, the limiting processing function for the speed increasing ratio ν in the guard processing unit 129 is invalidated. As a result, the speed increasing ratio ν calculated by the speed increasing ratio calculating unit 111 is calculated as the corrected speed increasing ratio $v_c$. That is, since the speed increasing ratio ν calculated by the speed increasing ratio calculating unit 111 is used to calculate the target pinion angle $\theta_p^*$ as the corrected speed increasing ratio $v_c$, the value of the speed increasing ratio ν or the target pinion angle $\theta_p^*$ changes with the change of the vehicle speed V due to deceleration or acceleration of the vehicle. When the steering wheel 11 is being steered, a travel line of the vehicle changes from time to time with the change of the steering angle $\theta_s$. Accordingly, even when the steering wheel 11 is being steered and the steering angle ratio changes slightly with the change of the vehicle speed V, a driver is not likely to be aware thereof and is less likely to feel discomfort.

When the vehicle is turning in a state in which the steering wheel 11 is being held at a constant steering angle $\theta_s$, the value of the flag F5 is set to "1" by the determination unit 123. When the value of the flag F5 changes from "0" to "1," the value of the flag F6 is set to "1" by the determination unit 128. Accordingly, the limiting processing function for the speed increasing ratio ν in the guard processing unit 129 is validated. As a result, the change of per operation cycle of the speed increasing ratio ν is limited to the upper limit value $v_{UL}$ calculated by the upper limit value calculating unit 126 or the lower limit value $v_{LL}$ calculated by the lower limit value calculating unit 127. For example, it is conceivable that the value of the speed increasing ratio ν calculated by the speed increasing ratio calculating unit 111 changes rapidly with the change of the vehicle speed V due to deceleration or acceleration of the vehicle. In this case, when the change per operation cycle of the speed increasing ratio ν becomes greater than the upper limit value $v_{UL}$, the change per operation cycle of the speed increasing ratio ν is limited to the upper limit value $v_{UL}$ or the lower limit value $v_w$. That is, the change per operation cycle of the corrected speed increasing ratio $v_c$ which is the final speed increasing ratio used to calculate the target pinion angle $\theta_p^*$ does not exceed the upper limit value $v_{UL}$. Accordingly, it is possible to curb rapid change of the value of the corrected speed increasing ratio $v_c$ or the value of the target pinion angle $\theta_p^*$ with the change of the vehicle speed V.

Accordingly, as illustrated in the left part of FIG. 8, when deceleration of the vehicle is started while the vehicle is turning in a state in which the steering wheel 11 is being held, an actual travel trajectory L2 of the vehicle is prevented from changing such that the vehicle moves inward with respect to the turning locus L1 which is intended by a driver. That is, the vehicle can travel without departing greatly from the turning locus L1 which is intended by a driver. As illustrated in the right part of FIG. 8, when acceleration of the vehicle is started while the vehicle is turning in a state in which the steering wheel 11 is being held, an actual travel trajectory L2 of the vehicle is prevented from changing such that the vehicle protrudes outward from the turning locus L1 which is intended by a driver. That is, the vehicle can travel without departing greatly from the turning locus L1 which is intended by a driver.

Then, when the steering of the steering wheel 11 is restarted while the vehicle is turning in a state in which the steering wheel 11 is being held, the value of the flag F5 is set to "0" by the determination unit 123. When the value of the flag F5 changes from "1" to "0," the determination unit 128 maintains the state in which the value of the flag F6 is set to "1." Accordingly, the limiting processing function for the speed increasing ratio ν in the guard processing unit 129 is kept validated. Accordingly, the change per operation cycle of the corrected speed increasing ratio $v_c$ which is the final speed increasing ratio used to calculate the target pinion angle $\theta_p^*$ is limited to the upper limit value $v_{UL}$ or the lower limit value $v_{LL}$.

Here, it is conceivable that the speed increasing ratio ν based on the vehicle speed V immediately before the steering of the steering wheel 11 is restarted becomes different from the speed increasing ratio ν based on the vehicle speed V immediately after the steering of the steering wheel 11 is restarted. In this case, the target pinion angle $\theta_p^*$ based on the speed increasing ratio ν immediately before the steering of the steering wheel 11 is restarted also becomes different from the target pinion angle $\theta_p^*$ based on the speed increasing ratio ν immediately after the steering of the steering wheel 11 is restarted. Accordingly, when the target pinion angle $\theta_p^*$ is calculated immediately using the speed increasing ratio ν based on the vehicle speed V immediately after the steering of the steering wheel 11 is restarted, there is concern about rapid change of the value of the target pinion angle $\theta_p^*$ or the turning angle $\theta_w$ of the turning wheels 16.

In this regard, in this embodiment, when the steering of the steering wheel 11 is restarted, the change per operation cycle of the speed increasing ratio ν is limited to the upper limit value $v_{UL}$ or the lower limit value $v_{LL}$. Accordingly, it is possible to curb rapid change of the value of the final corrected speed increasing ratio $v_c$ used to calculate the target pinion angle $\theta_p^*$. The value of the corrected speed increasing ratio $v_c$ changes slowly with time to the speed increasing ratio ν calculated by the speed increasing ratio calculating unit 111 according to the steering state (the steering angular velocity ω and the steering angle $\theta_s$ herein) or the traveling state of the vehicle (the vehicle speed V herein). Accordingly, it is possible to curb rapid change of the target pinion angle $\theta_p^*$ or the turning angle $\theta_w$.

When the absolute value of the difference between the speed increasing ratio ν calculated by the speed increasing ratio calculating unit 111 and the corrected speed increasing ratio $v_c$ limited by the guard processing unit 129 is equal to or less than the speed increasing ratio threshold value $v_{th}$, the value of the flag F6 is set to "0" by the determination unit 128. Accordingly, the limiting processing function for the speed increasing ratio ν in the guard processing unit 129 is invalidated. As a result, the speed increasing ratio ν calculated by the speed increasing ratio calculating unit 111 is used as the corrected speed increasing ratio $ν_c$ which is the final speed increasing ratio to calculate the target pinion angle $θ_p$* without any change. That is, it is possible to calculate a more appropriate target pinion angle $θ_p$* corresponding to the speed increasing ratio ν based on the vehicle speed V.

Accordingly, according to the third embodiment, the following advantages can be obtained in addition to the same advantages as in the first embodiment. The target pinion angle $θ_p$* can be calculated using the steering angle $θ_s$ calculated by the steering angle calculating unit 51 and the speed increasing ratio ν calculated according to the vehicle speed V. Depending on product specifications or the like, it is conceivable that the target pinion angle $θ_p$* is requested to be calculated without using the map M1 in which the relationship between the steering angle $θ_s$ and the target pinion angle $θ_p$* is defined according to the vehicle speed V, and this request can be satisfied.

Fourth Embodiment

A steering control device according to a fourth embodiment will be described below. This embodiment is different from the first embodiment in the configuration of the correction processing unit that corrects the vehicle speed V. This embodiment may be applied to the second or third embodiment described above.

Figure 11:
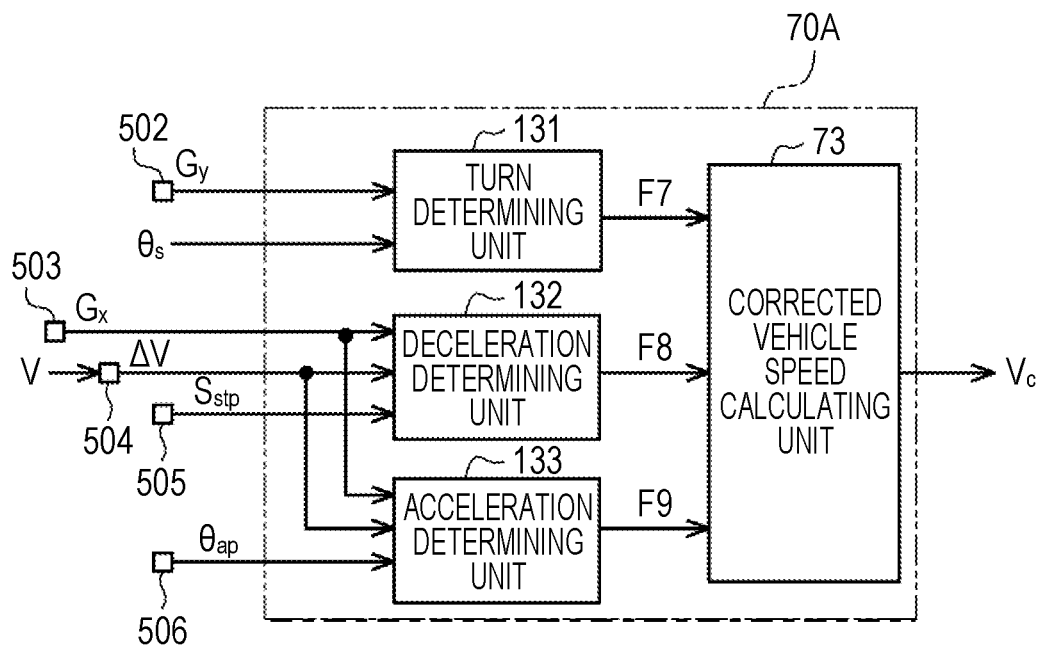
FIG. 11 is a block diagram illustrating a correction processing unit according to a fourth embodiment.

As illustrated in FIG. 11, the correction processing unit 70A of the target pinion angle calculating unit 62 includes a turn determining unit 131, a deceleration determining unit 132, and an acceleration determining unit 133 instead of the held steering determining unit 72.

The turn determining unit 131 receives a lateral acceleration $G_y$ detected by a lateral acceleration sensor 502 which is mounted in the vehicle and the steering angle $θ_s$ calculated by the steering angle calculating unit 51, and determines whether the vehicle is turning based on the received lateral acceleration $G_y$ and the received steering angle $θ_s$. The lateral acceleration $G_y$ is an acceleration in a lateral direction with respect to the traveling direction of the vehicle when the vehicle is turning. The turn determining unit 131 sets a value of a flag F7 as a turning determination result indicating whether the vehicle is turning. When it is determined that the vehicle is turning, the turn determining unit 131 sets the value of the flag F7 to "1." When it is determined that the vehicle is not turning, the turn determining unit 131 sets the value of the flag F7 to "0." Details of the turn determining unit 131 will be described later.

The deceleration determining unit 132 receives a longitudinal acceleration $G_x$ detected by a longitudinal acceleration sensor 503 which is mounted in the vehicle, a vehicle speed change per unit time ΔV which is calculated by a vehicle speed change calculating unit 504 which is provided in the control device 50, and a stop lamp signal $S_{stp}$ which is generated by a stop lamp switch 505 which is mounted in the vehicle. The longitudinal acceleration $G_x$ is an acceleration in a longitudinal direction with respect to the traveling direction of the vehicle. The stop lamp signal $S_{stp}$ is an electrical signal indicating whether a stop lamp provided in the rear part of the vehicle is turned on, that is, a driver's intention of deceleration. The deceleration determining unit 132 determines whether the vehicle is decelerating based on the longitudinal acceleration $G_x$, the vehicle speed change ΔV, and the stop lamp signal $S_{stp}$. The deceleration determining unit 132 sets a value of a flag F8 as a deceleration determination result indicating whether the vehicle is decelerating. When it is determined that the vehicle is decelerating, the deceleration determining unit 132 sets the value of the flag F8 to "1." When it is determined that the vehicle is not decelerating, the deceleration determining unit 132 sets the value of the flag F8 to "0." Details of the deceleration determining unit 132 will be described later.

The acceleration determining unit 133 receives the longitudinal acceleration $G_x$ detected by the longitudinal acceleration sensor 503, the vehicle speed change per unit time ΔV calculated by the vehicle speed change calculating unit 504, and an acceleration operation amount $θ_{ap}$ which is detected by an accelerator position sensor 506 which is mounted in the vehicle. The acceleration determining unit 133 determines whether the vehicle is accelerating based on the longitudinal acceleration $G_x$, the vehicle speed change ΔV, and the acceleration operation amount $θ_{ap}$. The acceleration operation amount $θ_{ap}$ is an amount of operation of an accelerator pedal and indicates a driver's intention of acceleration. The acceleration determining unit 133 sets a value of a flag F9 as an acceleration determination result indicating whether the vehicle is accelerating. When it is determined that the vehicle is accelerating, the acceleration determining unit 133 sets the value of the flag F9 to "1." When it is determined that the vehicle is not accelerating, the acceleration determining unit 133 sets the value of the flag F9 to "0." Details of the acceleration determining unit 133 will be described later.

The corrected vehicle speed calculating unit 73 receives the value of the flag F7 which is the turn determination result, the value of the flag F8 which is the deceleration determination result, and the value of the flag F9 which is the acceleration determination result. As described in parentheses in FIG. 6, the determination unit 73A of the corrected vehicle speed calculating unit 73 sets the value of the flag F3 indicating whether the value of the vehicle speed V used to calculate the target pinion angle $θ_p$* is to be fixed based on the value of the flag F7, the value of the flag F8, and the value of the flag F9.

When the value of the flag F7 is "0," that is, when the vehicle is not turning, the determination unit 73A determines that the value of the vehicle speed V is not to be fixed, and sets the value of the flag F3 to "0" regardless of the values of the flags F8 and F9. Accordingly, the vehicle speed V detected by the vehicle speed sensor 501 is used as the final vehicle speed used to calculate the target pinion angle $θ_p$*.

When the value of the flag F7 is 1" and the value of the flag F8 is "1," that is, when the vehicle is decelerating while turning, the determination unit 73A determines that the value of the vehicle speed V is to be fixed, and sets the value of the flag F3 to "1." Accordingly, the value of the corrected vehicle speed $V_c$ which is the final vehicle speed used to calculate the target pinion angle $θ_p$* is fixed to the previous value $V_{cn-1}$ of the corrected vehicle speed $V_c$ stored in the previous value storage unit 73B.

When the value of the flag F7 is "1" and the value of the flag F9 is "1," that is, when the vehicle is accelerating while turning, the determination unit 73A determines that the value of the vehicle speed V is to be fixed, and sets the value of the flag F3 to "1." Accordingly, the value of the corrected vehicle speed $V_c$ which is the final vehicle speed used to calculate the target pinion angle $θ_p$* is fixed to the previous value $V_{cn-1}$ of the corrected vehicle speed $V_c$ stored in the previous value storage unit 73B.

Figure 12:
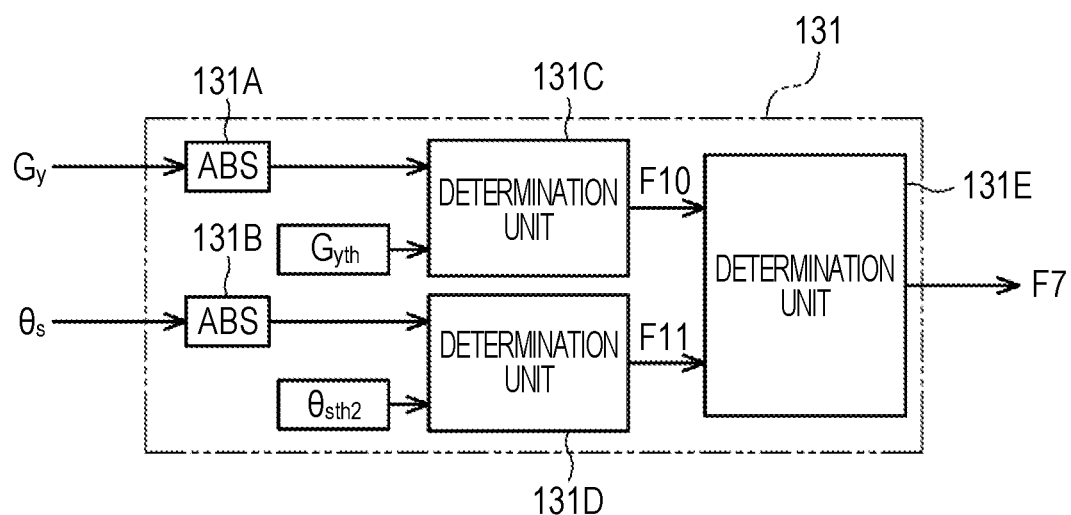
FIG. 12 is a block diagram illustrating a turn determining unit according to the fourth embodiment.

The turn determining unit 131 will be described below in detail. As illustrated in FIG. 12, the turn determining unit 131 includes two absolute value calculating units 131A and 131B and three determination units 131C, 131D, and 131E.

The absolute value calculating unit 131A calculates the absolute value of the lateral acceleration $G_y$ calculated by the lateral acceleration sensor 502. The absolute value calculating unit 131B calculates the absolute value of the steering angle $\theta_s$ calculated by the steering angle calculating unit 51.

The determination unit 131C receives the absolute value of the lateral acceleration $G_y$ calculated by the absolute value calculating unit 131A and a lateral acceleration threshold value $G_{yth}$ stored in the storage device of the control device 50. The lateral acceleration threshold value $G_{yth}$ is set based on a point of view for determining whether the vehicle is turning. The determination unit 131C compares the absolute value of the lateral acceleration $G_y$ with the lateral acceleration threshold value $G_{yth}$ and sets a value of a flag F10 based on the comparison result. When the absolute value of the lateral acceleration $G_y$ is less than the lateral acceleration threshold value $G_{yth}$, the determination unit 131C sets the value of the flag F10 to "0." When the absolute value of the lateral acceleration $G_y$ is greater than the lateral acceleration threshold value $G_{yth}$, the determination unit 131C sets the value of the flag F10 to "1."

The determination unit 131D receives the absolute value of the steering angle $\theta_s$ calculated by the absolute value calculating unit 131B and a steering angle threshold value $\theta_{sth2}$ stored in the storage device of the control device 50. The steering angle threshold value $\theta_{sth2}$ is set based on a point of view for determining whether the vehicle is turning. The determination unit 131D compares the absolute value of the steering angle $\theta_s$ with the steering angle threshold value $\theta_{sth2}$ and sets a value of a flag F11 based on the comparison result. When the absolute value of the steering angle $\theta_s$ is less than the steering angle threshold value $\theta_{sth2}$, the determination unit 131D sets the value of the flag F11 to "1." When the absolute value of the steering angle $\theta_s$ is greater than the steering angle threshold value $\theta_{sth2}$, the determination unit 131D sets the value of the flag F11 to "0."

The determination unit 131E receives the value of the flag F10 set by the determination unit 131C and the value of the flag F11 set by the determination unit 131D. The determination unit 131E sets the value of the flag F7 based on the values of the flag F10 and the flag F11 as a determination result indicating whether the vehicle is turning. When the value of at least one of the flag F10 and the flag F11 is "0," the determination unit 131E determines that the vehicle is not turning and sets the value of the flag F7 to "0." When the values of both the flag F10 and the flag F11 are "1," the determination unit 131E determines that the vehicle is turning and sets the value of the flag F7 to "1."

The lateral acceleration threshold value $G_{yth}$ and the steering angle threshold value $\theta_{sth2}$ may be changed according to the vehicle speed V. The deceleration determining unit 132 will be described below in detail.

Figure 13:
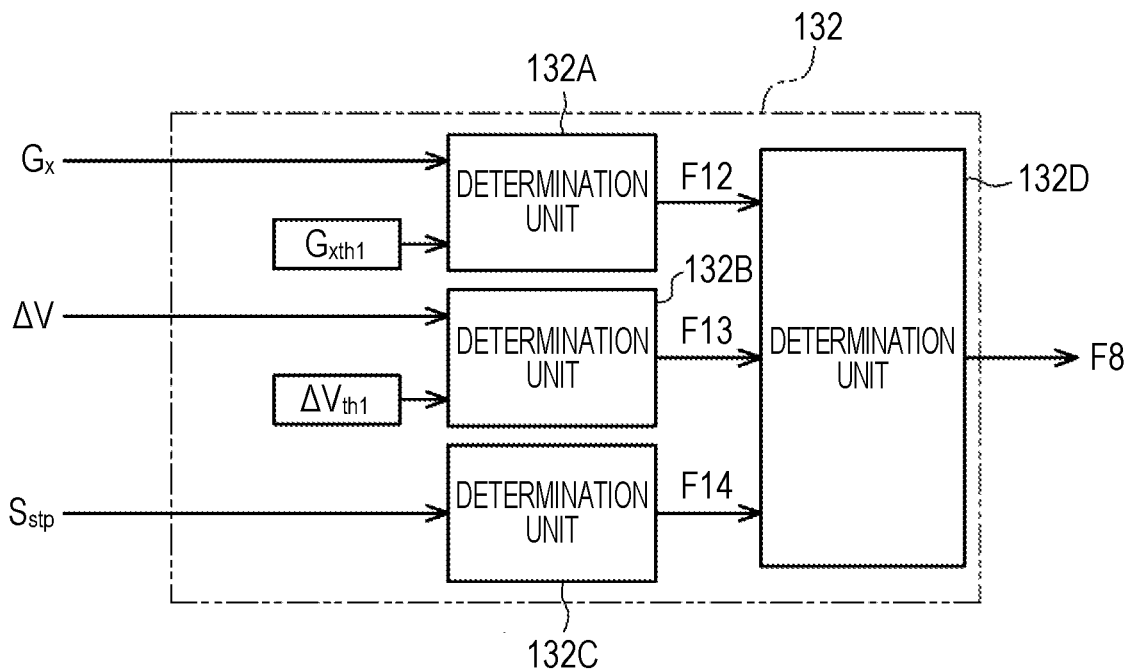
FIG. 13 is a block diagram illustrating a deceleration determining unit according to the fourth embodiment.

As illustrated in FIG. 13, the deceleration determining unit 132 includes four determination units 132A, 132B, 132C, and 132D. The determination unit 132A receives the longitudinal acceleration $G_x$ detected by the longitudinal acceleration sensor 503 and a longitudinal acceleration threshold value $G_{yth1}$ stored in the storage device of the control device 50. The longitudinal acceleration threshold value $G_{yth1}$ is set based on a point of view for determining whether the vehicle is decelerating. The determination unit 132A compares the longitudinal acceleration $G_x$ with the longitudinal acceleration threshold value $G_{yth1}$ and sets a value of a flag F12 based on a comparison result thereof. When the value of the longitudinal acceleration $G_x$ is less than the longitudinal acceleration threshold value $G_{yth1}$, the determination unit 132A sets the value of the flag F12 to "0." When the value of the longitudinal acceleration $G_x$ is greater than the longitudinal acceleration threshold value $G_{yth1}$, the determination unit 132A sets the value of the flag F12 to "1."

The determination unit 132B receives the vehicle speed change per unit time $\Delta V$ calculated by the vehicle speed change calculating unit 504 and a vehicle speed change threshold value $\Delta V_{th1}$ stored in the storage device of the control device 50. The vehicle speed change threshold value $\Delta V_{th1}$ is set based on a point of view for determining whether the vehicle is decelerating. The determination unit 132B compares the vehicle speed change per unit time $\Delta V$ with the vehicle speed change threshold value $\Delta V_{th1}$ and sets a value of a flag F13 based on a comparison result thereof. When the value of the vehicle speed change per unit time $\Delta V$ is less than the vehicle speed change threshold value $\Delta V_{th1}$, the determination unit 132B sets the value of the flag F13 to "0." When the value of the vehicle speed change per unit time $\Delta V$ is greater than the vehicle speed change threshold value $\Delta V_{th1}$, the determination unit 132B sets the value of the flag F13 to "1."

The determination unit 132C receives the stop lamp signal $S_{stp}$ generated by the stop lamp switch 505. When the stop lamp signal $S_{stp}$ indicates that the stop lamp is turned off, the determination unit 132C sets a value of a flag F14 to "0." When the stop lamp signal $S_{stp}$ indicates that the stop lamp is turned on, the determination unit 132C sets the value of the flag F14 to "1."

The determination unit 132D receives the value of the flag F12 set by the determination unit 132A, the value of the flag F13 set by the determination unit 132B, and the value of the flag F14 set by the determination unit 132C. The determination unit 132D sets the value of the flag F8 based on the values of the flag F12, the flag F13, and the flag F14 as a determination result indicating whether the vehicle is decelerating. When the value of at least one of the flag F12, the flag F13, and the flag F14 is "0," the determination unit 132D determines that the vehicle is not decelerating, and sets the value of the flag F8 to "0." When the values of all the flag F12, the flag F13, and the flag F14 are "1," the determination unit 132D determines that the vehicle is decelerating, and sets the value of the flag F8 to "1."

The longitudinal acceleration threshold value $G_{yth1}$ and the vehicle speed change threshold value $\Delta V_{th1}$ may be changed according to the vehicle speed V. A configuration in which the determination unit 132C is omitted may be employed as the deceleration determining unit 132. In this case, the determination unit 132D sets the value of the flag F8 to "0" when the value of at least one of the flag F12 and the flag F13 is "0." The determination unit 132D sets the value of the flag F8 to "1" when the values of both the flag F12 and the flag F13 are "1."

Figure 14:
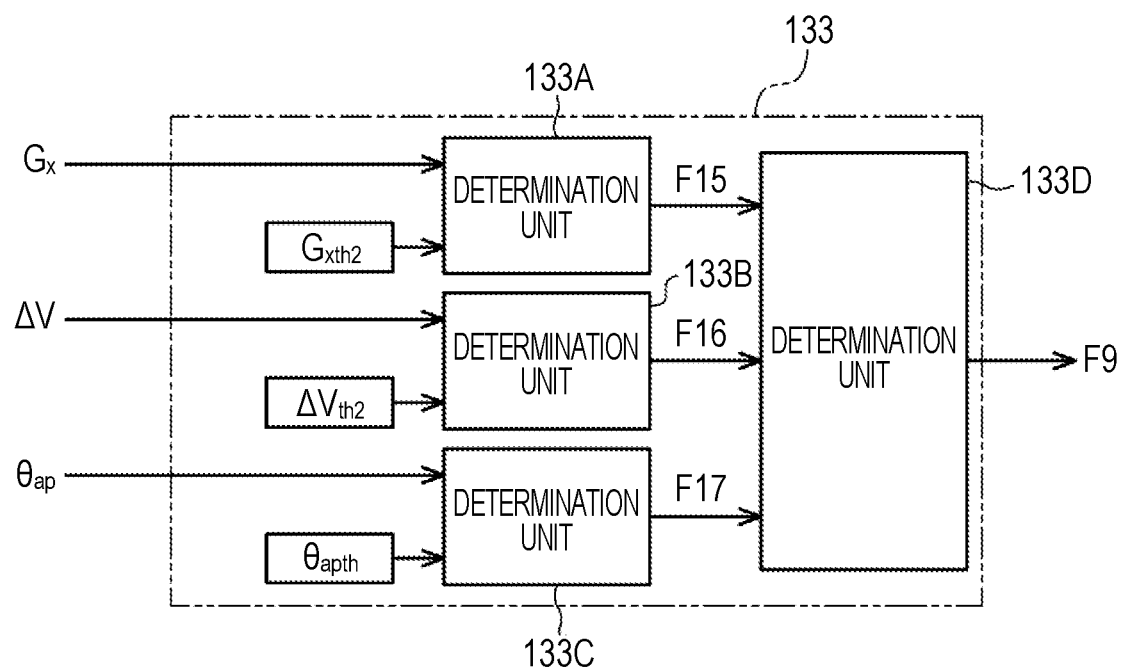
FIG. 14 is a block diagram illustrating an acceleration determining unit according to the fourth embodiment.

The acceleration determining unit 133 will be described below in detail. As illustrated in FIG. 14, the acceleration determining unit 133 includes four determination units 133A, 133B, 133C, and 133D.

The determination unit 133A receives the longitudinal acceleration $G_x$ detected by the longitudinal acceleration sensor 503 and a longitudinal acceleration threshold value $G_{yth2}$ stored in the storage device of the control device 50. The longitudinal acceleration threshold value $G_{yth2}$ is set based on a point of view for determining whether the vehicle is accelerating. The determination unit 133A compares the longitudinal acceleration $G_x$ with the longitudinal acceleration threshold value $G_{yth2}$ and sets a value of a flag F15 based on a comparison result thereof. When the value of the longitudinal acceleration $G_x$ is less than the longitudinal acceleration threshold value $G_{yth2}$, the determination unit 133A sets the value of the flag F15 to "0." When the value of the longitudinal acceleration $G_x$ is greater than the longitudinal acceleration threshold value $G_{yth2}$, the determination unit 133A sets the value of the flag F15 to "1."

The determination unit 133B receives the vehicle speed change per unit time $\Delta V$ calculated by the vehicle speed change calculating unit 504 and a vehicle speed change threshold value $\Delta V_{th2}$ stored in the storage device of the control device 50. The vehicle speed change threshold value $\Delta V_{th2}$ is set based on a point of view for determining whether the vehicle is accelerating. The determination unit 133B compares the vehicle speed change per unit time $\Delta V$ with the vehicle speed change threshold value $\Delta V_{th2}$ and sets a value of a flag F16 based on a comparison result thereof. When the value of the vehicle speed change per unit time $\Delta V$ is less than the vehicle speed change threshold value $\Delta V_{th2}$, the determination unit 133B sets the value of the flag F16 to "0." When the value of the vehicle speed change per unit time $\Delta V$ is greater than the vehicle speed change threshold value $\Delta V_{th2}$, the determination unit 133B sets the value of the flag F16 to "1."

The determination unit 133C receives the acceleration operation amount $\theta_{ap}$ detected by the accelerator position sensor 506 and an acceleration operation amount threshold value $\theta_{apth}$ stored in the storage device of the control device 50. The acceleration operation amount threshold value $\theta_{apth}$ is set based on a point of view for determining whether the vehicle is accelerating. The determination unit 133C compares the acceleration operation amount $\theta_{ap}$ with the acceleration operation amount threshold value $\theta_{apth}$, and sets a value of a flag F17 based on a comparison result thereof. When the value of the acceleration operation amount $\theta_{ap}$ is less than the acceleration operation amount threshold value $\theta_{apth}$, the determination unit 133C sets the value of the flag F17 to "0." When the value of the acceleration operation amount $\theta_{ap}$ is greater than the acceleration operation amount threshold value $\theta_{apth}$, the determination unit 133C sets the value of the flag F17 to "1."

The determination unit 133D receives the value of the flag F15 set by the determination unit 133A, the value of the flag F16 set by the determination unit 133B, and the value of the flag F17 set by the determination unit 133C. The determination unit 133D sets the value of the flag F9 based on the values of the flag F15, the flag F16, and the flag F17 as a determination result indicating whether the vehicle is accelerating. When the value of at least one of the flag F15, the flag F16, and the flag F17 is "0," the determination unit 133D determines that the vehicle is not accelerating, and sets the value of the flag F9 to "0." When the values of all the flag F15, the flag F16, and the flag F17 are "1," the determination unit 133D determines that the vehicle is accelerating, and sets the value of the flag F9 to "1."

The longitudinal acceleration threshold value $G_{yth2}$ and the vehicle speed change threshold value $\Delta V_{th2}$ may be changed according to the vehicle speed V. A configuration in which the determination unit 133C is omitted may be employed as the acceleration determining unit 133. In this case, the determination unit 133D sets the value of the flag F9 to "0" when the value of at least one of the flag F15 and the flag F16 is "0." The determination unit 133D sets the value of the flag F9 to "1" when the values of both the flag F15 and the flag F16 are "1."

Accordingly, according to the fourth embodiment, the following advantages can be obtained in addition to the same advantages as in the first embodiment. Regardless of whether the steering wheel 11 is being held at a constant steering angle $\theta_s$, when the vehicle is decelerated or accelerated while turning, the corrected vehicle speed $V_c$ which is the final vehicle speed used to calculate the target pinion angle $\theta_p$* is fixed to the vehicle speed immediately before it is determined that the vehicle is decelerated while turning or immediately before it is determined that the vehicle is accelerated while turning. Accordingly, as illustrated in the left part of FIG. 8, an actual travel trajectory L2 of the vehicle is prevented from changing such that the vehicle moves inward with respect to a turning locus L1 which is intended by a driver when the vehicle is decelerated while turning regardless of whether the steering wheel 11 is being held at a constant steering angle $\theta_s$. As illustrated in the right part of FIG. 8, an actual travel trajectory L2 of the vehicle is prevented from changing such that the vehicle protrudes outward from a turning locus L1 which is intended by a driver when the vehicle is accelerated while turning regardless of whether the steering wheel 11 is being held at a constant steering angle $\theta_s$. As a result, regardless of whether the steering wheel 11 is being held at a constant steering angle $\theta_s$, it is possible to curb change of a vehicle behavior which is not intended by a driver when the vehicle is decelerated or accelerated while turning.

Without determining whether the steering wheel 11 is being held at a constant steering angle $\theta_s$, the value of the vehicle speed which is used to calculate the target pinion angle $\theta_p$* is also fixed when the steering wheel 11 is being held at a constant steering angle $\theta_s$. Accordingly, it is possible to curb change of a vehicle behavior which is not intended by a driver even when the vehicle is decelerated or accelerated in a state in which the steering wheel 11 is being held at a constant steering angle $\theta_s$.

When the vehicle is turning while the steering wheel 11 is being steered, the travel trajectory of the vehicle changes from time to time with change of the steering angle $\theta_s$. Accordingly, even when the steering angle ratio changes slightly with the change of the vehicle speed V, a driver is less likely to be aware thereof and is less likely to feel discomfort. Depending on product specifications or the like, it is conceivable in view of improvement in steering ability that the steering angle ratio is requested not to change when the vehicle is decelerated or accelerated while turning regardless of whether the steering wheel 11 is being held, and this request can be satisfied.

When a configuration in which deceleration of the vehicle is determined based on the stop lamp signal $S_{stp}$ in addition to the longitudinal acceleration $G_x$ and the vehicle speed change per unit time $\Delta V$ is employed as the deceleration determining unit 132, it is possible to more appropriately determine deceleration of the vehicle. For example, when the vehicle is traveling on an uphill road, it is conceivable that the vehicle speed V decreases even if a driver does not have an intention of deceleration. In this regard, it is possible to more appropriately determine deceleration of the vehicle on an uphill road based on a driver's intention by considering the stop lamp signal $S_{stp}$.

When a configuration in which acceleration of the vehicle is determined based on the acceleration operation amount $\theta_{ap}$ in addition to the longitudinal acceleration $G_x$ and the vehicle speed change per unit time $\Delta V$ is employed as the acceleration determining unit 133, it is possible to more appropriately determine acceleration of the vehicle. For example, when the vehicle is traveling on a downhill road, it is conceivable that the vehicle speed V increases even if a driver does not have an intention of acceleration. In this regard, it is possible to more appropriately determine acceleration of the vehicle on a downhill road based on a driver's intention by considering the acceleration operation amount $\theta_{ap}$.

Fifth Embodiment

A steering control device according to a fifth embodiment will be described below. This embodiment is different from the fourth embodiment in the configuration of the turn determining unit.

Figure 15:
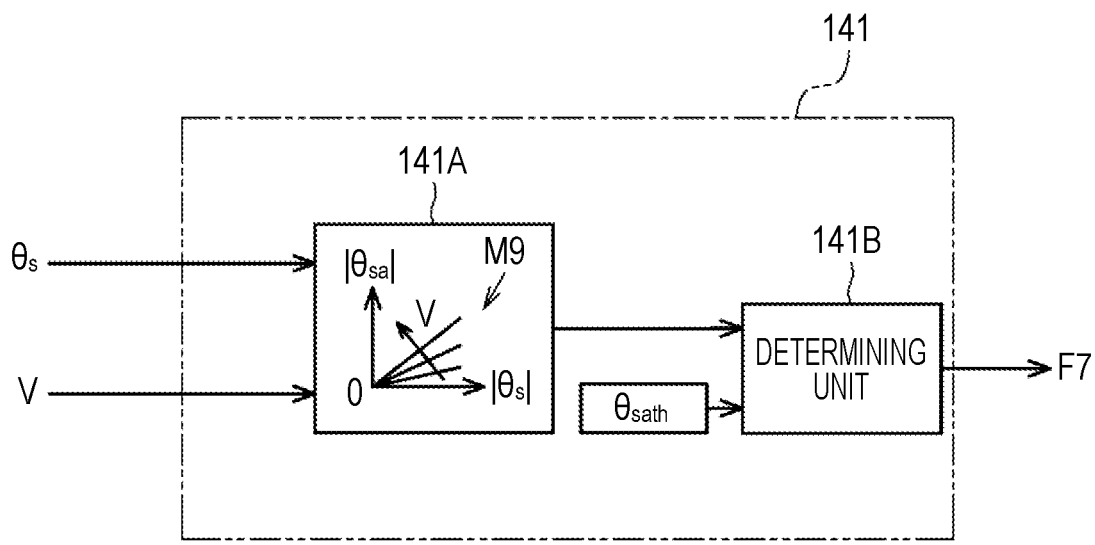
FIG. 15 is a block diagram illustrating a turn determining unit according to a fifth embodiment.

As illustrated in FIG. 15, the turn determining unit 131 includes a slip angle calculating unit 141A and a determination unit 141B. The slip angle calculating unit 141A receives the steering angle $\theta_s$ calculated by the steering angle calculating unit 51 and the vehicle speed V detected by the vehicle speed sensor 501, and calculates a slip angle $\theta_{sa}$ based on the steering angle $\theta_s$ and the vehicle speed V. The slip angle $\theta_{sa}$ is an angle which is formed by the direction of the turning wheels 16 and the traveling direction of the vehicle. The slip angle calculating unit 141A calculates the slip angle $\theta_{sa}$ using a map M9 which is stored in the storage device of the control device 50. The map M9 is a three-dimensional map in which a relationship between the steering angle $\theta_s$ and the slip angle $\theta_{sa}$ is defined according to the vehicle speed V, and has the following characteristics. That is, as the absolute value of the steering angle $\theta_s$ becomes larger and as the vehicle speed V becomes higher, the absolute value of the slip angle $\theta_{sa}$ becomes larger.

The determination unit 141B receives the absolute value of the slip angle $\theta_{sa}$ calculated by the slip angle calculating unit 141A and a slip angle threshold value $\theta_{sath}$ stored in the storage device of the control device 50. The slip angle threshold value $\theta_{sath}$ is set based on a point of view for determining whether the vehicle is turning. The determination unit 141B compares the absolute value of the slip angle $\theta_{sa}$ with the slip angle threshold value $\theta_{sath}$ and sets the value of the flag F7 based on a comparison result thereof. When the absolute value of the slip angle $\theta_{sa}$ is less than the slip angle threshold value $\theta_{sath}$, the determination unit 141B determines that the vehicle is not turning, and sets the value of the flag F7 to "0." When the absolute value of the slip angle $\theta_{sa}$ is greater than the slip angle threshold value $\theta_{sath}$, the determination unit 141B determines that the vehicle is turning, and sets the value of the flag F7 to "1."

Accordingly, according to the fifth embodiment, the following advantages can be obtained. It is possible to determine whether the vehicle is turning based on the steering angle $\theta_s$ and the vehicle speed V.

Sixth Embodiment

A steering control device according to a sixth embodiment will be described below. This embodiment is different from the fourth embodiment in the configurations of the turn determining unit, the deceleration determining unit, and the acceleration determining unit.

Wheels of the vehicle are rotatably supported on a vehicle body via hub unit bearings, and a tire force sensor that detects a tire force may be provided in each hub unit bearing. The tire force is a load acting between a road surface and each wheel.

Figure 19:
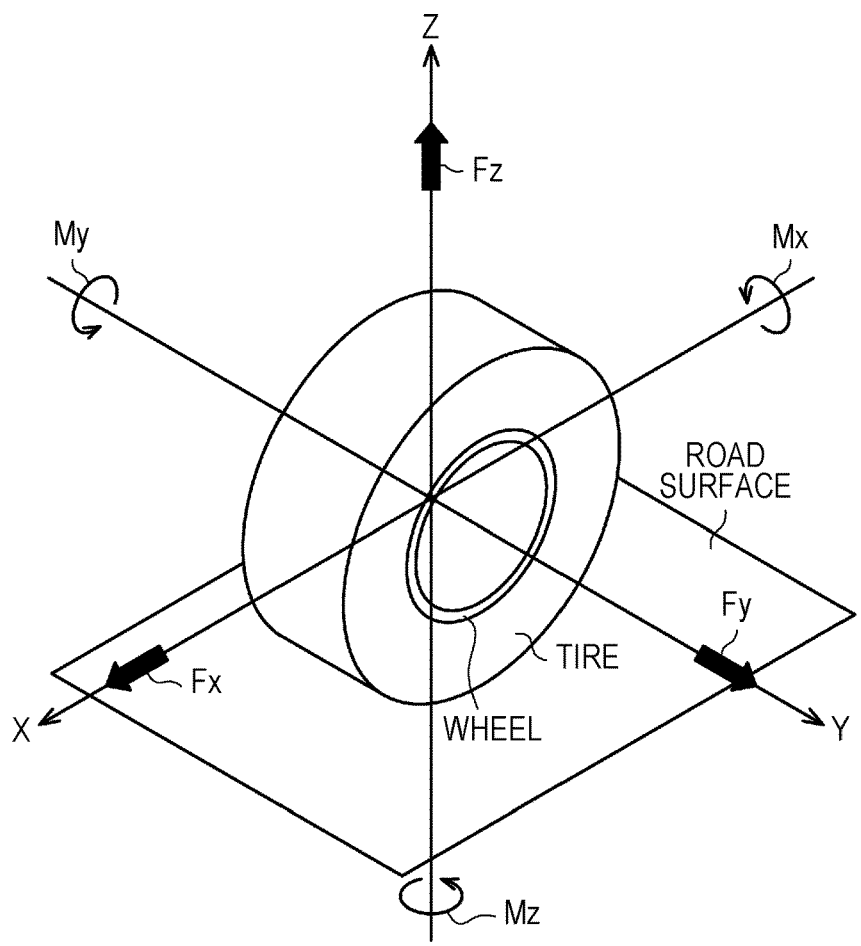
FIG. 19 is a perspective view of a vehicle wheel indicating axial components of a tire force according to the sixth embodiment.

As illustrated in FIG. 19, a load acting between a road surface and each wheel can be expressed by a total of six forces including three forces acting in three directions of an X-axis direction, a Y-axis direction, and a Z-axis direction and three moments acting around three axes of the X axis, the Y axis, and the Z axis. Here, the X-axis direction is a longitudinal horizontal direction of the wheels. The Y-axis direction is a lateral horizontal direction of the wheels. The Z-axis direction is a vertical direction of the wheels. A force acting in the X-axis direction of each wheel is referred to as a longitudinal load (longitudinal force) $F_x$, a force acting in the Y-axis direction of each wheel is referred to as a lateral load (lateral force) $F_y$, and a force acting in the Z-axis direction of each wheel is referred to as a vertical load (vertical force) $F_z$. A moment acting around the X axis of each wheel is referred to as a rolling moment $M_x$, a moment acting around the Y axis of each wheel is referred to as a pitching moment $M_y$, and a moment acting around the Z axis of each wheel is referred to as a yawing moment M.

Figure 16:
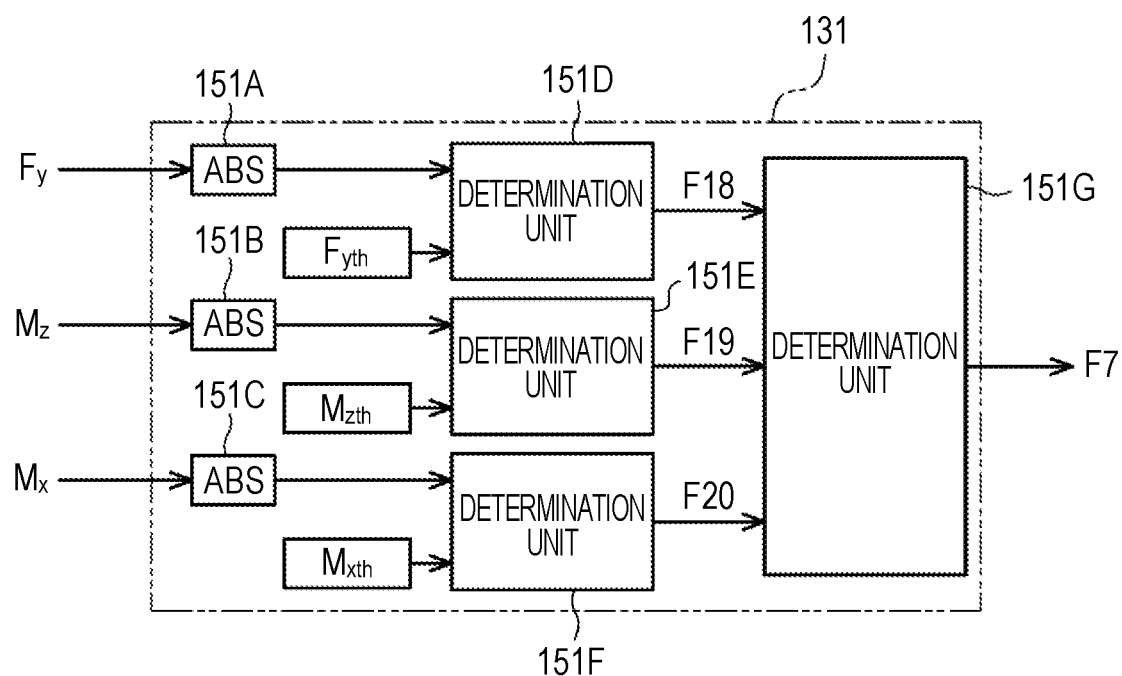
FIG. 16 is a block diagram illustrating a turn determining unit according to a sixth embodiment.

When such a tire force sensor is provided, the following configurations may be employed as the turn determining unit 131, the deceleration determining unit 132, and the acceleration determining unit 133. As illustrated in FIG. 16, the turn determining unit 131 includes three absolute value calculating units 151A, 151B, and 151C and four determination units 151D, 151E, 151F, and 151G.

The absolute value calculating unit 151A calculates an absolute value of the lateral load $F_y$ detected by the tire force sensor. The absolute value calculating unit 151B calculates an absolute value of the yawing moment $M_z$ detected by the tire force sensor.

The absolute value calculating unit 151C calculates an absolute value of the rolling moment $M_x$ detected by the tire force sensor. The determination unit 151D receives the absolute value of the lateral load $F_y$ calculated by the absolute value calculating unit 151A and a lateral load threshold value $F_{yth}$ stored in the storage device of the control device 50. The lateral load threshold value $F_{yth}$ is set based on a point of view for determining whether the vehicle is turning. The determination unit 151D compares the absolute value of the lateral load $F_y$ with the lateral load threshold value $F_{yth}$ and sets a value of a flag F18 based on a comparison result thereof. When the absolute value of the lateral load $F_y$ is less than the lateral load threshold value $F_{yth}$, the determination unit 151D sets the value of the flag F18 to "0." When the absolute value of the lateral load $F_y$ is greater than the lateral load threshold value $F_{yth}$, the determination unit 151D sets the value of the flag F18 to "1."

The determination unit 151E receives the absolute value of the yawing moment $M_z$ calculated by the absolute value calculating unit 151B and a yawing moment threshold value $M_{zth}$ stored in the storage device of the control device 50. The yawing moment threshold value $M_{zth}$ is set based on a point of view for determining whether the vehicle is turning. The determination unit 151E compares the absolute value of the yawing moment $M_z$ with the yawing moment threshold value $M_{zth}$ and sets a value of a flag F19 based on a comparison result thereof. When the absolute value of the yawing moment $M_z$ is less than the yawing moment threshold value $M_{zth}$, the determination unit 151E sets the value of the flag F19 to "0." When the absolute value of the yawing moment $M_z$ is greater than the yawing moment threshold value $M_{zth}$, the determination unit 151E sets the value of the flag F19 to "1."

The determination unit 151F receives the absolute value of the rolling moment $M_x$ calculated by the absolute value calculating unit 151C and a rolling moment threshold value $M_{xth}$ stored in the storage device of the control device 50. The rolling moment threshold value $M_{xth}$ is set based on a point of view for determining whether the vehicle is turning.

The determination unit 151F compares the absolute value of the rolling moment $M_x$ with the rolling moment threshold value $M_{xth}$ and sets a value of a flag F20 based on a comparison result thereof. When the absolute value of the rolling moment $M_x$ is less than the rolling moment threshold value $M_{xth}$, the determination unit 151F sets the value of the flag F20 to "0." When the absolute value of the rolling moment $M_x$ is greater than the rolling moment threshold value $M_{xth}$, the determination unit 151F sets the value of the flag F20 to "1."

The determination unit 151G receives the value of the flag F18 set by the determination unit 151D, the value of the flag F19 set by the determination unit 151E, and the value of the flag F20 set by the determination unit 151F. The determination unit 151G sets the value of the flag F7 as a determination result indicating whether the vehicle is turning based on the values of the flag F18, the flag F19, and the flag F20. When the value of at least one of the flag F18, the flag F19, and the flag F20 is "0," the determination unit 151G determines that the vehicle is not turning, and sets the value of the flag F7 to "0." When the values of all the flag F18, the flag F19, and the flag F20 are "1," the determination unit 151G determines that the vehicle is turning, and sets the value of the flag F7 to "1."

Figure 17:
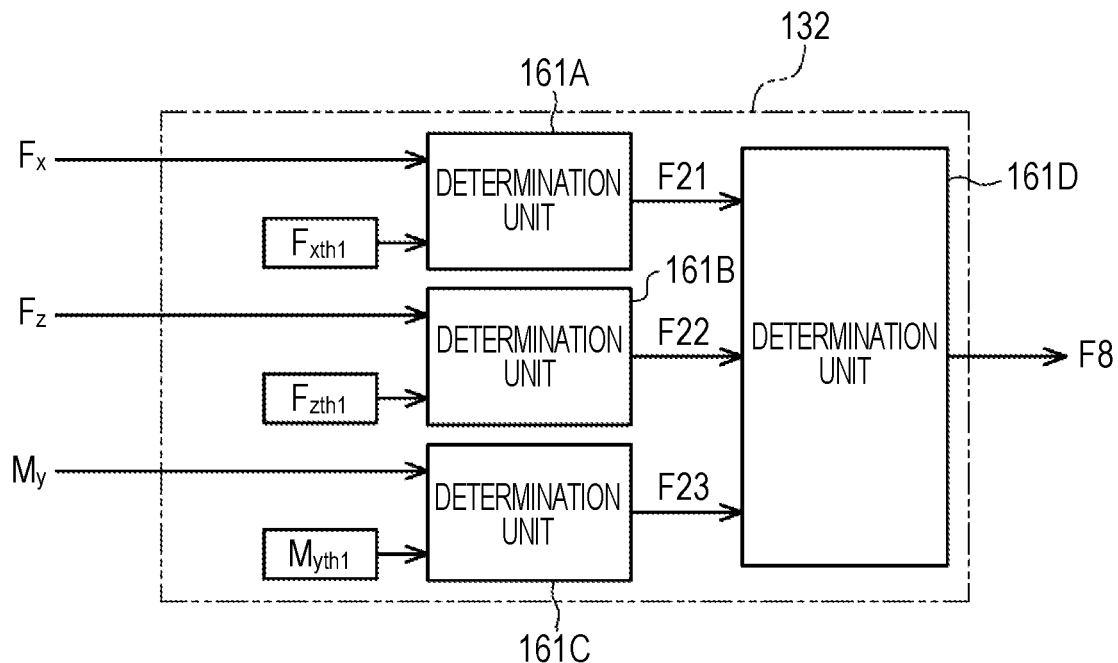
FIG. 17 is a block diagram illustrating a deceleration determining unit according to the sixth embodiment.

As illustrated in FIG. 17, the deceleration determining unit 132 includes four determination units 161A, 161B, 161C, and 161D. The determination unit 161A receives the longitudinal load $F_x$ calculated by the tire force sensor and a longitudinal load threshold value $F_{xth1}$ stored in the storage device of the control device 50. The longitudinal load threshold value $F_{xth1}$ is set based on a point of view for determining whether the vehicle is decelerating. The determination unit 161A compares the longitudinal load $F_x$ with the longitudinal load threshold value $F_{xth1}$ and sets a value of a flag F21 based on a comparison result thereof. When the value of the longitudinal load $F_x$ is less than the longitudinal load threshold value $F_{xth1}$, the determination unit 161A sets the value of the flag F21 to "0." When the value of the longitudinal load $F_x$ is greater than the longitudinal load threshold value $F_{xth1}$, the determination unit 161A sets the value of the flag F21 to "1."

The determination unit 161B receives the vertical load $F_z$ detected by the tire force sensor and a vertical load threshold value $F_{zth1}$ stored in the storage device of the control device 50. The vertical load threshold value $F_{zth1}$ is set based on a point of view for determining whether the vehicle is decelerating. The determination unit 161B compares the vertical load $F_z$ with the vertical load threshold value $F_{zth1}$ and sets a value of a flag F22 based on a comparison result thereof. When the value of the vertical load $F_z$ is less than the vertical load threshold value $F_{zth1}$, the determination unit 161B sets the value of the flag F22 to "0." When the value of the vertical load $F_z$ is greater than the vertical load threshold value $F_{zth1}$, the determination unit 161B sets the value of the flag F22 to "1."

The determination unit 161C receives the pitching moment $M_y$ detected by the tire force sensor and a pitching moment threshold value $M_{yth1}$ stored in the storage device of the control device 50. The pitching moment threshold value $M_{yth1}$ is set based on a point of view for determining whether the vehicle is decelerating. The determination unit 161C compares the pitching moment $M_y$ with the pitching moment threshold value $M_{yth1}$ and sets a value of a flag F23 based on a comparison result thereof. When the value of the pitching moment $M_y$ is less than the pitching moment threshold value $M_{yth1}$, the determination unit 161C sets the value of the flag F23 to "0." When the value of the pitching moment $M_y$ is greater than the pitching moment threshold value $M_{yth1}$, the determination unit 161C sets the value of the flag F23 to "1."

The determination unit 161D receives the value of the flag F21 set by the determination unit 161A, the value of the flag F22 set by the determination unit 161B, and the value of the flag F23 set by the determination unit 161C. The determination unit 161D sets the value of the flag F8 as a determination result indicating whether the vehicle is decelerating based on the values of the flag F21, the flag F22, and the flag F23. When the value of at least one of the flag F21, the flag F22, and the flag F23 is "0," the determination unit 161D determines that the vehicle is not decelerating, and sets the value of the flag F8 to "0." When the values of all the flag F21, the flag F22, and the flag F23 are "1," the determination unit 161D determines that the vehicle is decelerating, and sets the value of the flag F8 to "1."

Figure 18:
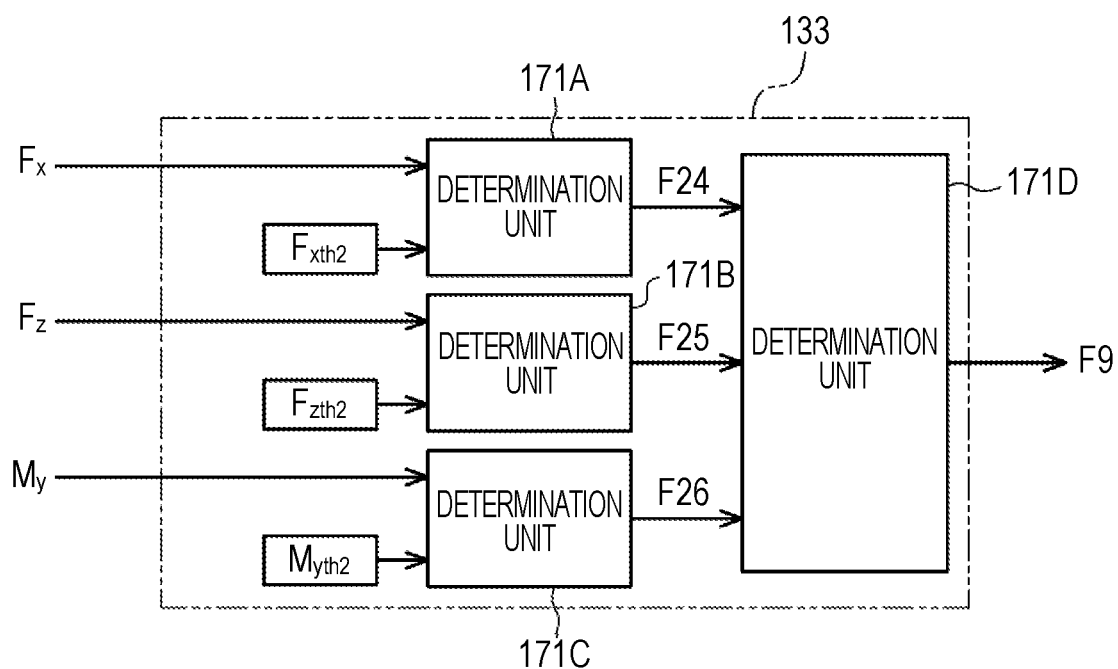
FIG. 18 is a block diagram illustrating an acceleration determining unit according to the sixth embodiment.

As illustrated in FIG. 18, the acceleration determining unit 133 includes four determination units 171A, 171B, 171C, and 171D. The determination unit 171A receives the longitudinal load $F_x$ detected by the tire force sensor and a longitudinal load threshold value $F_{xth2}$ stored in the storage device of the control device 50. The longitudinal load threshold value $F_{xth2}$ is set based on a point of view for determining whether the vehicle is accelerating. The determination unit 171A compares the longitudinal load $F_x$ with the longitudinal load threshold value $F_{xth2}$ and sets a value of a flag F24 based on a comparison result thereof. When the value of the longitudinal load $F_x$ is less than the longitudinal load threshold value $F_{xth2}$, the determination unit 171A sets the value of the flag F24 to "0." When the value of the longitudinal load $F_x$ is greater than the longitudinal load threshold value $F_{xth2}$, the determination unit 171A sets the value of the flag F24 to "1."

The determination unit 171B receives the vertical load $F_z$ detected by the tire force sensor and a vertical load threshold value $F_{zth2}$ stored in the storage device of the control device 50. The vertical load threshold value $F_{zth2}$ is set based on a point of view for determining whether the vehicle is accelerating. The determination unit 171B compares the vertical load $F_z$ with the vertical load threshold value $F_{zth2}$ and sets a value of a flag F25 based on a comparison result thereof. When the value of the vertical load $F_z$ is less than the vertical load threshold value $F_{zth2}$, the determination unit 171B sets the value of the flag F25 to "0." When the value of the vertical load $F_z$ is greater than the vertical load threshold value $F_{zth2}$, the determination unit 171B sets the value of the flag F25 to "1."

The determination unit 171C receives the pitching moment $M_y$ detected by the tire force sensor and a pitching moment threshold value $M_{yth2}$ stored in the storage device of the control device 50. The pitching moment threshold value $M_{yth2}$ is set based on a point of view for determining whether the vehicle is accelerating. The determination unit 171C compares the pitching moment $M_y$ with the pitching moment threshold value $M_{yth2}$ and sets a value of a flag F26 based on a comparison result thereof. When the value of the pitching moment $M_y$ is less than the pitching moment threshold value $M_{yth2}$, the determination unit 171C sets the value of the flag F26 to "0." When the value of the pitching moment $M_y$ is greater than the pitching moment threshold value $M_{yth2}$, the determination unit 171C sets the value of the flag F26 to "1."

The determination unit 171D receives the value of the flag F24 set by the determination unit 171A, the value of the flag F25 set by the determination unit 171B, and the value of the flag F26 set by the determination unit 171C. The determination unit 171D sets the value of the flag F9 as a determination result indicating whether the vehicle is accelerating based on the values of the flag F24, the flag F25, and the flag F26. When the value of at least one of the flag F24, the flag F25, and the flag F26 is "0," the determination unit 171D determines that the vehicle is not accelerating, and sets the value of the flag F9 to "0." When the values of all the flag F24, the flag F25, and the flag F26 are "1," the determination unit 171D determines that the vehicle is accelerating, and sets the value of the flag F9 to "1."

Accordingly, according to the sixth embodiment, the following advantages can be obtained. When a tire force sensor is provided in each wheel of the vehicle, whether the vehicle is turning, whether the vehicle is decelerating, and whether the vehicle is accelerating can be determined based on the tire force detected by the tire force sensor.

Seventh Embodiment

A steering control device according to a seventh embodiment will be described below. This embodiment is different from the fourth embodiment in the configurations of the target pinion angle calculating unit 62.

Figure 20:
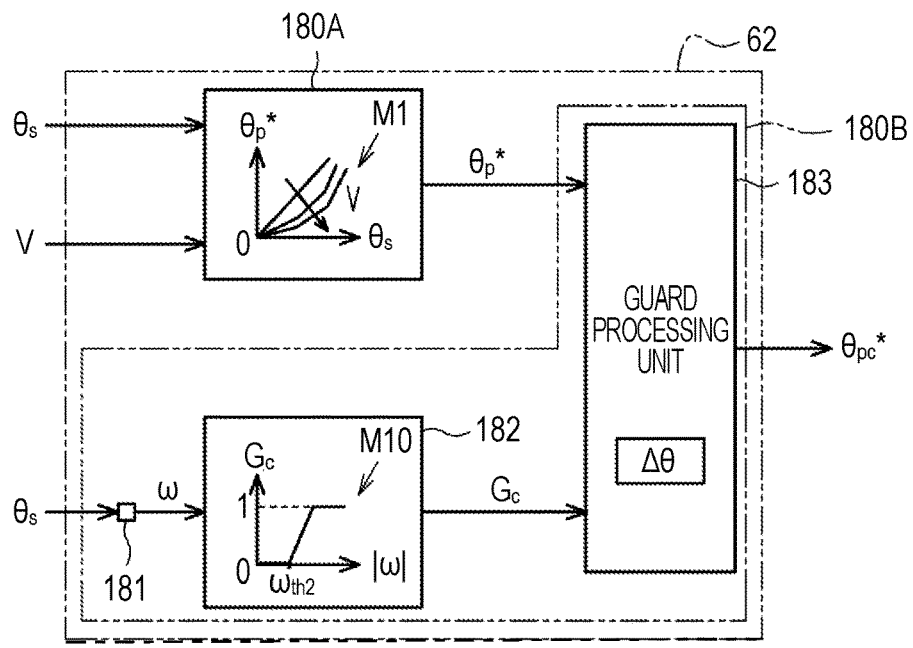
FIG. 20 is a block diagram illustrating a target pinion angle calculating unit according to a seventh embodiment.

As illustrated in FIG. 20, the target pinion angle calculating unit 62 includes an angle calculating unit 180A and a correction processing unit 180B. The angle calculating unit 180A has the same function as the angle calculating unit 70B according to the first embodiment illustrated in FIG. 4. The angle calculating unit 180A receives the steering angle $\theta_s$ calculated by the steering angle calculating unit 51 and the vehicle speed V detected by the vehicle speed sensor 501, and calculates the target pinion angle $\theta_p^*$ using the aforementioned map M1 based on the received steering angle $\theta_s$ and the received vehicle speed V.

The correction processing unit 180B includes a differentiator 181, a gain calculating unit 182, and a guard processing unit 183. The differentiator 181 calculates the steering angular velocity $\omega$ by differentiating the steering angle $\theta_s$ calculated by the steering angle calculating unit 51.

The gain calculating unit 182 calculates a gain $G_c$ based on the steering angular velocity $\omega$ calculated by the differentiator 181. The gain calculating unit 182 calculates the gain $G_c$ using a map M10 which is stored in the storage device of the control device 50. The map M10 is a two-dimensional map in which a relationship between the steering angular velocity $\omega$ and the gain $G_c$ is defined, and has the following characteristics. That is, when the absolute value of the steering angular velocity $\omega$ is equal to or less than a threshold value $\omega_{th2}$, the value of the gain $G_c$ is maintained at "0." When the absolute value of the steering angular velocity $\omega$ is greater than the threshold value $\omega_{th2}$, the value of the gain $G_c$ increases rapidly with the increase of the absolute value of the steering angular velocity $\omega$ and reaches "1." After the value of the gain $G_c$ has reached "1," the value of the gain $G_c$ is maintained at "1" regardless of the increase of the absolute value of the steering angular velocity $\omega$. The threshold value $\omega_{th2}$ is set based on the steering angular velocity $\omega$ when the steering wheel 11 is in a held steering state or when the steering wheel 11 is steered slowly.

The guard processing unit 183 receives the target pinion angle $\theta_p^*$ calculated by the angle calculating unit 180A and the gain $G_c$ calculated by the gain calculating unit 182. The guard processing unit 183 limits a change per operation cycle of the target pinion angle $\theta_p^*$ to a limit value $\Delta\theta$. The limit value $\Delta\theta$ is set based on a point of view for curbing rapid change of the target pinion angle $\theta_p^*$. The limit value $\Delta\theta$ may be a fixed value or may be a variable which varies depending on the steering angular velocity $\omega$, the steering angle $\theta_s$, or the vehicle speed V. The guard processing unit 183 calculates a final limit value $\Delta\theta$ by multiplying the limit value $\Delta\theta$ by the gain $G_c$.

When the value of the gain $G_c$ is "0," the final limit value $\Delta\theta$ is "0" and thus the change per operation cycle of the target pinion angle $\theta_p^*$ is limited to "0." Accordingly, when the value of the steering angular velocity $\omega$ is equal to or less than the threshold value $\omega_{th2}$, the target pinion angle $\theta_p^*$ is fixed to a value when the value of the steering angular velocity $\omega$ has reached a value equal to or less than the threshold value $\omega_{th2}$. When the value of the gain $G_c$ is "1," the change per operation cycle of the target pinion angle $\theta_p^*$ is limited to the limit value $\Delta\theta$.

Operations of the seventh embodiment will be described below. For example, when the vehicle is turning in a state in which the steering wheel 11 is being held at a constant steering angle $\theta_s$, the value of the steering angular velocity $\omega$ is "0." At this time, since the value of the gain $G_c$ is "0," the change per operation cycle of the target pinion angle $\theta_p^*$ is limited to "0." Accordingly, a corrected target pinion angle $\theta_{pc}^*$ which is a final target pinion angle which is used to control the turning motor 41 is fixed to the same value as the target pinion angle $\theta_p^*$ based on the steering angle $\theta_s$ and the vehicle speed V when the steering wheel 11 is in the held steering state (more accurately when the steering angular velocity $\omega$ has reached a value equal to or less than the threshold value $\omega_{th2}$) regardless of the change of the vehicle speed V. That is, the value of the corrected target pinion angle $\theta_{pc}^*$ or the steering angle ratio does not change with the change of the vehicle speed V.

Accordingly, as illustrated in the left part of FIG. 8, an actual travel trajectory L2 of the vehicle is prevented from changing such that the vehicle moves inward with respect to a turning locus L1 which is intended by a driver when the vehicle is decelerated while turning in a state in which the steering wheel 11 is being held at a constant steering angle $\theta_s$. As illustrated in the right part of FIG. 8, an actual travel trajectory L2 of the vehicle is prevented from changing such that the vehicle protrudes outward from a turning locus L1 which is intended by a driver when the vehicle is accelerated while turning in a state in which the steering wheel 11 is being held at a constant steering angle $\theta_s$. Since it is possible to curb change of a vehicle behavior which is not intended by a driver, the driver is less likely to feel discomfort.

When the steering wheel 11 is slowly steered at a steering angular velocity $\omega$ which is equal to or lower than a threshold value, the value of the target pinion angle $\theta_p^*$ or the steering angle ratio is fixed in the same way as when the steering wheel 11 is being held.

When the steering of the steering wheel 11 is restarted while the vehicle is turning in a state in which the steering wheel 11 is being held at a constant steering angle $\theta_s$, there is the following concern. That is, it is conceivable that the value of the corrected target pinion angle $\theta_{pc}^*$ which is fixed immediately before the steering of the steering wheel 11 is restarted and the value of the target pinion angle $\theta_p^*$ which is calculated by the angle calculating unit 180A immediately after the steering of the steering wheel 11 is restarted will be different from each other.

In this regard, when the steering angular velocity $\omega$ becomes greater than the threshold value $\omega_{th2}$ due to restarting of the steering of the steering wheel 11, the value of the gain $G_c$ is set to, for example, "1." Accordingly, even when the value of the target pinion angle $\theta_p^*$ which is calculated by the angle calculating unit 180A immediately after the steering of the steering wheel 11 is restarted becomes different from the value of the corrected target pinion angle $\theta_{pc}$* which is fixed immediately before the steering of the steering wheel 11 is restarted, the change per operation cycle of the target pinion angle $\theta_p$* is limited to the limit value $\Delta\theta$ by the guard processing unit 183. As a result, the corrected target pinion angle $\theta_{pc}$ which is the final target pinion angle used to control the turning motor 41 changes slowly with time to the target pinion angle $\theta_p$* calculated by the angle calculating unit 180A. That is, since rapid change of the value of the corrected target pinion angle $\theta_{pc}$* is curbed, it is possible to curb rapid change of the steering angle ratio.

Accordingly, according to the seventh embodiment, the following advantages can be obtained in addition to the same advantages as in the first embodiment. It is possible to correct the target pinion angle $\theta_p$* or the steering angle ratio using an electrical signal (the steering angular velocity $\omega$ herein) which is a state variable for determination processes such as determination of holding of the steering wheel 11 and turning or acceleration/deceleration of the vehicle without performing the determination processes. Since the determination processes such as determination of holding of the steering wheel 11 and turning or acceleration/deceleration of the vehicle are not necessary, it is also possible to curb a calculation load of the control device 50.

In addition, the same configuration as the corrected vehicle speed calculating unit 73 according to the first embodiment illustrated in FIG. 6 may be employed as the correction processing unit 180B. In this case, the gain calculating unit 182 illustrated in FIG. 20 is provided instead of the determination unit 73A. The switch 73C receives the gain $G_c$ instead of the flag F3. The vehicle speed V is replaced with the target pinion angle $\theta_p$* and the corrected vehicle speed $V_c$ is replaced with the corrected target pinion angle $\theta_{pc}$*. The upper limit value calculating unit 73D calculates an upper limit value for the change per operation cycle of the target pinion angle $\theta_p$* instead of the upper limit value $V_{UL}$ for the change per operation cycle of the temporary vehicle speed value $V_{temp}$. The lower limit value calculating unit 73E calculates a lower limit value for the change per operation cycle of the target pinion angle $\theta_p$* instead of the lower limit value $V_{LL}$ for the change per operation cycle of the temporary vehicle speed value $V_{temp}$. The determination unit 73G determines whether the change per operation cycle of the target pinion angle $\theta_p$* is to be limited, and sets the value of the flag F4 indicating a determination result thereof. The guard processing unit 73H limits the change per operation cycle of the target pinion angle $\theta_p$* instead of the temporary vehicle speed value $V_{temp}$ to the upper limit value or the lower limit value. In this case, the same advantages as in the first embodiment and the seventh embodiment as described above can also be obtained.

The same configuration as the correction processing unit 120 according to the third embodiment illustrated in FIG. 10 may be employed as the correction processing unit 180B. In this case, the gain calculating unit 182 illustrated in FIG. 20 is provided instead of the held steering determining unit 122 and the determination unit 123. The speed increasing ratio $\nu$ is replaced with the target pinion angle $\theta_p$* and the corrected speed increasing ratio $\nu_c$ is replaced with the corrected target pinion angle $\theta_{pc}$. The upper limit value calculating unit 126 calculates an upper limit value for the change per operation cycle of the target pinion angle $\theta_p$* instead of the upper limit value $\nu_{UL}$ for the change per operation cycle of the speed increasing ratio $\nu$. The lower limit value calculating unit 73E calculates a lower limit value for the change per operation cycle of the target pinion angle $\theta_p$* instead of the lower limit value $\nu_{LL}$ for the change per operation cycle of the speed increasing ratio $\nu$. The guard processing unit 129 limits the change per operation cycle of the target pinion angle $\theta_p$* instead of the speed increasing ratio $\nu$ to the upper limit value or the lower limit value. In this case, the same advantages as in the first embodiment and the seventh embodiment as described above can also be obtained.

Eighth Embodiment

A steering control device according to an eighth embodiment will be described below. This embodiment basically has the same configuration as in the first embodiment illustrated in FIGS. 1 to 7.

Depending on product specifications, it is conceivable that a situation of a vehicle may be required to be transmitted to a driver using a steering reaction force. For example, the situation of the vehicle which is requested to be transmitted to the driver is a situation in which the turning wheels 16 and 16 are in contact with an obstacle such as a curbstone when the vehicle starts in a stopped state.

Figure 21:
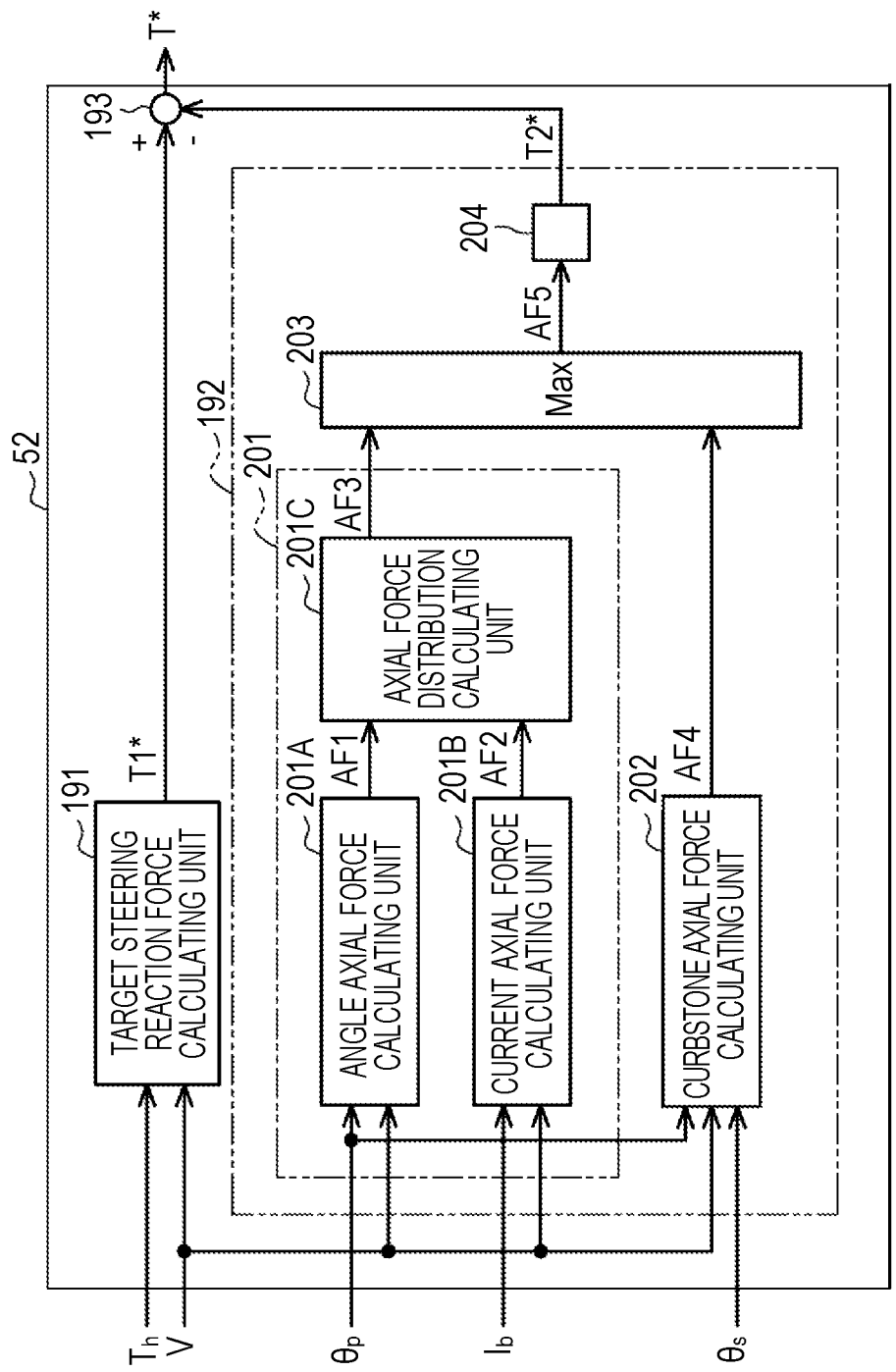
FIG. 21 is a block diagram illustrating a steering reaction force command value calculating unit according to an eighth embodiment.

Therefore, in this embodiment, in order to transmit the situation of the vehicle to a driver using the steering reaction force, the following configuration is employed as the steering reaction force command value calculating unit 52 of the reaction control unit 50a. As illustrated in FIG. 21, the steering reaction force command value calculating unit 52 includes a target steering reaction force calculating unit 191, an axial force calculating unit 192, and a subtractor 193.

The target steering reaction force calculating unit 191 calculates a target steering reaction force T1* based on the steering torque $T_h$ and the vehicle speed V. The target steering reaction force T1* is a target value of a torque which is applied in a direction opposite to the operating direction of the steering wheel 11 and which is to be generated by the reaction motor 31. The target steering reaction force calculating unit 191 calculates the target steering reaction force T1* such that the absolute value thereof becomes larger as the absolute value of the steering torque $T_h$ becomes larger and the vehicle speed V becomes lower.

The axial force calculating unit 192 calculates an axial force which is applied to the turning shaft 14 based on the pinion angle $\theta_p$, the value of the current $I_b$ of the turning motor 41, the steering angle $\theta_s$, and the vehicle speed V and calculates a converted torque value (a steering reaction force based on the axial force) T2* obtained by converting the calculated axial force to a torque.

The subtractor 193 calculates a steering reaction force command value T1* by subtracting the converted torque value T2* calculated by the axial force calculating unit 192 from the target steering reaction force T1* calculated by the target steering reaction force calculating unit 191.

The axial force calculating unit 192 will be described below in detail. As illustrated in FIG. 21, the axial force calculating unit 192 includes a combined axial force calculating unit 201, a curbstone axial force calculating unit 202, a maximum value selecting unit 203, and a converter 204. The combined axial force calculating unit 201 includes an angle axial force calculating unit 201A, a current axial force calculating unit 201B, and an axial force distribution calculating unit 201C.

The angle axial force calculating unit 201A calculates an angle axial force AF1 which is an ideal value of an axial force which is applied to the turning shaft 14 based on the pinion angle $\theta_p$. The angle axial force calculating unit 201A calculates the angle axial force AF1 using an angle axial force map which is stored in the storage device of the control device 50. The angle axial force map is a two-dimensional map with the pinion angle $\theta_p$ set for the horizontal axis and with the angle axial force AF1 set for the vertical axis and defines a relationship between the pinion angle $\theta_p$ and the angle axial force AF1 according to the vehicle speed V. The angle axial force map has the following characteristics. That is, the angle axial force AF1 is set such that the absolute value thereof becomes larger as the absolute value of the pinion angle $\theta_p$ becomes larger and the vehicle speed V becomes lower. With an increase of the absolute value of the pinion angle $\theta_p$, the absolute value of the angle axial force AF1 increases linearly. The angle axial force AF1 is set to the same sign as the sign of the pinion angle $\theta_p$. The angle axial force AF1 is an axial force in which a road surface state or a force acting on the turning shaft 14 is not reflected.

The current axial force calculating unit 201B calculates a current axial force AF2 which is applied to the turning shaft 14 based on the value of the current $I_b$ of the turning motor 41. Here, the value of the current $I_b$ of the turning motor 41 changes due to a difference between the target pinion angle $\theta_p^*$ and the actual pinion angle $\theta_p$ due to application of a disturbance based on a road surface state such as a road surface frictional resistance to the turning wheels 16 and 16. That is, the actual road surface state which is applied to the turning wheels 16 and 16 is reflected in the value of the current $I_b$ of the turning motor 41. Accordingly, an axial force in which an influence of a road surface state is reflected can be calculated based on the value of the current $I_b$ of the turning motor 41. The current axial force AF2 is calculated by multiplying the value of the current $I_b$ of the turning motor 41 by a gain which is a coefficient based on the vehicle speed V. The current axial force AF2 is an axial force in which a road surface state or a force acting on the turning shaft 14 via the turning wheels 16 and 16 is reflected.

The axial force distribution calculating unit 201C individually sets distribution proportions of the angle axial force AF1 and the current axial force AF2 based on various state variables in which vehicle behavior, a steering state, and a road surface state are reflected. The axial force distribution calculating unit 201C calculates a combined axial force AF3 by summing the values obtained by multiplying the angle axial force AF1 and the current axial force AF2 by the distribution proportions individually set therefor.

The distribution proportions may be set based on only the vehicle speed V which is one vehicle state variable. In this case, for example, as the vehicle speed V becomes higher, the distribution proportion for the angle axial force AF1 is set to a larger value and the distribution proportion for the current axial force AF2 is set to a smaller value. As the vehicle speed V becomes lower, the distribution proportion for the angle axial force AF1 is set to a smaller value and the distribution proportion for the current axial force AF2 is set to a larger value.

The curbstone axial force calculating unit 202 calculates a curbstone axial force AF4 for limiting additional turning steering or returning steering in the situation in which the turning wheels 16 and 16 are in contact with an obstacle such as a curbstone based on the pinion angle $\theta_p$, the vehicle speed V, and the steering angle $\theta_s$. The curbstone axial force AF4 is calculated based on a point of view for informing a driver of the situation in which the turning wheels 16 and 16 are in contact with an obstacle such as a curbstone using the steering reaction force when the vehicle starts in a stopped state or the like. Details of the curbstone axial force calculating unit 202 will be described later.

The maximum value selecting unit 203 receives the combined axial force AF3 calculated by the combined axial force calculating unit 201 and the curbstone axial force AF4 calculated by the curbstone axial force calculating unit 202. The maximum value selecting unit 203 selects an axial force with the larger absolute value of the combined axial force AF3 and the curbstone axial force AF4 which are received, and sets the selected combined axial force AF3 or the curbstone axial force AF4 as a final axial force AF5 which is used to calculate the steering reaction force command value T*.

The converter 204 calculates a converted torque value T2* by converting the final axial force AF5 set by the maximum value selecting unit 203 to a torque. The curbstone axial force calculating unit 202 will be described below in detail.

Figure 22:
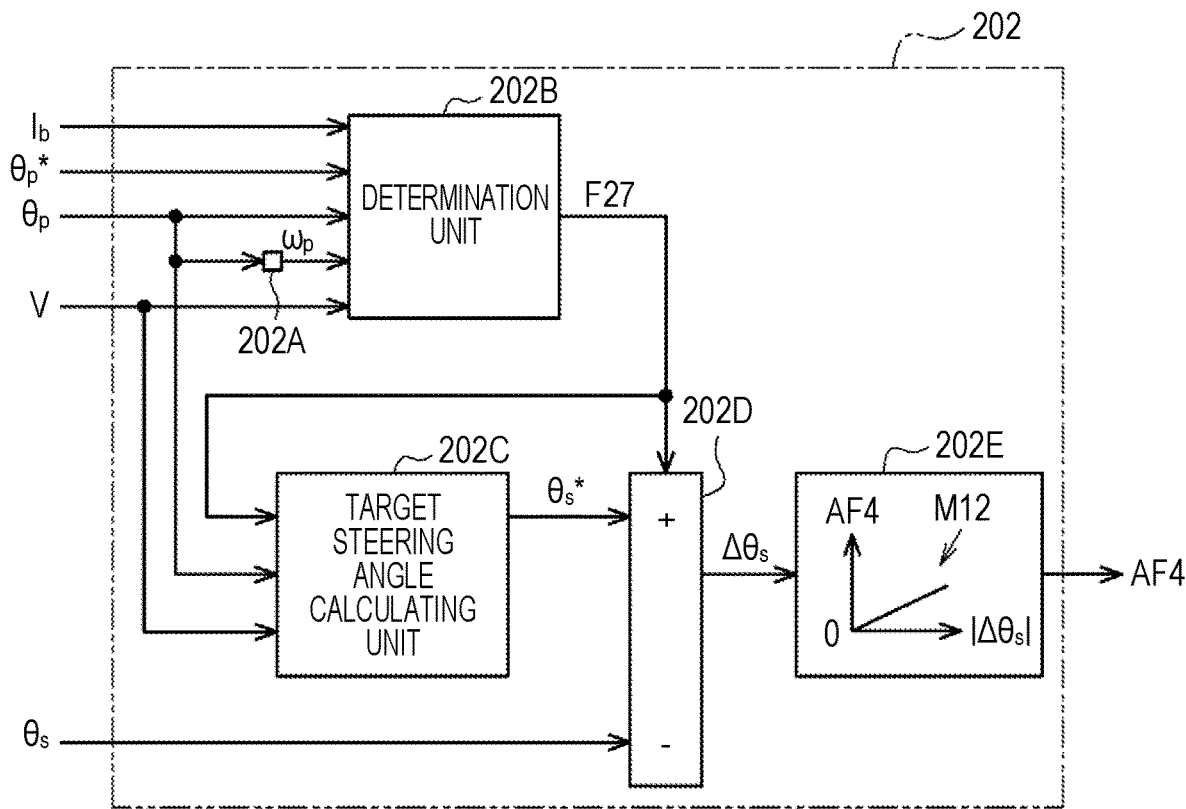
FIG. 22 is a block diagram illustrating a curbstone axial force calculating unit according to the eighth embodiment.

As illustrated in FIG. 22, the curbstone axial force calculating unit 202 includes a differentiator 202A, a determination unit 202B, a target steering angle calculating unit 202C, a subtractor 202D, and an axial force calculating unit 202E. The differentiator 202A receives the pinion angle $\theta_p$ calculated by the pinion angle calculating unit 61, and calculates a pinion angular velocity $\omega_p$ by differentiating the received pinion angle $\theta_p$.

The determination unit 202B receives the value of the current $I_b$ of the turning motor 41, the target pinion angle $\theta_p^*$ calculated by the target pinion angle calculating unit 62, the pinion angle $\theta_p$ calculated by the pinion angle calculating unit 61, and the vehicle speed V detected by the vehicle speed sensor 501. The determination unit 202B determines whether the turning wheels 16 and 16 are in contact with an obstacle such as a curbstone based on the target pinion angle $\theta_p^*$, the pinion angle $\theta_p$, and the vehicle speed V which are received. When all of the following four determination conditions (B1) to (B4) are satisfied, the determination unit 202B determines that the turning wheels 16 and 16 are in contact with an obstacle such as a curbstone.

$$|\theta \Delta_p (=|\theta_p^* - \theta_p|)| > \theta_{pth} \quad \text{(B1)}$$

$$|I_b| > I_{th} \quad \text{(B2)}$$

$$|\omega_p| < \omega_{th} \quad \text{(B3)}$$

$$|V| < V_{th} \quad \text{(B4)}$$

In Determination Condition (B1), "$\Delta\theta_p$" is an angle difference and is acquired by subtracting the actual pinion angle $\theta_p$ from the target pinion angle $\theta_p^*$. "$\theta_{pth}$" is an angle difference threshold value. The angle difference threshold value $\theta_{pth}$ is set based on the following point of view. That is, when the turning wheels 16 and 16 are in contact with an obstacle, it is difficult to turn the turning wheels 16 and 16 to an additional turning steering side or a returning steering side. When the steering wheel 11 is steered to the additional turning steering side or the returning steering side in this state, the target pinion angle $\theta_p^*$ increases with this steering and the turning angle $\theta_w$ or the pinion angle $\theta_p$ is being held at a constant value. Accordingly, in the situation in which the turning wheels 16 and 16 are in contact with an obstacle, the value of the difference between the target pinion angle $\theta_p^*$ and the pinion angle $\theta_p$ increases as it is further tried to additionally turn the turning wheels 16 and 16. As a result, it can be said that there is a higher likelihood that the turning wheels 16 and 16 are in contact with an obstacle as the absolute value of the angle difference $\Delta\theta_p$ becomes larger. Accordingly, the angle difference $\Delta\theta_p$ is a value indicating a probability of the situation in which the turning wheels 16 and 16 are in contact with an obstacle. Based on this point of view, the angle difference threshold value $\Delta\theta_{pth}$ is set by experiment or simulation in consideration of a tolerance due to noise or the like of the rotation angle sensor 43.

In Determination Condition (B2), "$I_{th}$" is a current threshold value. The current threshold value $I_{th}$ is set based on the following point of view. That is, in a situation in which the turning wheels 16 and 16 are in contact with an obstacle, the absolute value of the current $I_b$ of the turning motor 41 increases as it is further tried to additionally turn the turning wheels 16 and 16. Accordingly, it can be said that there is a higher likelihood that the turning wheels 16 and 16 are in contact with an obstacle as the absolute value of the current $I_b$ of the turning motor 41 becomes larger. The value of the current $I_b$ of the turning motor 41 is a value indicating a probability of the situation in which the turning wheels 16 and 16 are in contact with an obstacle. Based on this point of view, the current threshold value $I_{th}$ is set by experiment or simulation.

In Determination Condition (B3), "$\omega_p$" is a pinion angular velocity and is acquired by differentiating the pinion angle $\theta_p$. "$\omega_{th}$" is an angular velocity threshold value. The angular velocity threshold value cop, is set based on the following point of view. That is, in a situation in which the turning wheels 16 and 16 are in contact with an obstacle, it is difficult to turn the turning wheels 16 and 16. Accordingly, it can be said that there is a higher likelihood that the turning wheels 16 and 16 are in contact with an obstacle as the absolute value of the turning speed of the turning wheels 16 and 16 or the pinion angular velocity $\omega_p$ becomes smaller. The pinion angular velocity $\omega_p$ is also a value indicating a probability of the situation in which the turning wheels 16 and 16 are in contact with an obstacle. Based on this point of view, the angular velocity threshold value $\omega_{th}$ is set by experiment or simulation in consideration of a tolerance due to noise or the like of the rotation angle sensor 43.

In Determination Condition (B4), "$V_{th}$" is a vehicle speed threshold value serving as a reference for determining whether the vehicle is traveling at a low speed. The vehicle speed threshold value $V_{th}$ is set based on the vehicle speed V in a so-called low-speed area (0 km/h to lower than 40 km/h) and is set to, for example, "40 km/h." The vehicle speed threshold value $V_{th}$ is set based on a point of view for determining whether the turning wheels 16 and 16 are in contact with an obstacle or determining whether a driver is to be informed of the situation in which the turning wheels 16 and 16 are in contact with an obstacle a station by rapidly changing the steering reaction force as will be described later.

For example, when the vehicle is traveling at a vehicle speed V in a middle speed area (40 km/h to less than 60 km/h) or in a high speed area (equal to or greater than 60 km/h), it is conceivable that a driver has no time in the frame of mind and the driver cannot or hardly take measures such as an obstacle avoiding operation appropriately even if the driver is informed that the turning wheels 16 and 16 are in contact with an obstacle. In consideration of this situation, when the vehicle is traveling at a vehicle speed V in the middle speed area or the high speed area, it may be less necessary to inform a driver that the turning wheels 16 and 16 are in contact with an obstacle and it may be useless to determine whether the turning wheels 16 and 16 are in contact with an obstacle. Accordingly, in this embodiment, a condition that the vehicle is traveling at a vehicle speed V in the low speed area is set as one determination condition for determining whether the turning wheels 16 and 16 are in contact with an obstacle.

The determination unit 202B sets a value of a flag F27 as a determination result indicating whether the turning wheels 16 and 16 are in contact with an obstacle. When it is determined that the turning wheels 16 and 16 are not in contact with an obstacle, that is, when at least one condition of the four Determination Conditions (B1) to (B4) is not satisfied, the determination unit 202B sets the value of the flag F27 to "0." When it is determined that the turning wheels 16 and 16 are in contact with an obstacle, that is, when all of the four Determination Conditions (B1) to (B4) are satisfied, the determination unit 202B sets the value of the flag F27 to "1."

When the determination unit 202B determines that the turning wheels 16 and 16 are in contact with an obstacle, that is, when the value of the flag F27 set by the determination unit 202B is "1," the target steering angle calculating unit 202C calculates a target steering angle $\theta_s^*$ based on the pinion angle $\theta_p$. The target steering angle calculating unit 202C calculates the target steering angle $\theta_s^*$ by converting the pinion angle $\theta_p$ to the steering angle $\theta_s$ according to the vehicle speed V based on the steering angle ratio.

Figure 23:
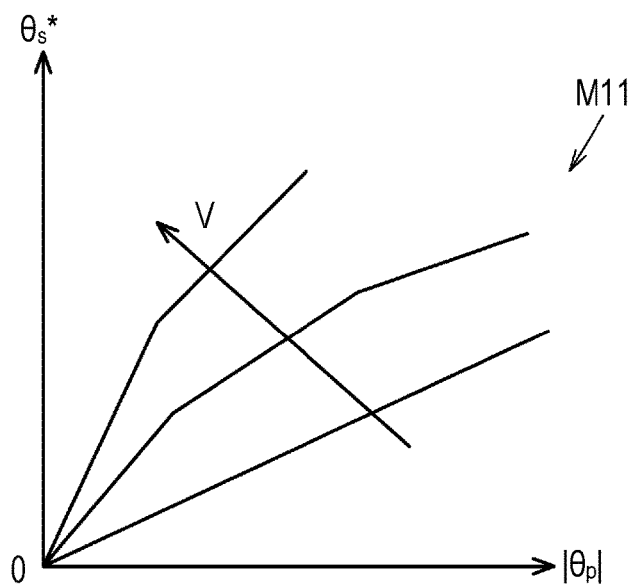
FIG. 23 is a graph illustrating a map for defining a relationship between a pinion angle and a target steering angle based on a vehicle speed, which is used at the time of contact with a curbstone according to the eighth embodiment.

In this embodiment, the target steering angle calculating unit 202C calculates the target steering angle $\theta_s^*$ using a map M11. The map M11 is stored in a storage device of the control device 50. As illustrated in the graph of FIG. 23, the map M11 is a three-dimensional map in which a relationship between the pinion angle $\theta_p$ and the target steering angle $\theta_s^*$ is defined according to the vehicle speed V, and has the following characteristics. That is, the absolute value of the target steering angle $\theta_s^*$ becomes larger as the absolute value of the pinion angle $\theta_p$ becomes larger and the vehicle speed V becomes higher.

When the determination unit 202B determines that the turning wheels 16 and 16 are not in contact with an obstacle, that is, when the value of the flag F27 set by the determination unit 202B is "0," the target steering angle calculating unit 202C does not calculate the target steering angle $\theta_s^*$.

As illustrated in FIG. 22, when the determination unit 202B determines that the turning wheels 16 and 16 are in contact with an obstacle, that is, when the value of the flag F27 set by the determination unit 202B is "1," the subtractor 202D calculates an angle difference $\Delta\theta_S$. The angle difference $\Delta\theta_S$ is a difference between the target steering angle $\theta_s^*$ and the steering angle $\theta_s$ which is acquired by subtracting the steering angle $\theta_s$ calculated by the steering angle calculating unit 51 from the target steering angle $\theta_s^*$ calculated by the target steering angle calculating unit 202C.

When the determination unit 202B determines that the turning wheels 16 and 16 are not in contact with an obstacle, that is, when the value of the flag F27 set by the determination unit 202B is "0," the subtractor 202D does not calculate the angle difference $\Delta\theta_s$.

The axial force calculating unit 202E calculates the curbstone axial force AF4 based on the angle difference $\Delta\theta_s$ calculated by the subtractor 202D. The axial force calculating unit 202E calculates the curbstone axial force AF4 using a map M12 which is stored in the storage device of the control device 50. The map M12 is a two-dimensional map in which the absolute value of the angle difference $\Delta\theta_s$ is set for the horizontal axis and the curbstone axial force AF4 is set for the vertical axis and a relationship between the absolute value of the angle difference $\Delta\theta_s$ and the curbstone axial force AF4 is defined. For example, the map M12 has the following characteristics. That is, the curbstone axial force AF4 is set to be larger as the absolute value of the angle difference $\Delta\theta_s$ increases with respect to "0." The curbstone axial force AF4 is set based on a point of view for generating a steering reaction force to such an extent that it is difficult for a driver to steer the steering wheel to the side on which the turning wheels are in contact with an obstacle.

Accordingly, for example, when the steering wheel 11 is steered in a state in which the turning wheels 16 and 16 are in contact with an obstacle such as a curbstone, the curbstone axial force AF4 is calculated by the curbstone axial force calculating unit 202. The curbstone axial force AF4 is set as a final axial force AF5 when the value thereof becomes larger than the combined axial force AF3 calculated by the combined axial force calculating unit 201. When a converted torque value T2* obtained by converting the final axial force AF5 to a torque is reflected in the steering reaction force command value T*, the steering reaction force increases rapidly. Accordingly, a driver has difficulty operating the steering wheel 11 in a direction in which the absolute value of the steering angle $\theta_s$ increases. As a result, the driver can feel a feeling of ending from the steering reaction force and thus can be aware that turning wheels 16 and 16 are in contact with an obstacle such as a curbstone.

Depending on product specifications, the turning control unit 50b may be configured to change a degree of change (that is, a rate of change) of the steering angle ratio with respect to change of the vehicle speed V according to the steering state. For example, the turning control unit 50b according to the first embodiment maintains the rate of change of the steering angle ratio with respect to the actual change of the vehicle speed V at 0% by fixing the value of the vehicle speed V at the time of turning and held steering in order to curb inward movement of the vehicle due to deceleration in the turning and held steering or protrusion of the vehicle due to acceleration in the turning and held steering state. In this case, in order to synchronize the steering angle $\theta_s$ with the turning angles $\theta_w$ and $\theta_w$, the steering angle ratio which is used in the turning control unit 50b also needs to be considered in the reaction control unit 50a.

Figure 24:
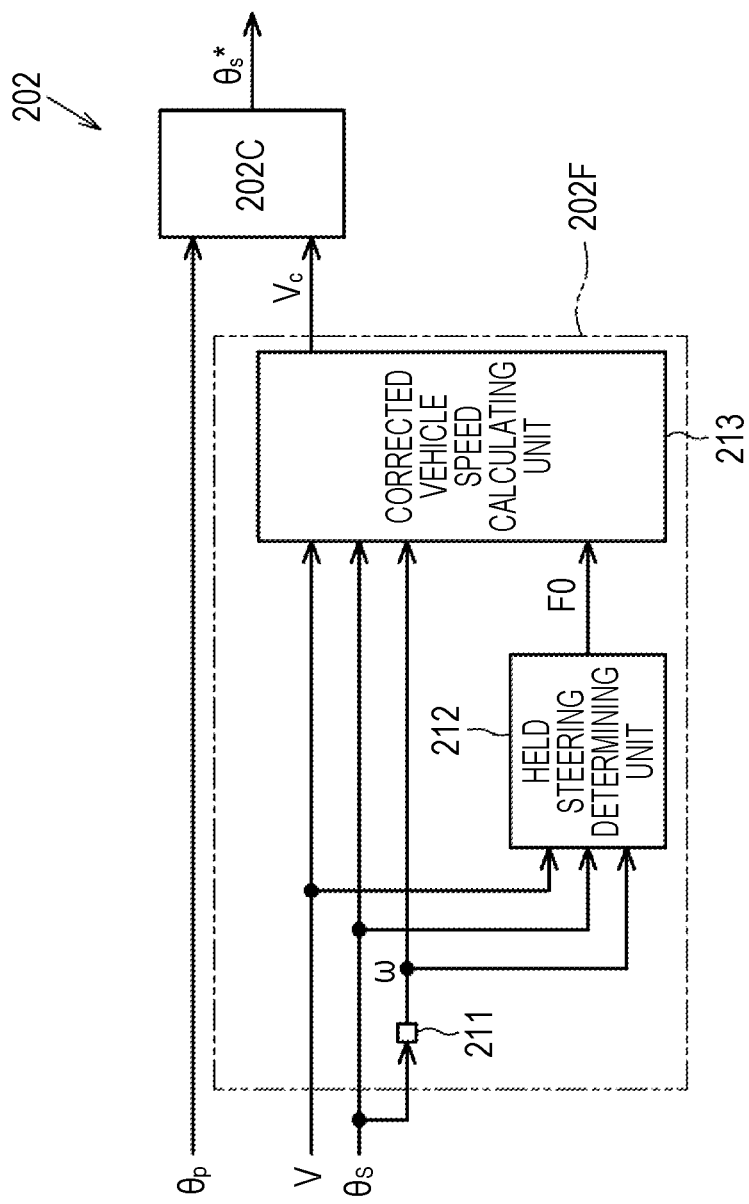
FIG. 24 is a block diagram illustrating a curbstone axial force calculating unit according to the eighth embodiment.

Therefore, when this embodiment is applied to the first embodiment, the following configuration is employed as the curbstone axial force calculating unit 202. As illustrated in FIG. 24, the curbstone axial force calculating unit 202 includes a correction processing unit 202F in addition to the differentiator 202A, the determination unit 202B, the target steering angle calculating unit 202C, the subtractor 202D, and the axial force calculating unit 202E. The correction processing unit 202F includes a differentiator 211, a held steering determining unit 212, and a corrected vehicle speed calculating unit 213 similarly to the correction processing unit 70A according to the first embodiment illustrated in FIG. 4.

The differentiator 211 calculates a steering angular velocity ω by differentiating the steering angle $\theta_s$ calculated by the steering angle calculating unit 51. The held steering determining unit 212 has the same function as the held steering determining unit 72 according to the first embodiment illustrated in FIG. 5. The held steering determining unit 212 determines whether the steering wheel 11 is being held at a constant steering angle $\theta_s$ based on the vehicle speed V, the steering angle $\theta_s$, and the steering angular velocity ω, and sets the value of the flag F0 as a determination result thereof.

The corrected vehicle speed calculating unit 213 has the same function as the corrected vehicle speed calculating unit 73 according to the first embodiment illustrated in FIG. 6. The corrected vehicle speed calculating unit 213 calculates a corrected vehicle speed $V_c$ by correcting the value of the vehicle speed V based on the vehicle speed V, the steering angle $\theta_s$, the steering angular velocity ω, and the value of the flag F0.

Therefore, according to the eighth embodiment, the following advantages can be obtained in addition to the same advantages as in the first embodiment. When the steering wheel 11 is being held at a constant steering angle $\theta_s$ because the turning wheels 16 and 16 come into contact with an obstacle such as a curbstone, the corrected vehicle speed $V_c$ which is the final vehicle speed used to calculate the target pinion angle $\theta_p^*$ and the target steering angle $\theta_s^*$ is fixed to the vehicle speed when it is determined that the steering wheel 11 is in the held steering state. Accordingly, the values of the target pinion angle $\theta_p^*$ and the target steering angle $\theta_s^*$ do not change regardless of the actual value of the vehicle speed V detected by the vehicle speed sensor 501. That is, in the state in which the steering wheel 11 is being held at a constant steering angle $\theta_s$, the relationship between the pinion angle $\theta_p$ and the target steering angle $\theta_s^*$ in the reaction control unit 50a is synchronized with the relationship between the steering angle $\theta_s$ and the target pinion angle $\theta_p^*$ in the turning control unit 50b. Accordingly, when the steering wheel 11 is being held at a constant steering angle $\theta_s$ because the turning wheels 16 and 16 are in contact with an obstacle such as a curbstone, the steering angle $\theta_s$ and the turning angle $\theta_w$ can be synchronized with each other.

Ninth Embodiment

A steering control device according to a ninth embodiment will be described below. This embodiment basically has the same configuration as in the first embodiment illustrated in FIGS. 1 to 7. This embodiment is different from the first embodiment in the configuration of the steering reaction force command value calculating unit 52 of the reaction control unit 50a.

In a steer-by-wire steering system 10, the steering wheel 11 is not restricted by the turning wheels 16 and 16. Accordingly, when a certain external force is applied to the steering wheel 11 in a state in which the vehicle is powered off, the steering wheel 11 may rotate. At this time, since the turning shaft 14 does not operate, the positional relationship between the steering wheel 11 and the turning wheels 16 and 16 may become different from the original positional relationship based on a predetermined steering angle ratio. Accordingly, the control device 50 has a function of automatically adjusting the position of the steering wheel 11 as an initial operation when the vehicle is powered on again.

Figure 25:
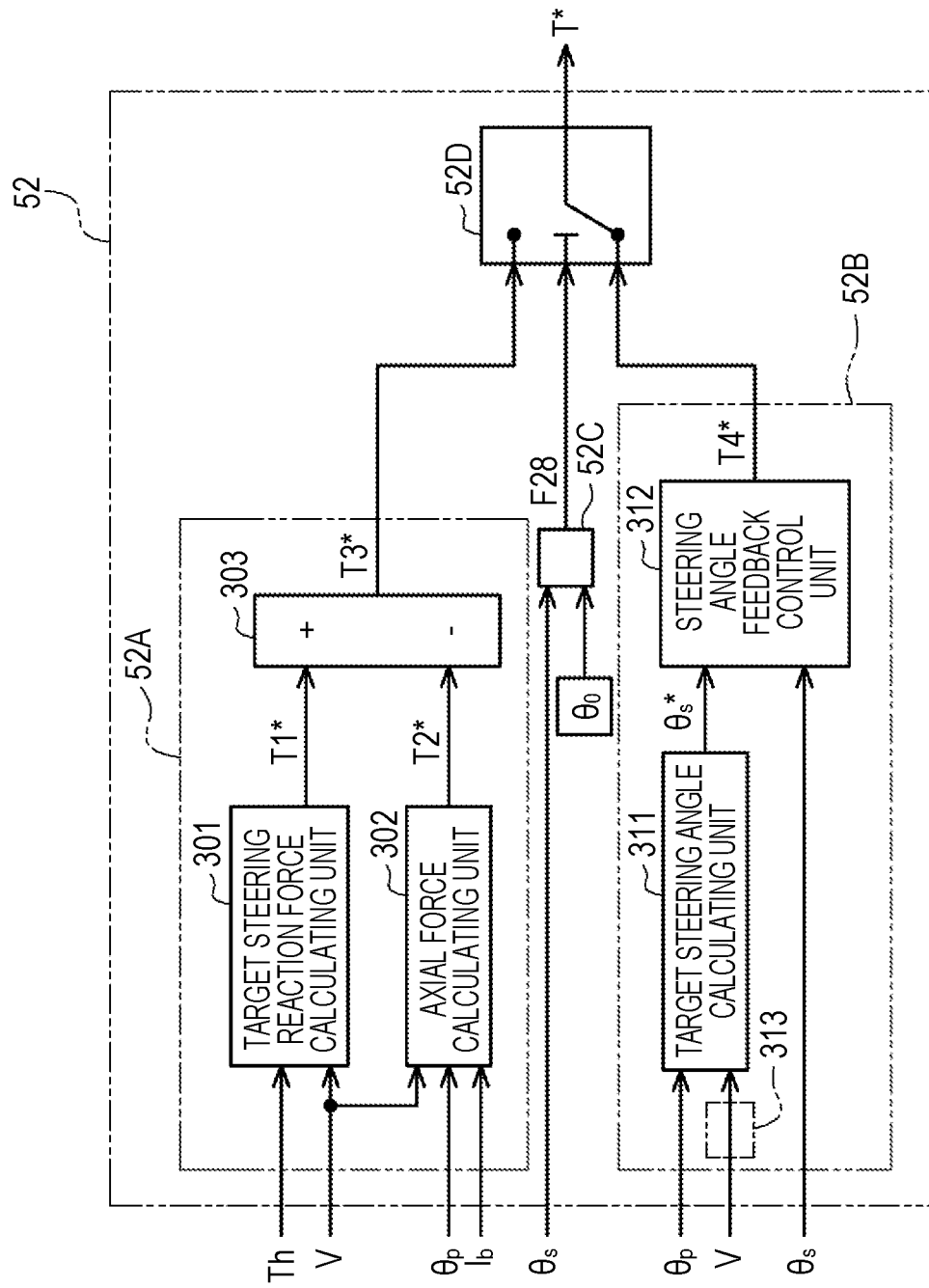
FIG. 25 is a block diagram illustrating a steering reaction force command value calculating unit according to a ninth embodiment.

As illustrated in FIG. 25, the steering reaction force command value calculating unit 52 includes a first control unit 52A, a second control unit 52B, a determination unit 52C, and a switch 52D. The first control unit 52A is a part that performs normal reaction control such that a steering reaction force based on a steering torque $T_h$ is generated through drive control of the reaction motor 31. The first control unit 52A includes a target steering reaction force calculating unit 301, an axial force calculating unit 302, and a subtractor 303.

The target steering reaction force calculating unit 301 calculates a target steering reaction force T1* based on the steering torque $T_h$ and the vehicle speed V. The target steering reaction force T1* is a target value of a steering reaction force which is to be generated by the reaction motor 31. The target steering reaction force calculating unit 301 calculates the target steering reaction force T1* such that the absolute value thereof becomes larger as the absolute value of the steering torque $T_h$ becomes larger and the vehicle speed V becomes lower.

The axial force calculating unit 302 calculates an axial force which is applied to the turning shaft 14, for example, based on the pinion angle $\theta_p$ and the value of the current $I_b$ of the turning motor 41 and calculates a converted torque value (that is, a steering reaction force based on the axial force) T2* obtained by converting the calculated axial force to a torque.

The subtractor 303 calculates a steering reaction force command value T3* by subtracting the converted torque value T2* calculated by the axial force calculating unit 302 from the target steering reaction force T1* calculated by the target steering reaction force calculating unit 301.

The second control unit 52B performs an adjustment process of automatically adjusting a rotational position of the steering wheel 11. The adjustment process is a process of synchronizing the positional relationship between the steering wheel 11 and the turning wheels 16 and 16 with the original positional relationship based on a predetermined steering angle ratio when the vehicle is switched from an OFF state to an ON state.

The second control unit 52B includes a target steering angle calculating unit 311 and a steering angle feedback control unit 312. The target steering angle calculating unit 311 calculates the target steering angle $\theta_s^*$ based on the pinion angle $\theta_p$ calculated by the pinion angle calculating unit 61. The target steering angle calculating unit 311 calculates the target steering angle $\theta_s^*$ by converting the pinion angle $\theta_p$ to a steering angle $\theta_s$ according to the vehicle speed V based on the steering angle ratio which is a ratio of the turning angle $\theta_w$ to the steering angle $\theta_s$. In this embodiment, the target steering angle calculating unit 311 calculates the target steering angle $\theta_s^*$ using a map M13 which is stored in the storage device of the control device 50.

Figure 26:
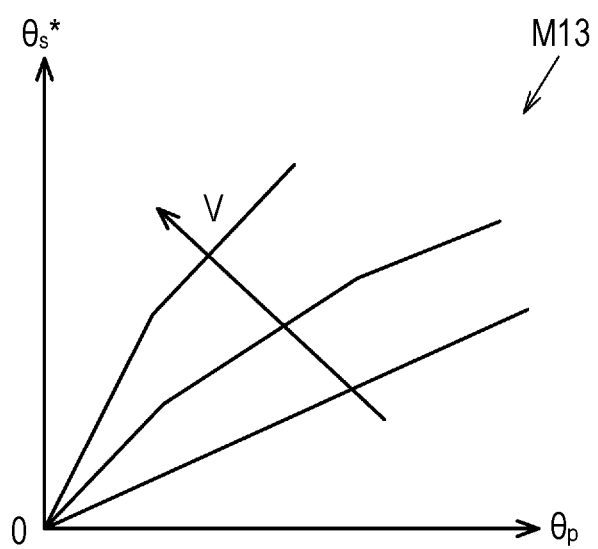
FIG. 26 is a graph illustrating a map for defining a relationship between a pinion angle and a target steering angle based on a vehicle speed according to the ninth embodiment.

As illustrated in the graph of FIG. 26, the map M13 is a three-dimensional map in which a relationship between the pinion angle $\theta_p$ and the target steering angle $\theta_s^*$ is defined according to the vehicle speed V and has the following characteristics. That is, the absolute value of the target steering angle $\theta_s^*$ becomes larger as the absolute value of the pinion angle $\theta_p$ becomes larger and the vehicle speed V becomes higher.

The steering angle feedback control unit 312 receives the target steering angle $\theta_s^*$ calculated by the target steering angle calculating unit 311 and the steering angle $\theta_s$ calculated by the steering angle calculating unit 51. The steering angle feedback control unit 312 calculates a steering reaction force command value T4* by performing feedback control of the steering angle $\theta_s$ such that the steering angle $\theta_s$ conforms to the target steering angle $\theta_s^*$.

When the vehicle is powered on and when the position of the steering wheel 11 needs to be adjusted and the adjustment of the position has not been completed, the determination unit 52C sets a value of a flag F28 to "0." When the vehicle is powered on and when the position of the steering wheel 11 needs to be adjusted and the adjustment of the position has been completed or when the position of the steering wheel 11 does not need to be adjusted, the determination unit 52C sets the value of the flag F28 to "1."

When the vehicle is switched from the ON state to the OFF state, the determination unit 52C stores the steering angle $\theta_s$ which has been previously calculated as a reference steering angle $\theta_0$ in the storage device of the vehicle. The reference steering angle $\theta_0$ serves as a reference for determining whether the steering wheel 11 has rotated in a period in which the vehicle is in the OFF state. When the vehicle is switched from the OFF state to the ON state, the determination unit 52C determines whether the position of the steering wheel 11 needs to be adjusted by comparing the steering angle $\theta_s$ calculated immediately after the vehicle has been turned on with the reference steering angle $\theta_0$ stored in the storage device of the vehicle.

When the reference steering angle $\theta_0$ which is the steering angle $\theta_s$ immediately before the vehicle is turned off and the steering angle $\theta_s$ immediately after the vehicle is powered on again are equal to each other, the determination unit 52C determines that the position of the steering wheel 11 does not need to be adjusted. When the reference steering angle $\theta_0$ which is the steering angle $\theta_s$ immediately before the vehicle is turned off and the steering angle $\theta_s$ immediately after the vehicle is powered on again are not equal to each other, the determination unit 52C determines that the position of the steering wheel 11 needs to be adjusted.

The switch 52D receives the steering reaction force command value T3* calculated by the first control unit 52A and the steering reaction force command value T4* calculated by the second control unit 52B as data inputs. The switch 52D receives the value of the flag F28 set by the determination unit 52C as a control input.

The switch 52D selects one of the steering reaction force command value T3* calculated by the first control unit 52A and the steering reaction force command value T4* calculated by the second control unit 52B as a steering reaction force command value T* based on the value of the flag F28. When the value of the flag F28 is "0," the switch 52D selects the steering reaction force command value T4* calculated by the second control unit 52B as a final steering reaction force command value T5*. When the value of the flag F28 is "1," the switch 52D selects the steering reaction force command value T3* calculated by the first control unit 52A as the final steering reaction force command value T5*.

With this configuration, normal reaction control which is performed by the first control unit 52A and control for adjusting the rotational position of the steering wheel 11 which is performed by the second control unit 52B are switched therebetween based on whether the rotational position of the steering wheel 11 needs to be adjusted. For example, when the steering angle $\theta_s$ has not changed in a period in which the vehicle is powered on again after the vehicle has been powered off, the normal reaction control in which a steering reaction force is generated based on the steering torque $T_h$ is started when the vehicle is powered on again. For example, when the steering wheel 11 rotates by a predetermined angle in the counterclockwise direction in the period in which the vehicle is powered off, the process of adjusting the rotational position of the steering wheel 11 is performed when the vehicle is powered on again. That is, the steering wheel 11 is rotated by a predetermined angle in the clockwise direction through the drive control of the reaction motor 31. Accordingly, the positional relationship between the steering wheel 11 and the turning wheels 16 and 16 is returned to the original positional relationship based on a predetermined steering angle ratio.

Depending on product specifications, the turning control unit 50b may be configured to change a degree of change (that is, a rate of change) of the steering angle ratio with respect to change of the vehicle speed V according to the steering state. For example, the turning control unit 50b according to the first embodiment maintains the rate of change of the steering angle ratio with respect to the actual change of the vehicle speed V at 0% by fixing the value of the vehicle speed V at the time of turning and held steering in order to curb inward movement of the vehicle due to deceleration in the turning and held steering or protrusion of the vehicle due to acceleration in the turning and held steering state. In this case, in order to synchronize the steering angle $\theta_s$ with the turning angles $\theta_w$ and $\theta_w$ by performing the process of adjusting the rotational position of the steering wheel 11, the steering angle ratio which is used in the turning control unit 50b also needs to be considered in the reaction control unit 50a.

Therefore, when this embodiment is applied to the first embodiment, the following configuration is employed as the second control unit 52B. That is, as indicated by a two-dot chain line in FIG. 25, the second control unit 52B includes a correction processing unit 313 that performs a process of correcting the vehicle speed V. The correction processing unit 313 has the same configuration as the correction processing unit 70A according to the first embodiment illustrated in FIG. 4. The correction processing unit 313 calculates a corrected vehicle speed $V_c$ based on steering state of the steering wheel 11, that is, whether the steering wheel 11 is being held at a constant steering angle $\theta_s$.

Therefore, according to the ninth embodiment, the following advantages can be obtained in addition to the same advantages as in the first embodiment. Even when the process of adjusting the rotational position of the steering wheel 11 is performed as an initial operation when the vehicle is turned on and when the steering wheel 11 is being held, the relationship between the pinion angle $\theta_p$ and the target steering angle $\theta_s^*$ in the reaction control unit 50a is synchronized with the relationship between the steering angle $\theta_s$ and the target pinion angle $\theta_p^*$ in the turning control unit 50b. Accordingly, it is possible to synchronize the steering angle $\theta_s$ and the turning angle $\theta_w$ with each other.

Tenth Embodiment

A steering control device according to a tenth embodiment will be described below. This embodiment basically has the same configuration as in the first embodiment illustrated in FIGS. 1 to 7. This embodiment is different from the first embodiment in that an automated driving function is provided.

An automated driving system that realizes an automated driving function for allowing driving to be replaced with various driving support functions or systems for improving safety or convenience of a vehicle may be mounted in the vehicle. In this case, cooperative control which is performed by the control device 50 and a control device of an onboard system other than the control device 50 is performed in such a vehicle. Cooperative control is a technique of allowing control devices of a plurality of types of onboard systems to control movement of the vehicle in cooperation with each other. For example, a host control device 500 that comprehensively controls control devices of various onboard systems is mounted in a vehicle. The host control device 500 acquires an optimal control method based on a vehicle state at that time and individually commands various onboard control devices to perform control based on the acquired control method.

The host control device 500 intervenes in steering control which is performed by the control device 50. The host control device 500 switches its automated driving control function between ON (validation) and OFF (invalidation) through operation of a switch (not illustrated) which is provided in a driver's seat or the like. The automated driving control function includes a driving support control function for improving safety or convenience of the vehicle.

For example, the host control device 500 calculates an additional target pinion angle $\theta_{pa}^*$ as a command value for causing the vehicle to travel in a target lane. The additional target pinion angle $\theta_{pa}^*$ is a target value of a pinion angle (an angle which is to be added to the current pinion angle) required for the vehicle to travel along a lane according to a traveling state or a steering state of the vehicle at that time. The control device 50 controls the reaction motor 31 and the turning motor 41 using the additional target pinion angle $\theta_{pa}^*$ calculated by the host control device 500.

Figure 27:
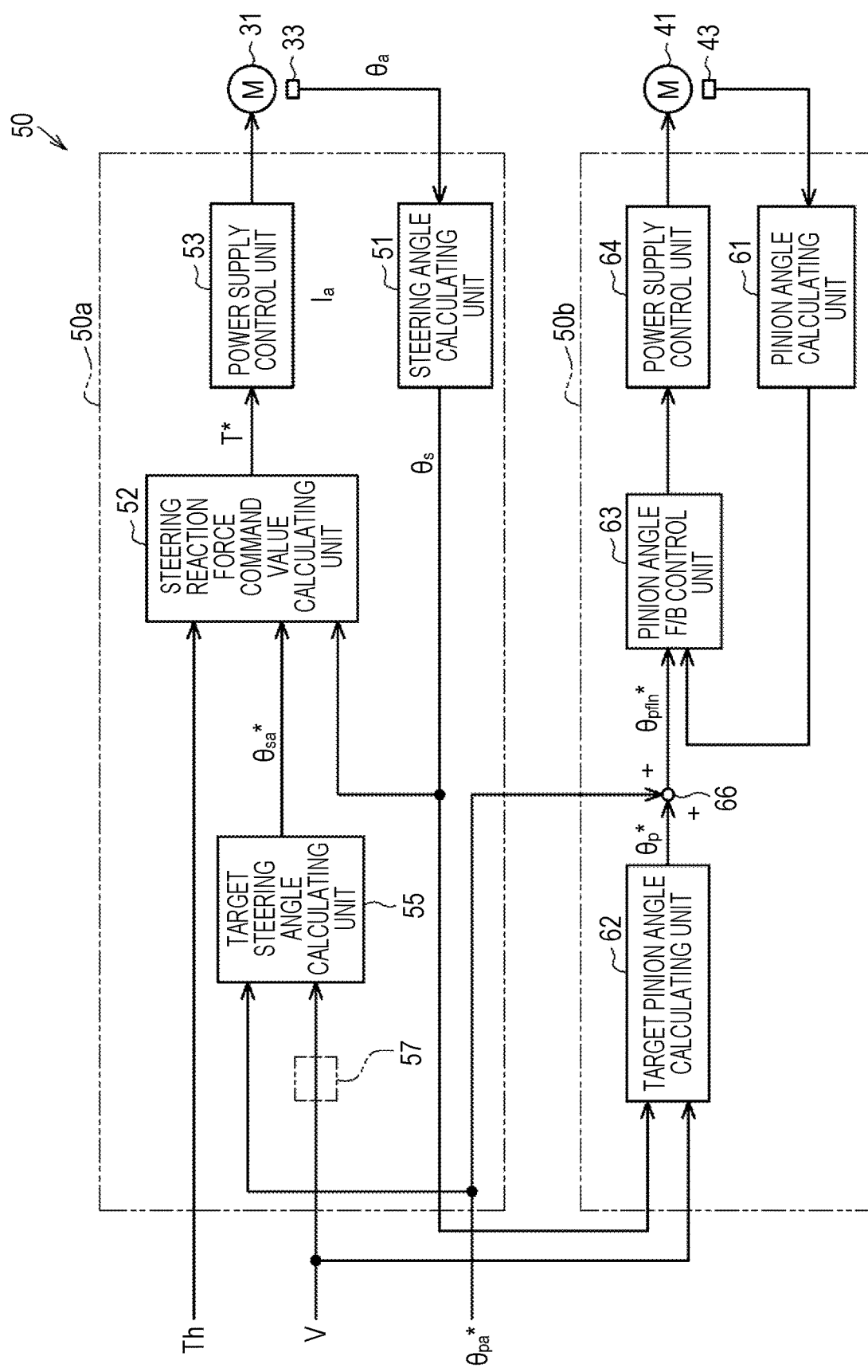
FIG. 27 is a block diagram illustrating a control device according to a tenth embodiment.

As illustrated in FIG. 27, the reaction control unit 50a includes a target steering angle calculating unit 55 in addition to the steering angle calculating unit 51, the steering reaction force command value calculating unit 52, and the power supply control unit 53. The target steering angle calculating unit 55 receives the additional target pinion angle $\theta_{pa}^*$ calculated by the host control device 500 and the vehicle speed V detected by the vehicle speed sensor 501 and calculates an additional target steering pinion angle $\theta_{sa}^*$ based on the additional target pinion angle $\theta_{pa}^*$ and the vehicle speed V which are received. The target steering angle calculating unit 55 calculates the additional target steering pinion angle $\theta_{sa}^*$ by converting the additional target pinion angle $\theta_{pa}^*$ to a steering angle according to the vehicle speed V based on the steering angle ratio which is a ratio of the turning angle $\theta_w$ to the steering angle $\theta_s$. In this embodiment, the target steering angle calculating unit 55 calculates the additional target steering pinion angle $\theta_{sa}$ using a map M14 which is stored in the storage device of the control device 50.

Figure 28:
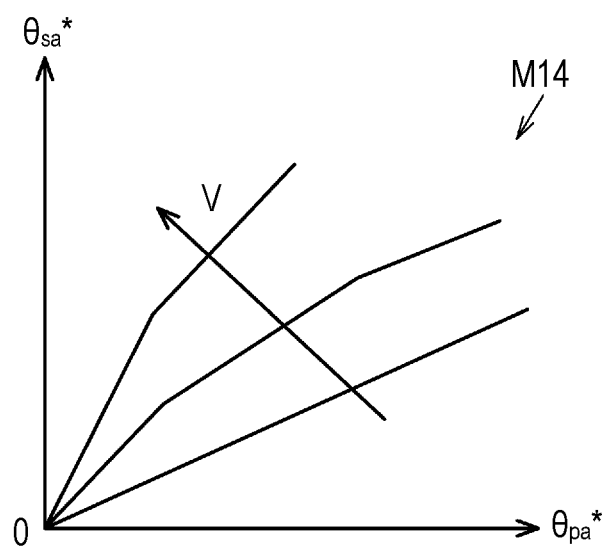
FIG. 28 is a graph illustrating a map for defining a relationship between a target pinion angle (an addition angle) and a target steering angle (an addition angle) based on a vehicle speed, which is used at the time of performing an automated driving function according to the tenth embodiment.

As illustrated in the graph of FIG. 28, the map M14 is a three-dimensional map in which a relationship between the additional target pinion angle $\theta_{pa}$ and the additional target steering pinion angle $\theta_{sa}^*$ is defined according to the vehicle speed V, and has the following characteristics. That is, as the absolute value of the additional target pinion angle $\theta_{pa}^*$ becomes larger and as the vehicle speed V becomes higher, the absolute value of the additional target steering pinion angle $\theta_{sa}^*$ becomes larger.

As illustrated in FIG. 27, the steering reaction force command value calculating unit 52 calculates the steering reaction force command value T* using the steering torque $T_h$ detected by the torque sensor 34, the steering angle $\theta_s$ calculated by the steering angle calculating unit 51, and the additional target steering pinion angle $\theta_{sa}^*$ calculated by the target steering angle calculating unit 55. When electric power based on the steering reaction force command value T* is supplied to the reaction motor 31, the reaction motor 31 rotates by an angle corresponding to the steering reaction force command value T*. Details of the steering reaction force command value calculating unit 52 will be described later.

The turning control unit 50b includes an adder 66 in addition to a pinion angle calculating unit 61, a target pinion angle calculating unit 62, a pinion angle feedback control unit 63, and a power supply control unit 64. The adder 66 calculates a final target pinion angle $\theta_{pfin}^*$ which is a final target pinion angle used to calculate a pinion angle command value $T_p^*$ by adding the additional target pinion angle $\theta_{pa}$ calculated by the host control device 500 to the target pinion angle $\theta_p^*$ calculated by the target pinion angle calculating unit 62. The adder 66 supplies the calculated final target pinion angle $\theta_{pfin}^*$ to the pinion angle feedback control unit 63. The pinion angle feedback control unit 63 calculates the pinion angle command value $T_p^*$ by performing feedback control of the pinion angle $\theta_p$ such that the actual pinion angle $\theta_p$ calculated by the pinion angle calculating unit 61 conforms to the final target pinion angle $\theta_{pfin}^*$. When electric power based on the pinion angle command value $T_p^*$ is supplied to the turning motor 41, the turning motor 41 rotates by an angle corresponding to the pinion angle command value $T_p^*$.

Figure 29:
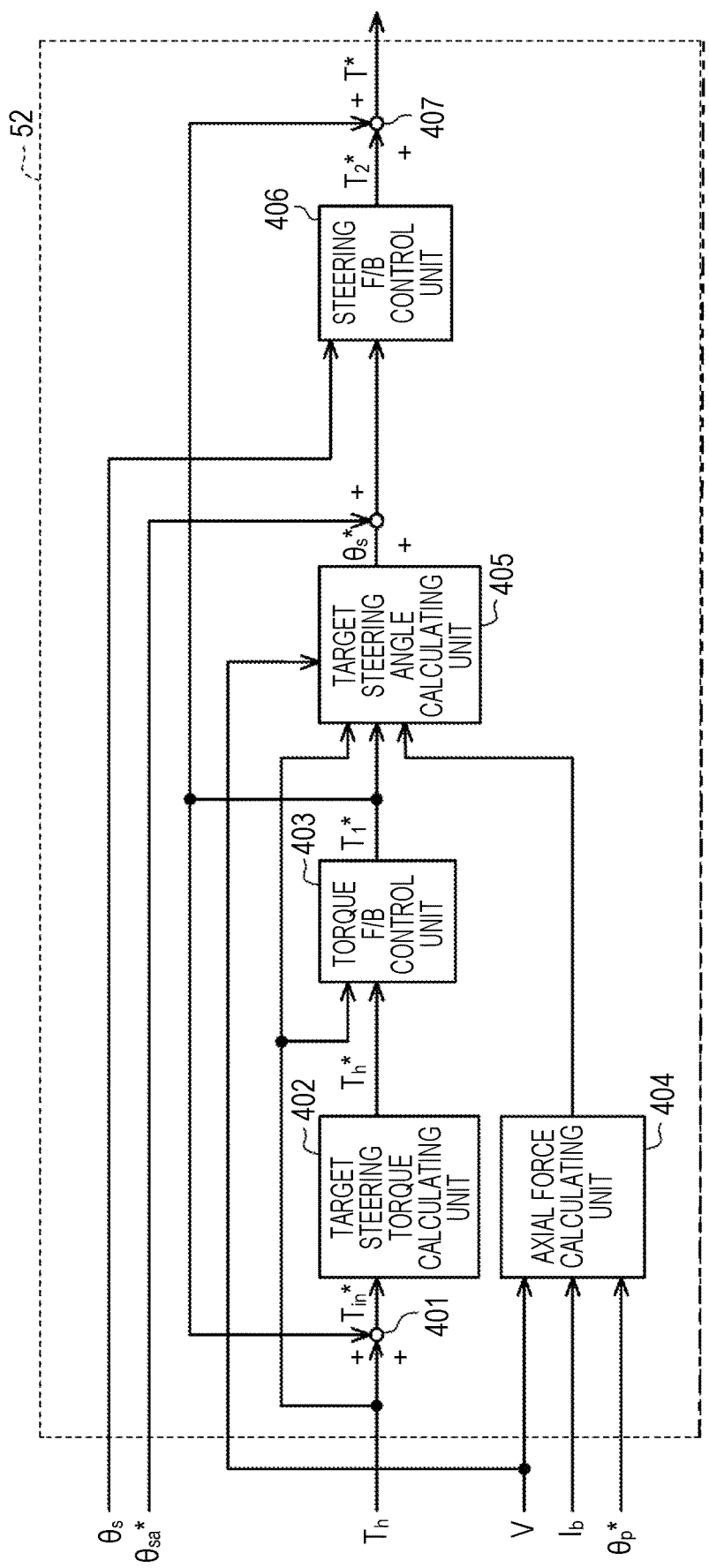
FIG. 29 is a block diagram illustrating a steering reaction force command value calculating unit according to the tenth embodiment.

An example of the steering reaction force command value calculating unit 52 will be described below in detail. As illustrated in FIG. 29, the steering reaction force command value calculating unit 52 includes an adder 401, a target steering torque calculating unit 402, a torque feedback control unit 403, an axial force calculating unit 404, a target steering angle calculating unit 405, a steering angle feedback control unit 406, and an adder 407.

The adder 401 calculates an input torque $T_{in}^*$ which is a torque applied to the steering shaft 12 by adding a first steering reaction force command value $T_{11}^*$ calculated by the torque feedback control unit 403 to the steering torque $T_h$ detected by the torque sensor 34.

The target steering torque calculating unit 402 calculates a target steering torque $T_h^*$ based on the input torque $T_{in}^*$ calculated by the adder 401. The target steering torque $T_h^*$ is a target value of the steering torque $T_h$ to be applied to the steering wheel 11. The target steering torque calculating unit 402 calculates the target steering torque $T_h^*$ such that the absolute value thereof increases as the absolute value of the input torque $T_{in}^*$ increases.

The torque feedback control unit 403 receives the steering torque $T_h$ detected by the torque sensor 34 and the target steering torque $T_h^*$ calculated by the target steering torque calculating unit 402. The torque feedback control unit 403 calculates the first steering reaction force command value $T_{11}^*$ through feedback control of the steering torque $T_h$ such that the steering torque $T_h$ detected by the torque sensor 34 conforms to the target steering torque $T_h^*$.

The axial force calculating unit 404 calculates an axial force acting on the turning shaft 14, for example, based on the pinion angle $\theta_p$, the value of the current $I_b$ of the turning motor 41, and the vehicle speed V, and calculates a converted torque value (that is, a steering reaction force based on the axial force) $T_{af}$ by converting the calculated axial force to a torque.

The target steering angle calculating unit 405 receives the steering torque $T_h$ detected by the torque sensor 34, the first steering reaction force command value $T_{11}^*$ calculated by the torque feedback control unit 403, the converted torque value $T_{af}$ calculated by the axial force calculating unit 404, and the vehicle speed V detected by the vehicle speed sensor 501. The target steering angle calculating unit 405 calculates a target steering angle $\theta_s^*$ of the steering wheel 11 based on the steering torque $T_h$, the first steering reaction force command value $T_{11}^*$, the converted torque value $T_{af}$, and the vehicle speed V which are received.

The target steering angle calculating unit 405 calculates a final input torque $T_{in}^*$ for the steering wheel 11 by subtracting the converted torque value $T_{af}$ (the steering reaction force based on the axial force) from the input torque $T_{in}^*$ which is the sum of the first steering reaction force command value $T_{11}^*$ and the steering torque $T_h$. The target steering angle calculating unit 405 calculates the target steering angle $\theta_s$ based on the final input torque $T_{in}^*$ and an ideal model expressed by the following Expression (A7). The ideal model is obtained by modeling the steering angle of the steering wheel 11 corresponding to an ideal turning angle based on the input torque $T_{in}^*$ by experiment or the like in advance based on the premise of a steering system in which the steering wheel 11 is mechanically connected to the turning wheels 16 and 16.

$$T_{in}^* = J\theta_s'' + C\theta_s' + K\theta_s \quad (A7)$$

Here, "J" represents an inertia coefficient corresponding to a moment of inertia of the steering wheel 11 and the steering shaft 12, "C" represents a viscosity coefficient (friction coefficient) corresponding to friction or the like of the turning shaft 14 against the housing, and "K" represents a spring coefficient when the steering wheel 11 and the steering shaft 12 are considered as springs. The viscosity coefficient C and the inertia coefficient J have values based on the vehicle speed V. "$\theta_s''$" is a second-order differential value of the steering angle $\theta_s$, and "$\theta_s'$" is a first-order differential value of the steering angle $\theta_s$.

When the automated driving control function is turned on and the additional target pinion angle $\theta_{pa}^*$ is calculated by the host control device 500, the additional target steering pinion angle $\theta_{sa}^*$ calculated by the target steering angle calculating unit 55 is added to the target steering angle $\theta_s^*$ calculated by the target steering angle calculating unit 405.

The steering angle feedback control unit 406 receives the steering angle $\theta_s$ calculated by the steering angle calculating unit 51 and the target steering angle $\theta_s^*$ calculated by the target steering angle calculating unit 405. The steering angle feedback control unit 406 calculates a second steering reaction force command value $T_{12}^*$ through feedback control of the steering angle $\theta_s$ such that the actual steering angle $\theta_s$ calculated by the steering angle calculating unit 51 conforms to the target steering angle $\theta_s^*$.

The adder 407 calculates a steering reaction force command value $T^*$ by adding the second steering reaction force command value $T_{12}^*$ calculated by the steering angle feedback control unit 406 to the first steering reaction force command value $T_{11}^*$ calculated by the torque feedback control unit 403.

With this configuration, when the automated driving control function is turned on and the additional target pinion angle $\theta_{pa}^*$ is calculated by the host control device 500, the additional target steering pinion angle $\theta_{sa}^*$ is calculated by converting the additional target pinion angle $\theta_{pa}^*$ to a steering angle according to the vehicle speed V based on the steering angle ratio. Accordingly, at the time of manual driving which is performed by a driver and at the time of automated driving control which is performed by the host control device 500, change of the steering angle $\theta_s$, that is, movement of the steering wheel 11, can be set to be the same.

Depending on product specifications, the turning control unit 50b may be configured to change a degree of change (that is, a rate of change) of the steering angle ratio with respect to change of the vehicle speed V according to the steering state. For example, the turning control unit 50b according to the first embodiment maintains the rate of change of the steering angle ratio with respect to the actual change of the vehicle speed V at 0% by fixing the value of the vehicle speed V at the time of turning and held steering in order to curb inward movement of the vehicle due to deceleration in the turning and held steering or protrusion of the vehicle due to acceleration in the turning and held steering state. In this case, in order to synchronize the steering angle $\theta_s$ with the turning angles $\theta_w$ and $\theta_w$, the steering angle ratio which is used in the turning control unit 50b also needs to be considered in the reaction control unit 50a.

Therefore, when this embodiment is applied to the first embodiment, the following configuration is employed as the reaction control unit 50a. That is, as indicated by a two-dot chain line in FIG. 27, the reaction control unit 50a includes a correction processing unit 57 that performs a process of correcting the vehicle speed V. The correction processing unit 57 has the same configuration as the correction processing unit 70A according to the first embodiment illustrated in FIG. 4. The correction processing unit 57 calculates a corrected vehicle speed $V_c$ based on steering state of the steering wheel 11, that is, whether the steering wheel 11 is being held at a constant steering angle $\theta_s$.

The host control device 500 calculates the additional target pinion angle $\theta_{pa}*$ which is an angle to be added to the current pinion angle $\theta_p$, but, for example, the target pinion angle $\theta_p*$ may be calculated as a target value of an ideal pinion angle $\theta_p$ required for the vehicle to travel along a lane.

Therefore, according to the tenth embodiment, the following advantages can be obtained in addition to the same advantages as in the first embodiment. Even when the steering wheel 11 is being held at the time of automated driving control which is performed by the host control device 500, the relationship between the additional target pinion angle $\theta_{pa}*$ and the additional target steering pinion angle $\theta_{sa}*$ in the reaction control unit 50a is synchronized with the relationship between the steering angle $\theta_s$ and the target pinion angle $\theta_p*$ in the turning control unit 50b. Accordingly, it is possible to synchronize the steering angle $\theta_s$ and the turning angle $\theta_w$ with each other.

Other Embodiments

The aforementioned embodiments may be modified as follows. The eighth embodiment may be applied to the second embodiment. That is, the curbstone axial force calculating unit 202 uses an estimated steering angle $\theta_{es}$ which is calculated based on the steering torque $T_h$ and an estimated steering angular velocity $\omega_{es}$ which is acquired by differentiating the estimated steering angle $\theta_{es}$ instead of the steering angle $\theta_s$ and the steering angular velocity $\omega$. In the same way as the eighth embodiment, the ninth and tenth embodiments may be applied to the second embodiment.

The eighth embodiment may be applied to the third embodiment. In this case, the curbstone axial force calculating unit 202 is configured as follows. That is, as described in parentheses in FIG. 10, the curbstone axial force calculating unit 202 includes a speed increasing ratio calculating unit 221, a correction processing unit 222, and a divider 223. The speed increasing ratio calculating unit 221 has the same function as the speed increasing ratio calculating unit 111 according to the third embodiment illustrated in FIG. 10. The correction processing unit 222 has the same function as the correction processing unit 120 according to the third embodiment illustrated in FIG. 10. The correction processing unit 120 calculates a corrected speed increasing ratio $v_c$ by performing a correction process on the speed increasing ratio $v$ calculated by the speed increasing ratio calculating unit 221. The divider 223 calculates a target steering angle $\theta_s*$ by dividing the pinion angle $\theta_p$ calculated by the pinion angle calculating unit 61 by the corrected speed increasing ratio $v_c$ calculated by the correction processing unit 222. In the same way as the eighth embodiment, the ninth and tenth embodiments may be applied to the third embodiment.

The eighth embodiment may be applied to the fourth embodiment. In this case, the curbstone axial force calculating unit 202 is provided with a correction processing unit having the same configuration as the correction processing unit 70A according to the fourth embodiment illustrated in FIGS. 11 to 14 instead of the correction processing unit 202F illustrated in FIG. 24. When the configuration according to the fifth embodiment illustrated in FIG. 15 is employed as the turn determining unit 131 of the correction processing unit 70A, the same configuration as the turn determining unit 131 according to the fifth embodiment illustrated in FIG. 15 is employed as the turn determining unit of the correction processing unit in the curbstone axial force calculating unit 202. When the configurations according to the sixth embodiment illustrated in FIGS. 16 and 18 are employed as the turn determining unit 131, the deceleration determining unit 132, and the acceleration determining unit 133 of the correction processing unit 70A, the same configuration as the configuration according to the fifth embodiment illustrated in FIG. 15 is employed as the turn determining unit, the deceleration determining unit, and the acceleration determining unit of the correction processing unit in the curbstone axial force calculating unit 202. In the same way as the eighth embodiment, the ninth and tenth embodiments may be applied to the fourth to sixth embodiments.

The eighth embodiment may be applied to the seventh embodiment. In this case, the curbstone axial force calculating unit 202 is provided with a correction processing unit having the same configuration as the correction processing unit 180B according to the seventh embodiment illustrated in FIG. 20 instead of the correction processing unit 202F illustrated in FIG. 24. In the same way as the eighth embodiment, the ninth and tenth embodiments may be applied to the seventh embodiment.

In the aforementioned embodiments, a clutch may be provided in the steering system 10. In this case, as indicated by a two-dot chain line in FIG. 1, the steering shaft 12 and the pinion shaft 13 are connected to each other via the clutch 21. An electromagnetic clutch that performs connection/disconnection of power by controlling supply of electric power to an excitation coil is employed as the clutch 21. The control device 50 performs connection/disconnection control that the clutch 21 switches between engagement and disengagement. When the clutch 21 is disengaged, power transmission between the steering wheel 11 and the turning wheels 16 and 16 is mechanically cut off. When the clutch 21 is engaged, the power transmission between the steering wheel 11 and the turning wheels 16 and 16 is mechanically set up.

In the aforementioned embodiments, the steering system 10 may be a lateral independence type steering system that independently turn two right and left turning wheels with respect to the traveling direction of the vehicle. The steering system 10 may be configured as a four-wheel independence type steering system that independently turn four turning wheels in a four-wheel-drive vehicle.

What is claimed is:

1. A steering control device comprising a controller configured to:
   control a turning motor that generates a turning force for causing turning wheels, of which power transmission to and from a steering wheel is cut off, to turn;
   change a steering angle ratio according to a vehicle speed through control of the turning motor, wherein the steering angle ratio is a ratio of a turning angle of the turning wheels to a steering angle of the steering wheel; and
   change, when the steering wheel is being held at a constant steering angle with respect to a neutral position or when the vehicle is turning, a degree of change of the steering angle ratio with respect to the vehicle speed due to acceleration or deceleration of the vehicle.

2. The steering control device according to claim 1, wherein the controller is configured to
   prohibit the change of the steering angle ratio with respect to change of the vehicle speed when
      the steering wheel is being held at a constant steering angle with respect to a neutral position or
      the vehicle is turning.

3. The steering control device according to claim 2, wherein the controller is configured to
calculate a target rotation angle of a shaft that rotates along with a turning operation of the turning wheels based on the steering angle of the steering wheel according to the vehicle speed;
control the turning motor such that a rotation angle of the shaft reaches the target rotation angle; and
fix the value of the vehicle speed used to calculate the target rotation angle when
the steering wheel is being held at a constant steering angle with respect to the neutral position or
the vehicle is turning.

4. The steering control device according to claim 3, wherein the controller is configured to slowly change the value of the vehicle speed, which is used to calculate the target rotation angle, to a current value of the vehicle speed, which is detected by a vehicle speed sensor, when
a state in which the steering wheel is being held is released or
a turning state of the vehicle is released.

5. The steering control device according to claim 2, wherein the controller is configured to
calculate, according to the vehicle speed, a target rotation angle of a shaft that rotates along with a turning operation of the turning wheels based on the steering angle of the steering wheel; and
control the turning motor such that a rotation angle of the shaft reaches the target rotation angle; and
fix the value of the target rotation angle which is used to control the turning motor when
the steering wheel is being held at a constant steering angle with respect to the neutral position or
the vehicle is turning.

6. The steering control device according to claim 5, wherein the controller is configured to slowly change the value of the target rotation angle, which is used to control the turning motor, to a current value of the target rotation angle, when
a state in which the steering wheel is being held is released or
a turning state of the vehicle is released.

7. The steering control device according to claim 1, wherein the controller is configured to slow down the degree of change of the steering angle ratio with respect to change of the vehicle speed when
the steering wheel is being held at a constant steering angle with respect to a neutral position or
the vehicle is turning.

8. The steering control device according to claim 7, wherein the controller is configured to
calculate a target rotation angle of a shaft that rotates along with a turning operation of the turning wheels based on the steering angle of the steering wheel according to the vehicle speed;
control the turning motor such that a rotation angle of the shaft reaches the target rotation angle; and
limit a change per unit time of the vehicle speed used to calculate the target rotation angle when
the steering wheel is being held at a constant steering angle with respect to the neutral position or
the vehicle is turning.

9. The steering control device according to claim 8, wherein the controller is configured to slowly change the value of the vehicle speed, which is used to calculate the target rotation angle, to a current value of the vehicle speed, which is detected by a vehicle speed sensor, when
a state in which the steering wheel is being held is released or
a turning state of the vehicle is released.

10. The steering control device according to claim 7, wherein the controller is configured to
calculate, according to the vehicle speed, a target rotation angle of a shaft that rotates along with a turning operation of the turning wheels by multiplying the steering angle of the steering wheel by a speed-increasing ratio between the steering wheel and the shaft; and
control the turning motor such that a rotation angle of the shaft reaches the target rotation angle; and
limit a change per unit time of the speed-increasing ratio which is used to calculate the target rotation angle when
the steering wheel is being held at a constant steering angle with respect to the neutral position or
the vehicle is turning.

11. The steering control device according to claim 10, wherein the controller is configured to slowly change the value of the speed-increasing ratio, which is used to calculate the target rotation angle, to a current value of the speed-increasing ratio, when
a state in which the steering wheel is being held is released or
a turning state of the vehicle is released.

12. The steering control device according to claim 1, wherein
the controller is configured to control a reaction motor that generates a steering reaction force that is a torque applied opposite to an operating direction of the steering wheel in accordance with a difference between a steering angle and a target steering angle of the steering wheel, and controlling the reaction motor includes
converting, according to the vehicle speed, a rotation angle of a shaft that rotates along with a turning operation of the turning wheels to the target steering angle of the steering wheel based on the steering angle ratio; and
changing the degree of change of the steering angle ratio with respect to change of the vehicle speed used to calculate the target steering angle.

13. The steering control device according to claim 12, wherein the rotation angle of the shaft, which is used to calculate the target steering angle, is at least one of
a rotation angle of the shaft when the turning wheels of the vehicle are determined to be in contact with an obstacle,
a rotation angle of the shaft when the vehicle is powered on, and
a target rotation angle of the shaft generated when a host control device mounted in the vehicle intervenes in steering control.

* * * * *